United States Patent
Orihashi et al.

(10) Patent No.: US 7,697,624 B2
(45) Date of Patent: Apr. 13, 2010

(54) COMMUNICATION APPARATUS AND COMMUNICATION METHOD UTILIZING MULTIPLE CARRIER WAVES FOR OVERCOMING INTERFERENCE

(75) Inventors: Masayuki Orihashi, Ichikawa (JP); Yutaka Murakami, Kawasaki (JP)

(73) Assignee: Panasonic Corporation, Osaka (JP)

( * ) Notice: Subject to any disclaimer, the term of this patent is extended or adjusted under 35 U.S.C. 154(b) by 957 days.

(21) Appl. No.: 10/511,622

(22) PCT Filed: Aug. 28, 2003

(86) PCT No.: PCT/JP03/10920

§ 371 (c)(1),
(2), (4) Date: Oct. 18, 2004

(87) PCT Pub. No.: WO2004/021617

PCT Pub. Date: Mar. 11, 2004

(65) Prior Publication Data

US 2005/0180515 A1  Aug. 18, 2005

(30) Foreign Application Priority Data

Aug. 28, 2002 (JP) .............................. 2002-248266
Oct. 17, 2002 (JP) .............................. 2002-302947
Aug. 22, 2003 (JP) .............................. 2003-298489

(51) Int. Cl.
*H04B 7/02* (2006.01)
*H04W 4/00* (2009.01)

(52) U.S. Cl. ...................................... 375/267; 370/329

(58) Field of Classification Search ................ 375/260, 375/259, 367, 267, 365; 370/329, 324, 503, 370/280
See application file for complete search history.

(56) References Cited

U.S. PATENT DOCUMENTS 5,677,927 A * 10/1997 Fullerton et al. ............ 375/130
5,687,169 A * 11/1997 Fullerton .................... 370/324
6,243,422 B1 * 6/2001 Urabe et al. ................. 375/259
6,735,256 B1 * 5/2004 Toshimitsu .................. 375/260

(Continued)

FOREIGN PATENT DOCUMENTS

CN        1169220 A       12/1997

(Continued)

OTHER PUBLICATIONS

International Search Report for PCT/JP03/10920, dated Dec. 16, 2003.

*Primary Examiner*—George Eng
*Assistant Examiner*—Christopher M Brandt
(74) *Attorney, Agent, or Firm*—RatnerPrestia

(57) ABSTRACT

There are included a transmission modulator (103) for impulse-modulating the data to be transmitted, thereby producing a subcarrier; a subcarrier control section for controlling the subcarrier to be utilized for communication, depending on the amount and significance of information and on the propagation condition of communication; and an antenna section (101) for radiating the subcarrier signal. This structure allows selection of a subcarrier suitable for information to be transmitted and for propagation environment, and hence allows a communication to be performed which exhibits a high flexibility and a high noise immunity. Thus, there can be provided a communication apparatus that can perform a high-quality, high-stability communication exhibiting an improved interfering immunity and that performs a flexible impulse communication.

35 Claims, 44 Drawing Sheets

U.S. PATENT DOCUMENTS

| | | | |
|---|---|---|---|
| 7,308,035 B2 * | 12/2007 | Rouquette et al. | 375/267 |
| 2001/0028637 A1 * | 10/2001 | Abeta et al. | 370/335 |
| 2002/0094049 A1 * | 7/2002 | Aslanis et al. | 375/365 |
| 2002/0101936 A1 * | 8/2002 | Wright et al. | 375/296 |
| 2002/0114270 A1 * | 8/2002 | Pierzga et al. | 370/208 |
| 2004/0202138 A1 * | 10/2004 | Song et al. | 370/335 |
| 2006/0120473 A1 * | 6/2006 | Baum | 375/260 |

FOREIGN PATENT DOCUMENTS

| | | |
|---|---|---|
| JP | 8-70330 | 3/1996 |
| JP | 8-70330 A | 3/1996 |
| JP | 10-508725 A | 8/1998 |
| JP | 11-17644 | 1/1999 |
| JP | 11-17644 A | 1/1999 |
| JP | 11-55210 | 2/1999 |
| JP | 11-55210 A | 2/1999 |
| JP | 11-504480 A | 4/1999 |
| JP | 11-215095 | 8/1999 |
| JP | 11-215095 A | 8/1999 |
| JP | 2000-92009 A | 3/2000 |
| JP | 2001-144724 A | 5/2001 |
| JP | 2002-33676 A | 1/2002 |

* cited by examiner

COMMUNICATION APPARATUS AND COMMUNICATION METHOD UTILIZING MULTIPLE CARRIER WAVES FOR OVERCOMING INTERFERENCE

This application is a U.S. national phase application of PCT international application PCT/JP03/10920.

TECHNICAL FIELD

The present invention is a technique for use in digital radio communication and, more particularly, relates to a technique for in impulse communication.

BACKGROUND ART

Digital radio communication now occupies the important position in the field of communication by virtue of the technological development thereof. In an attempt to pursue higher speed of communication, study has being put forward toward communication using impulse modulation scheme. Impulse modulation scheme involves the problem of being ready to undergo interference from other systems and hence become instable during communication because of its occupation over a broadband frequency. Meanwhile, because of band occupation, there is a difficulty in multiplexing a plurality of channels.

However, as means for solving this, there are those as described in U.S. Pat. No. 5,677,927, for example. FIG. 44 shows the conventional communication apparatus described in U.S. Pat. No. 5,677,927.

In FIG. 44, a subcarrier generator & modulator 4401 generates a modulation subcarrier signal to be modulated with an information signal, and outputs the modulation subcarrier signal to a subcarrier time modulator 4402. By the subcarrier time modulator 4402, an encoded timing signal is modulated to generate a modulated encoded timing signal. The timing signal is radiated in the form of an electromagnetic pulse, at a transmission antenna 4404 through an output stage 4403.

With the above configuration, the communication apparatus in the prior art makes an impulse signal into channels by the simultaneous uses of subcarriers different in frequency or waveform. By using separate subcarriers at individual channels, communication is made feasible simultaneously at a multiplicity of independent channels.

However, in the configuration of U.S. Pat. No. 5,677,927, because communication is by a broad use of band on the impulse modulation scheme, there is a difficulty in avoiding against the system that issues high output signals in a part of the band, resulting in readiness to undergo influence.

Meanwhile, because the interval of subcarrier frequencies is great in distance (interval equal to or greater than 500 MHz), there is a conspicuous difference appearing in frequency-based radio wave propagation characteristic. Namely, concerning the higher-frequency subcarrier, there is limitation in the area for transmission as compared to the lower-frequency subcarrier. Thus, there is greater effect of shadowing. Besides, attenuation is high at around shields such as walls. This is the case from the fact that generally, at lower frequency band, communication is favorable with reduced circuit disconnections and broader communication area while, at higher frequency band, circuit disconnection is higher in rate and communication area is narrower.

These can be responsible for the followings.

Free space propagation loss: loss increases with increasing frequency. Narrowing communication area.

Transmission characteristic: loss of transmission through a shield increases with increase of frequency.

Diffraction effect: diffraction effect decreases and shadowing influence increase with increase of frequency.

Consequently, the communication system using impulse modulation scheme has the problem of the above conspicuous setbacks, as compared to the communication system in the prior art having a carrier interval of approximately several MHz to several tens MHz.

DISCLOSURE OF THE INVENTION

A communication apparatus according to the present invention, solving the foregoing problem, is allowed for suited communication by assigning transmission subcarriers, depending upon communication information substance (significance, control information or not), information capacity and communication quality required. This enables communications highly flexible and immune to noises.

Meanwhile, a communication apparatus comprises: a transmission modulator for impulse-modulating transmission data and generating subcarriers; a carrier control section for controlling the subcarriers for use in communication depending upon information amount, significance and communication propagation condition; and an antenna section for radiating the subcarrier signals. This can select subcarriers suited for transmission information and propagation environment, hence allowing for communications highly flexible and immune to noises.

Meanwhile, a communication apparatus according to the invention further comprises a reception modulator for detecting reception data and examining a reception power on each subcarrier, to notify to the subcarrier control section a permission/non-permission to use the subcarrier, depending upon the reception power examined by the reception demodulator. This can dynamically change the subcarriers for use in changing the communication environment, hence making possible to secure stable communication quality.

Meanwhile, a communication apparatus according to the invention is characterized in that the carrier control section causes hopping on two or more of the subcarriers.

Meanwhile, a communication apparatus according to the invention is characterized in that the carrier control section causes spread on two or more of the subcarriers.

Meanwhile, a communication apparatus according to the invention is characterized in that the transmission modulator changes an on-frequency allocation of the subcarriers according to communication condition.

Meanwhile, a communication apparatus according to the invention is characterized in that the transmission modulator assigns a narrower band to the subcarrier having a lower center frequency and a broader band to the subcarrier having a higher center frequency.

Meanwhile, a communication apparatus according to the invention further comprises a channel control section for selecting and controlling the subcarrier for use on each channel, the channel control section performing communication over two or more channels with different ones of the subcarriers.

Meanwhile, a communication apparatus according to the invention is characterized in that the channel control section performs communication over two or more channels with a combination of different ones of the subcarriers.

Meanwhile, a communication apparatus according to the invention is characterized in that carrier control section performs communication of control information by at least one of the subcarriers.

Meanwhile, a communication apparatus according to the invention is characterized in that the transmission modulator multiplexes together the pieces of control information on two or more channels by use of any one of time division multiplexing and code division multiplexing, in at least one subcarrier of two or more of the subcarriers.

Meanwhile, a communication apparatus according to the invention is characterized in that the transmission modulator carries out frequency division duplex by use of two or more of the subcarriers.

Meanwhile, a communication apparatus according to the invention is characterized in that the transmission modulator carries out frequency division duplex by use of three or more of the subcarriers.

Meanwhile, a communication apparatus according to the invention is characterized in that the subcarrier with which the transmission modulator is to communicate the control information has a center frequency lower than a center frequency of the other subcarrier.

Meanwhile, a communication apparatus according to the invention is characterized in that the subcarrier with which the transmission modulator is to communicate the control information has a band narrower than a band of the other subcarrier.

Meanwhile, a communication apparatus according to the invention is characterized in that the transmission modulator divides one symbol into two or more of the subcarriers, thereby multiplexing two or more channels.

Meanwhile, a communication apparatus according to the invention is characterized in that the transmission modulator causes frequency hopping in one symbol by use of two or more of the subcarriers, to thereby multiplexing two or more channels.

Meanwhile, a communication apparatus according to the invention is characterized in that the transmission modulator causes encoding spread of one symbol onto two or more of the subcarriers, to thereby multiplexing two or more channels.

Meanwhile, a communication apparatus according to the invention is characterized in that the transmission modulator causes spread of one symbol onto two or more of the subcarriers and two or more chips, thereby multiplexing two or more channels.

Meanwhile, a communication apparatus according to the invention is characterized in that the antenna section comprises a plurality of antenna elements. Consequently, because the antenna elements are superior in narrower band characteristic in respect of radiation characteristic and mechanical form, size reduction and performance improvement are facilitated.

Meanwhile, a communication apparatus according to the invention is characterized in that the antenna section has a frequency characteristic of a multi-band characteristic.

Meanwhile, a communication apparatus according to the invention is characterized in that the antenna elements are different in center frequency of frequency characteristic.

Meanwhile, a communication apparatus according to the invention is characterized in that the antenna elements have band characteristics not to overlap on a frequency axis.

Meanwhile, a communication apparatus according to the invention is characterized in that the antenna section receives radio wave on a subcarrier-by-subcarrier basis and outputs the subcarrier signal to the reception modulator.

Meanwhile, a communication apparatus according to the invention is characterized in that the antenna elements have frequency characteristics corresponding to the subcarriers and radiate subcarrier transmission signal as a radio wave.

Meanwhile, a communication apparatus according to the invention is characterized in that the reception demodulator has a compensation section for detecting a characteristic of a signal sequence of each subcarrier from a known signal received from a communication partner and compensating for the characteristic.

Meanwhile, a communication apparatus according to the invention is characterized in that the characteristic is a frequency characteristic.

Meanwhile, a communication apparatus according to the invention is characterized in that the characteristic is a time response characteristic, the compensation section compensating for the time response characteristic by a correlation signal of a correlator.

Meanwhile, a communication apparatus according to the invention is characterized in that the reception demodulator comprises a spread code storing section for storing a spread code and extracting a spread code corresponding to the subcarrier, and a dispread section for making a convolution operation of the subcarrier signal and the spread code extracted at the spread code storing section.

Meanwhile, a communication apparatus according to the invention is characterized in that the transmission demodulator comprises a spread code storing section for storing a spread code and extracting a spread code corresponding to the subcarrier, and a spread section for making a direct spread onto the subcarrier from the modulation signal divided into the subcarriers and the spread code extracted at the spread code storing section.

Meanwhile, a communication apparatus according to the invention is characterized in that the reception demodulator comprises a switch section for switching over by frequency hopping on the subcarrier, the carrier control section carrying out the control in the switch section.

Meanwhile, a communication apparatus according to the invention is characterized in that the transmission demodulator comprises a switch section for switching over by frequency hopping on the subcarrier, the carrier control section carrying out the control in the switch section.

A communication method according to the present invention is a communication method for impulse modulation communication using a plurality of subcarriers, the communication method comprising: a step of measuring a reception power on every subcarrier in a non-signal state, in an initial state prior to starting a communication; and a step of determining the reception power measured and selecting the subcarrier usable in communication. This can detect properness of a subcarrier, hence allowing for communication using only a subcarrier suited for communication.

Meanwhile, a communication method according to the present invention is characterized in that the determination is to use, in a later communication, the subcarrier having the reception power equal to or smaller than a predetermined value. This can detect a subcarrier being influenced of radio wave from the other, hence allowing for communications using only a subcarrier suited for communication.

Meanwhile, a communication method according to the present invention further comprises a step of measuring a reception power on every subcarrier of a received known signal at a start of communication; and a step of selecting the subcarrier having the measured reception power equal to or greater than a predetermined value, as a subcarrier usable in communication. This can detect a subcarrier with which transmission data is not easy to propagate, hence allowing for communications using only a subcarrier suited for communication.

As described above, the present invention allows for a quality, stable communication immune to interfering waves.

BEST MODE FOR CARRYING OUT THE INVENTION

Hereunder, embodiments of the present invention are explained by use of the drawings. Note that the constituent element having like function in the figure is attached with like reference.

Embodiment 1

Figure 1:
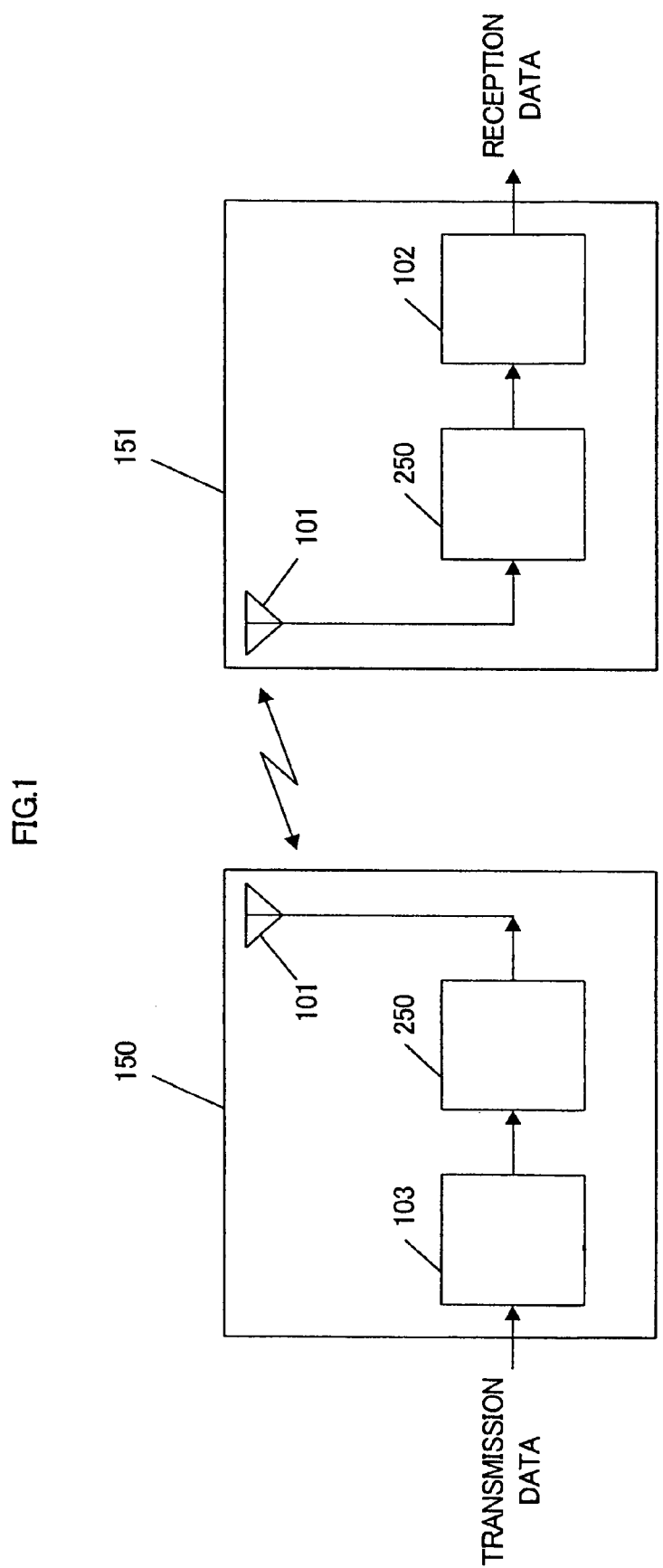
FIG. 1 is a figure showing an arrangement of a communication system according to embodiment 1 of the present invention.
Figure 2:
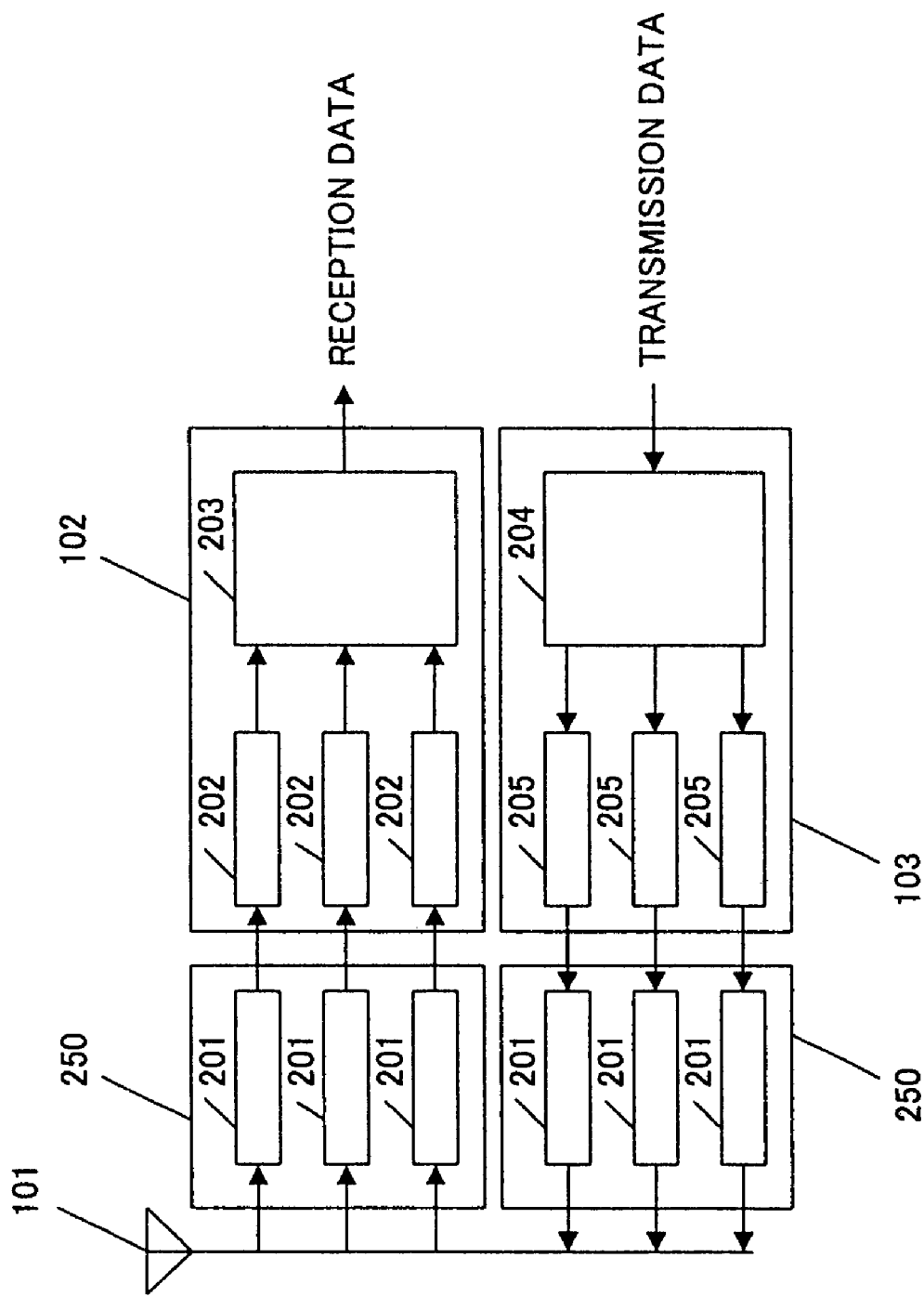
FIG. 2 is a figure showing an arrangement of a communication apparatus according to embodiment 1 of the invention.
Figure 3:
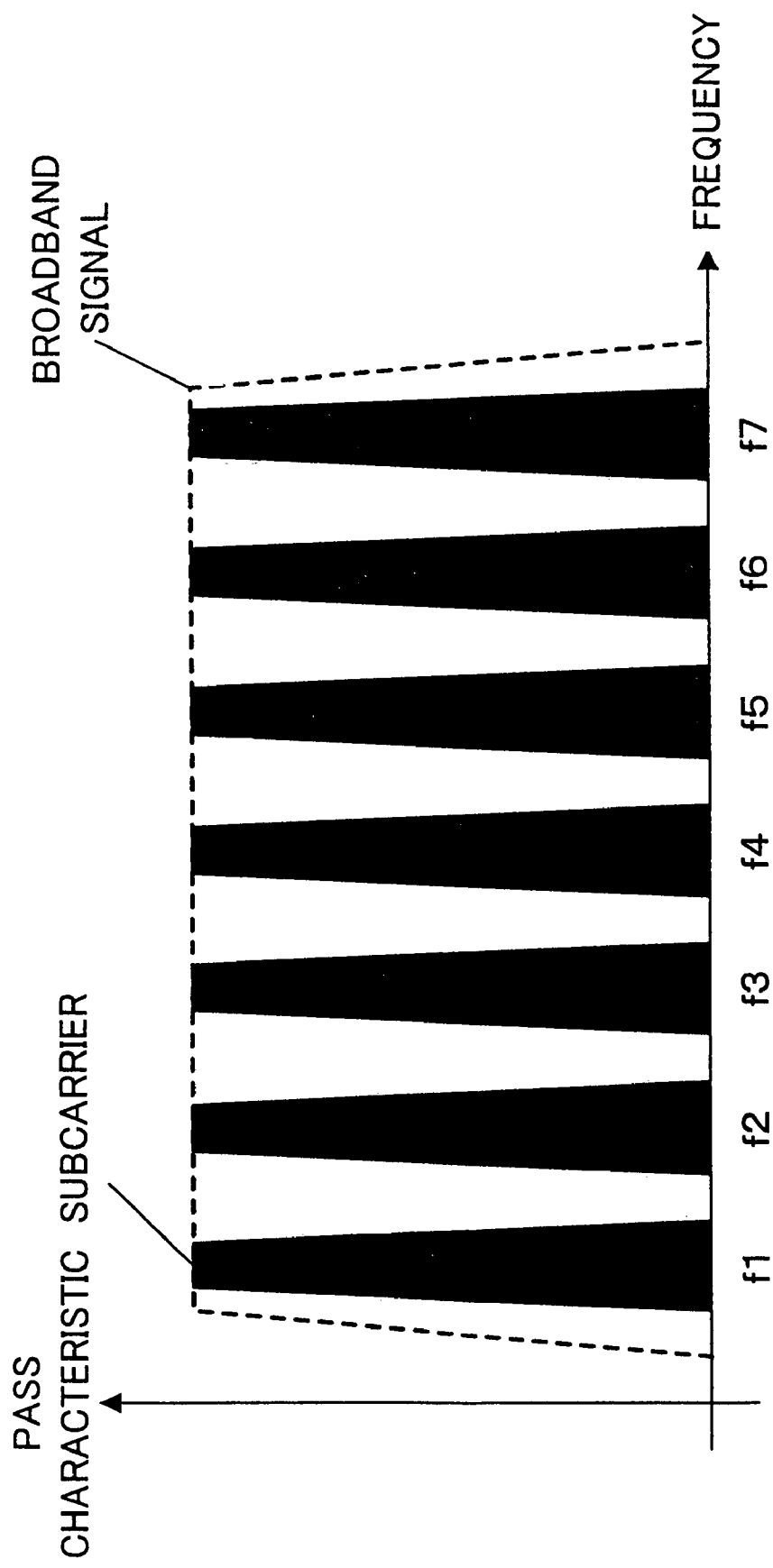
FIG. 3 is a figure showing a relationship between a band and a subcarrier according to embodiment 1 of the invention.

Using the figures, explanation is made on the invention (particularly in demodulation) that an impulse signal is divided into two or more bandwidths (subcarriers), the signals of which are to be used in implementing communication. FIG. 1 is a diagram showing a communication system using the conventional impulse modulation signal, wherein 150 represents a transmitter apparatus and 151 a receiver apparatus. The transmitter apparatus 150 comprises an antenna section 101 and a transmission modulator 102 while the receiver apparatus 151 comprises an antenna section 101 and a reception demodulator 103. FIG. 2 is a diagram explaining in detail the transmitter apparatus 150 and the receiver apparatus 151 shown in FIG. 1, thus configuring a transceiver apparatus as a combination of the transmitter apparatus 150 and the receiver apparatus 151 for the sake of convenience. The blocks corresponding to FIG. 1 are attached with the same references, hence to describe herein the different point only. 250 is a filter section for inputting a signal and divides it into a plurality of subcarrier signals narrower in bandwidth than the input signal. 102 is a reception demodulator for inputting a plurality of subcarrier divisional signals divided by the filter section 250 to thereby receive and demodulate it, which is configured by a reception section 202 and a demodulator 203. 202 is a reception section for power-amplifying the input reception signal and outputting an amplified signal. 203 is a demodulator for inputting the amplified signal, to detect information from reception time, amplitude and phase, etc., and output reception data. 103 is a transmission modulator for inputting, modulating and power-amplifying the transmission data and outputting a subcarrier transmission signal, which is configured by a modulator 204 and a transmission section 205. 204 is a modulator for impulse-modulating the input transmission data on a predetermined scheme and outputting a subcarrier modulation signal. 205 is a transmission section for inputting and power-amplifying a subcarrier modulation signal and outputting a subcarrier-transmission signal. The signal outputted from the transmission section 205 is band-limited in its subcarriers by the filter section 250 so that a multiplexed transmission signal is supplied to the antenna section 101. The filter section 250 is formed by a plurality of filters 201 for band limitation. The filter section 250 has a pass characteristic assumably configured as shown in FIG. 3. Namely, the plurality of filters 201 are to respectively limit different bands, and correspond to the subcarriers shown in FIG. 3.

Using a transmission apparatus 150 and reception apparatus 151 thus configured, explanation is made on a communication method of an impulse modulation scheme. Incidentally, the transmission apparatus 150 is made up by a transmission modulator 103, a filter section 250 and an antenna section 101. The reception apparatus 151 is constituted by an antenna section 101, a filter section 250 and a reception modulator 102.

The modulator 204 inputs transmission data, and impulse-modulates it according to a predetermined procedure. Impulse modulation is known including pulse-position modulation that is to superimpose information over pulse time interval, pulse-phase modulation that is to superimpose information over pulse phase, and pulse-amplitude modulation that is to superimpose information over pulse amplitude. In this manner, an impulse modulation wave is generated corresponding to transmission data, to output a subcarrier modulation signals in an amount of a predetermined number of subcarriers. The subcarriers are attached with the same symbol. The subcarrier modulation signals are inputted to the transmission sections 205, to be output as power-amplified subcarrier transmission signals therefrom. The power-amplified subcarrier transmission signals are inputted to the filter section 250 and band-limited by the corresponding filters 201. The impulse modulation signal has a feature having a much-broadened band because it is an impulse-natured signal. Consequently, there is a feature that, even when passed through a narrower-banded filter having a different center frequency, there exists a corresponding frequency component. Thus, output is obtainable in accordance with a filter. Namely, the transmission signal outputted from the filter section 250 is such a signal as having a frequency characteristic shown in FIG. 3, in a state multiplexed with a plurality of subcarrier signals 201 to 207. The transmission signal is supplied to the antenna section 101, to radiate an electromagnetic wave by the radiation characteristic thereof.

The electromagnetic wave thus radiated is received by the antenna section 101 of the reception apparatus 151, to output a reception signal. The reception signal is divided into subcarriers band-limited by the filters 201 of the filter section 250, to be output as subcarrier divisional signals. The filter section 250 has the same frequency characteristic as that band-limited by the transmission apparatus 150. The reception signal in the entire power is turned into subcarrier divisional signals without substantial loss through the filters 210. The subcarrier divisional signals thus band-limited are power-amplified by the reception sections 202 from which subcarrier reception signals are outputted and those are supplied to the demodulator 203. The subcarrier reception signals inputted to the demodulator 203 are demodulated according to pulse interval, amplitude and phase, and turned into reception data.

Hereunder, the above operation is explained concretely.

Figure 12:
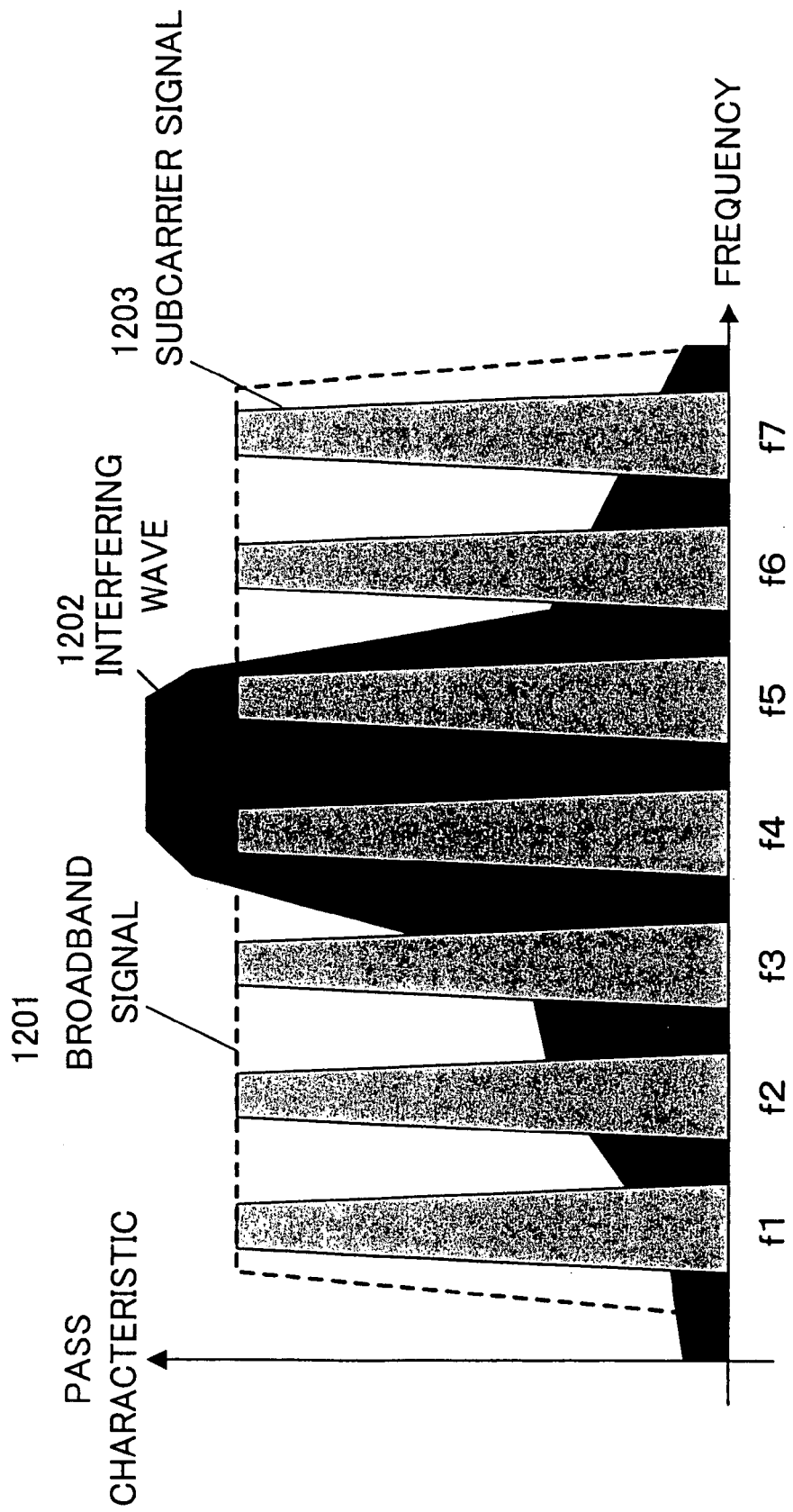
FIG. 12 is a figure showing a relationship between a interfering wave and a subcarrier according to embodiment 1 of the invention.
Figure 13:
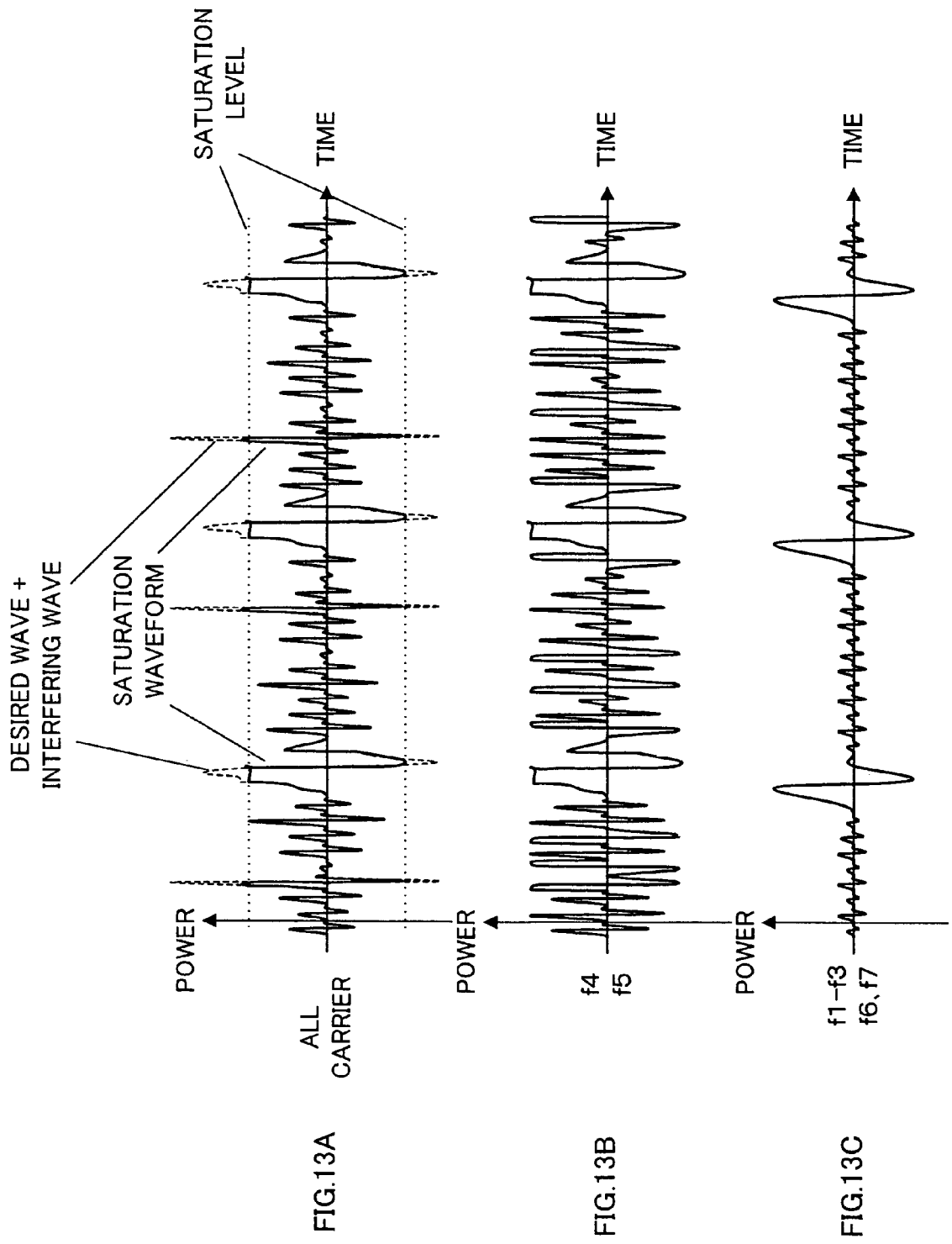
FIG. 13A is a figure showing an impulse modulation signal superimposed by a interfering wave according to embodiment 1 of the invention.
FIGS. 13B and 13C are figures showing the subcarriers of an impulse modulation wave according to embodiment 1 of the invention.

Here, consider the case a certain disturbing wave is superimposed over the input signal to the reception apparatus 151. FIG. 12 is a figure showing a relationship between an impulse signal 1201 and a disturbing wave 1202, showing a state there exist one broadband signal 1201 (broken line), seven subcarrier signals 1203 and one disturbing wave 1202. FIG. 13A is a figure showing an impulse modulation signal superimposed thereon with a disturbing signal. FIG. 13B is a figure showing subcarriers f4, f5 of the impulse modulation signal at that time. Meanwhile, FIG. 13C is a figure showing subcarriers f1 to f3, f6 and f7. Now consider here the case to communicate an impulse modulation signal remained as a broadband signal and the case to communicate it through division into subcarriers as noted before, in order for comparison.

First of all, in the case a high-power disturbing wave is superimposed over a desired wave upon communicating an impulse modulation signal remained as a broadband signal as in the conventional, a high noise component is added in the impulse portion (symbol in the impulse modulation signal) or a signalless portion (symbol transition portion). In case this exceeds a predetermined level (saturation level), saturation occurs in the output signal thus resulting in signal distortion. This manner is shown in FIG. 13A. As a result, during demodulating the impulse modulation signal, an impulse is detected erroneously due to the deviation. Otherwise, the accuracy of detection deteriorates conspicuously, to raise a serious problem in communication quality. However, according to the communication apparatus of the present invention, in the case that similarly a disturbing wave is superimposed over the communication signal divided into subcarriers, there is encountered a deterioration in the communication condition in subcarriers f4, f5 under heavy influence of the disturbing wave shown in FIG. 12, by the influence of the disturbing wave as shown in FIG. 13B. However, concerning the other subcarriers f1-f3, f6, f7, the disturbing wave is band-limited by the filter 201 as shown in FIG. 13C with a result that the major part of disturbing wave power is removed to obtain high C/N. Generally, the disturbing wave, in few cases, has a power over a broad band, i.e. intense power frequently exists in a particular band. Therefore by providing a setting to allocate subcarriers over a broad band, the effect of relieving the influence is enhanced as noted above. For this reason, communications can be sustained in a favorable state by demodulation with the use of subcarriers f1-f3, f6, f7 shown in FIG. 12.

Meanwhile, in the invention, subcarrier arrangement is established by the filter section 250. Naturally, this can be designed freely. Disturbing waves frequently occur due to the use for communications or so by the other systems, and wherein it is possible to know in advance a band being used in the system in this manner. For this reason, by the design to previously avoid such disturbing wave bands by means of the filter section 250, communication failure due to other systems can be reduced to the minimum.

In the above explanation, explanation was premised on that the same subcarriers were formed for communication on both the transmission apparatus 150 and the reception apparatus 151. However, the similar effect is available by effecting communications without forming subcarriers (remained in broadband) on the transmission apparatus 150 while performing demodulation by decomposition into subcarriers only on the reception apparatus 151. Namely, where the transmission apparatus 102 radiates an impulse modulation signal in the form of a broadband signal as it is while the demodulation apparatus 103 receives the relevant signal and demodulates it by division into subcarriers, the influence of a disturbing wave can be relieved similarly to the foregoing. In this case, the transmission apparatus does not require a mechanism such as the filter section 250 for division into subcarriers, thus simplifying the arrangement. Furthermore, the loss based on the filter section 250 is relieved thus enabling to configure an efficient transmission apparatus 150. Meanwhile, this signifies that the subcarrier reception scheme as the invention is applicable as a reception apparatus of an impulse modulation communication system as conventionally used.

Furthermore, the subcarrier allocation must not be perfectly the same on the transmission apparatus 150 and reception apparatus 151. Instead, communication is possible where there is an overlap in a given band. Namely, there is no necessity to maintain high the frequency characteristic accuracy of the filter sections 250 set up on each of the transmission apparatus 150 and the reception apparatus 151. In this manner, where there is a deviation in the frequency characteristic to be established by the filters 201 provided on the filter section 250, compensation is possible for those variations as errors. This approach is explained by use of FIGS. 4, 5 and 11.

Figure 4:
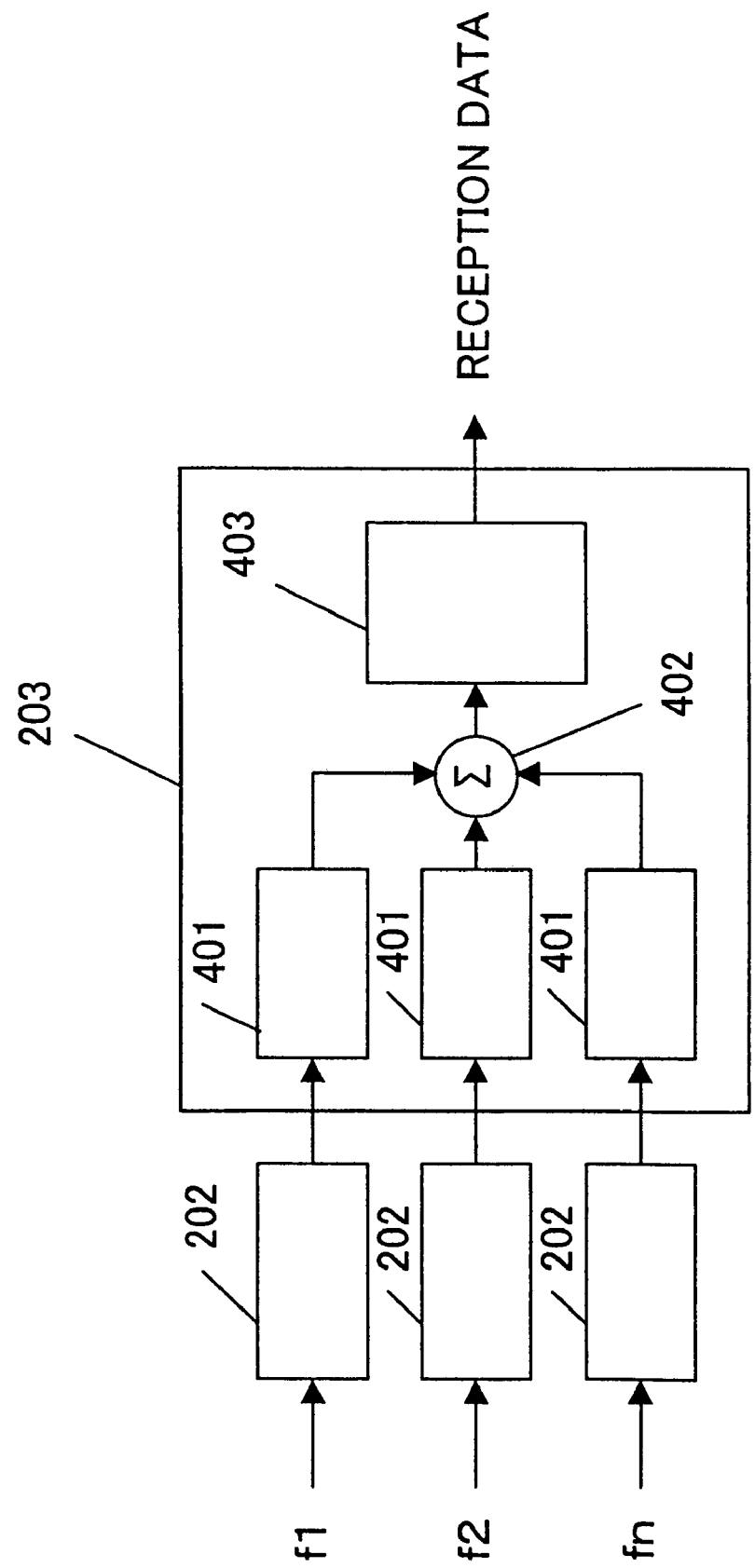
FIG. 4 is a figure showing an arrangement of a reception modulator according to embodiment 1 of the invention.
Figure 5:
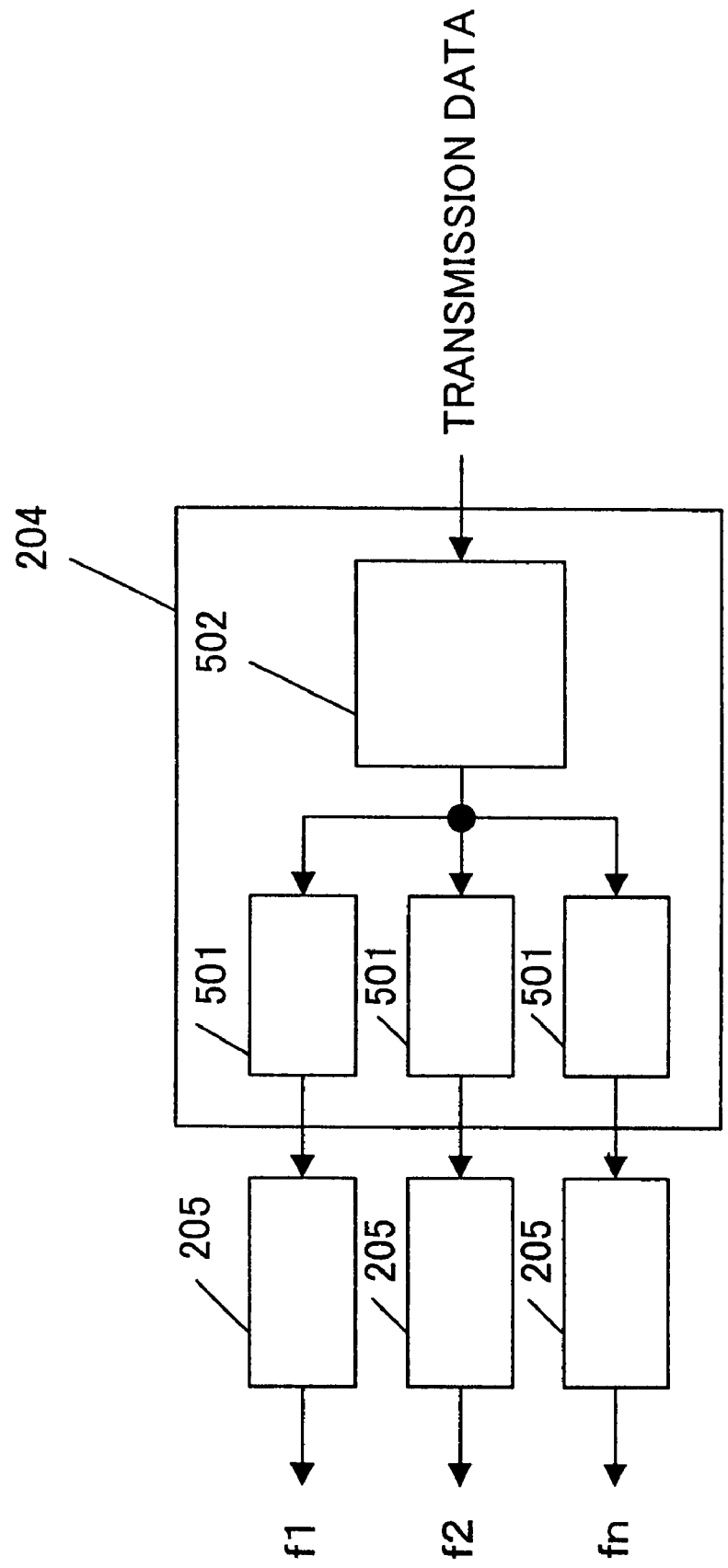
FIG. 5 is a figure showing an arrangement of a transmission modulator according to embodiment 1 of the invention.

FIG. 4 shows a further detail showing of the reception demodulator 102 in FIG. 2. Here, f1-fn respectively represent subcarrier signals. 401 is a compensation section for compensating for an error (variation) occurring on each of the subcarrier-signal sequence and outputting a subcarrier compensated signal. 402 is an operation section for inputting subcarrier compensated signals and outputting an addition-operated carrier signal. 403 is a detection section for inputting a carrier signal and detecting an amplitude, phase and pulse interval of the pulse, to output corresponding reception data.

Figure 11:
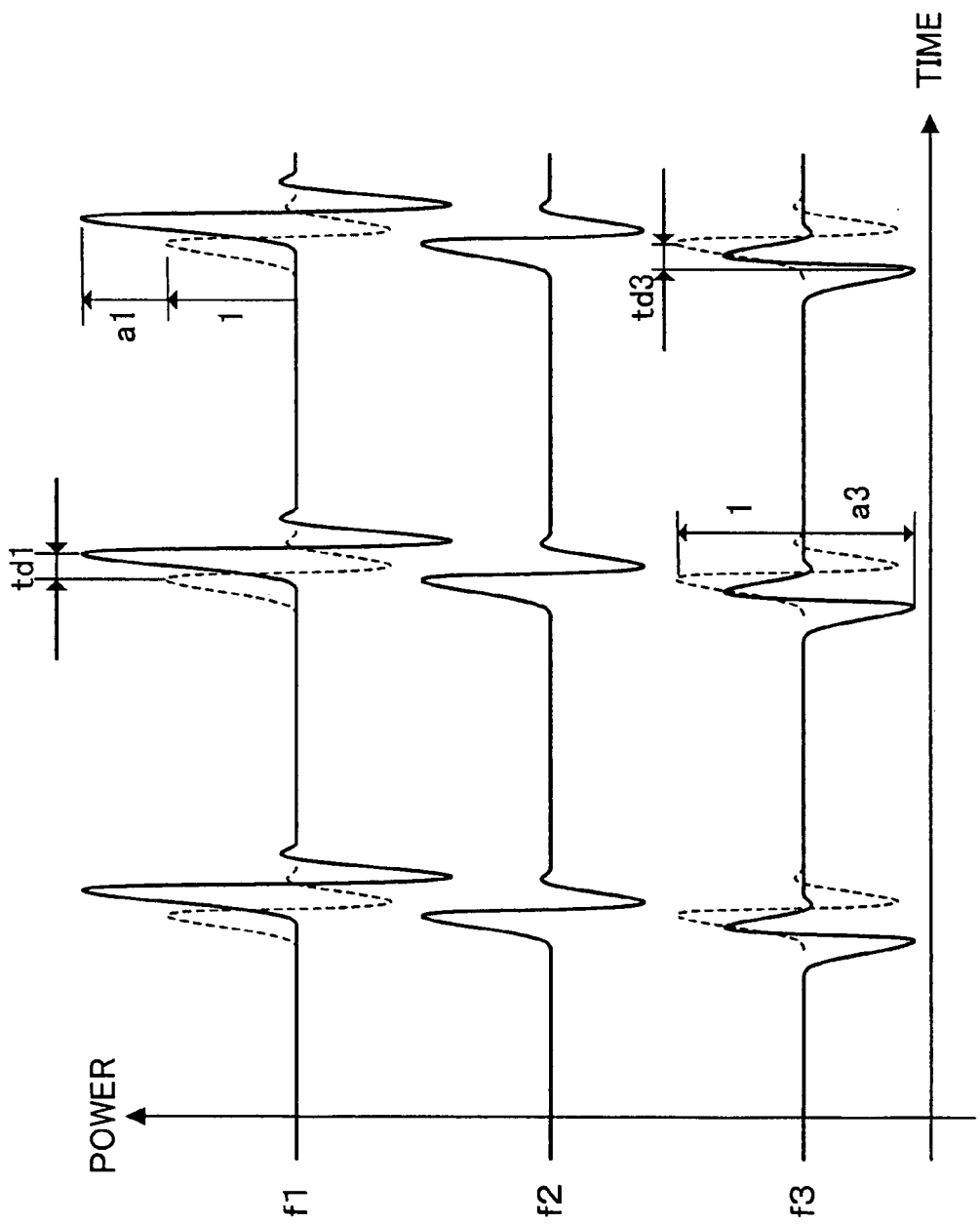
FIG. 11 is a figure representing a subcarrier characteristic according to embodiment 1 of the invention.

In the reception demodulator 102 configured as above, explanation is made on a method of compensating for an error (variation) on each of the subcarrier-based sequence. Here, explanation is based on the assumption that variation occurs mainly from frequency characteristics (of the filters 201 arranged in the filter section 250). Incidentally, measurement assumably is previously made for the frequency characteristic of the filter section 250. Although the frequency characteristic is roughly classified as amplitude characteristic, delay characteristic and phase characteristic, the former two are taken on the assumption that phase characteristic is to be expressed by amplitude characteristic and delay characteristic. There is shown in FIG. 11 a signal waveform example of a subcarrier divisional signal in the case an impulse signal string is given to the antenna section 101 in FIG. 2. Of the subcarrier divisional signals in the figure, a subcarrier divisional signal f2 is shown as a reference signal. The broken line depicted on each subcarrier divisional signal f1, f3 shows a reference signal f2, which is depicted in order for comparison. As shown in FIG. 11, provided that, relative to reference signal f2, the subcarrier divisional signal f1 has an amplitude characteristic a1 (reference signal amplitude is normalized 1) and a delay characteristic td1 while subcarrier divisional signal f3 has an amplitude characteristic a3 and a delay characteristic td3, the compensation section 401 corrects for the variation while controlling the delay time and amplitude. Taking FIG. 11 as an example, the compensation section 401 corresponding to a subcarrier f1 sets a delay time at td+td1 and an amplitude gain at 1/a1 to thereby output a subcarrier compensation signal f1. Likewise in the subsequent, the compensation section 402 corresponding to a subcarrier f2 sets a delay time at td+0 and an amplitude gain at 1, while the compensation section 402 corresponding to a subcarrier f3 sets a delay time at td−td2 and an amplitude gain at −1/a3, thereby respectively outputting subcarrier compensation signals. Noticing the pass characteristic of a subcarrier sequence set at a broad frequency band, there can be considered a great difference between the pass characteristic of a subcarrier having the highest center frequency and the pass characteristic represented by delay time, phase rotation amount, pass gain, etc. of a subcarrier having the lowest center frequency. However, as explained before, because it is possible to synthesize a signal aligned in phase, delay time and amplitude by compensating for characteristic variation occurring on each subcarrier-based sequence and detecting the subcarrier compensation signal, higher quality of communication can be carried out. Meanwhile, in the transmission modulator 103 of the transmission apparatus shown in FIG. 5, a compensation section 501 can be introduced in the modulator 204 similarly to the demodulator 203. The principle/operation is similar to the compensation section 401 provided in the demodulator 203, and hence is omitted of explanation. In this manner, higher quality of communication can be secured by compensating for subcarrier-based variations by use of the compensation section 501 in the modulator 204.

Meanwhile, it can be considered to use a matched filter or the like in the detection section 403. In this case, the function of the compensation section 401 can be incorporated in the matched filter characteristic. It is the correlator that is known the most as a matched filter structure. The correlator is quite easy to be realized by adjusting a signal pattern used in correlation on a subcarrier-by-subcarrier basis. Likewise, in the waveform generation section 502, the effect of the compensation section 501 can be incorporated by adjusting the pattern of a generating impulse pattern on a subcarrier-by-subcarrier basis.

Figure 14:
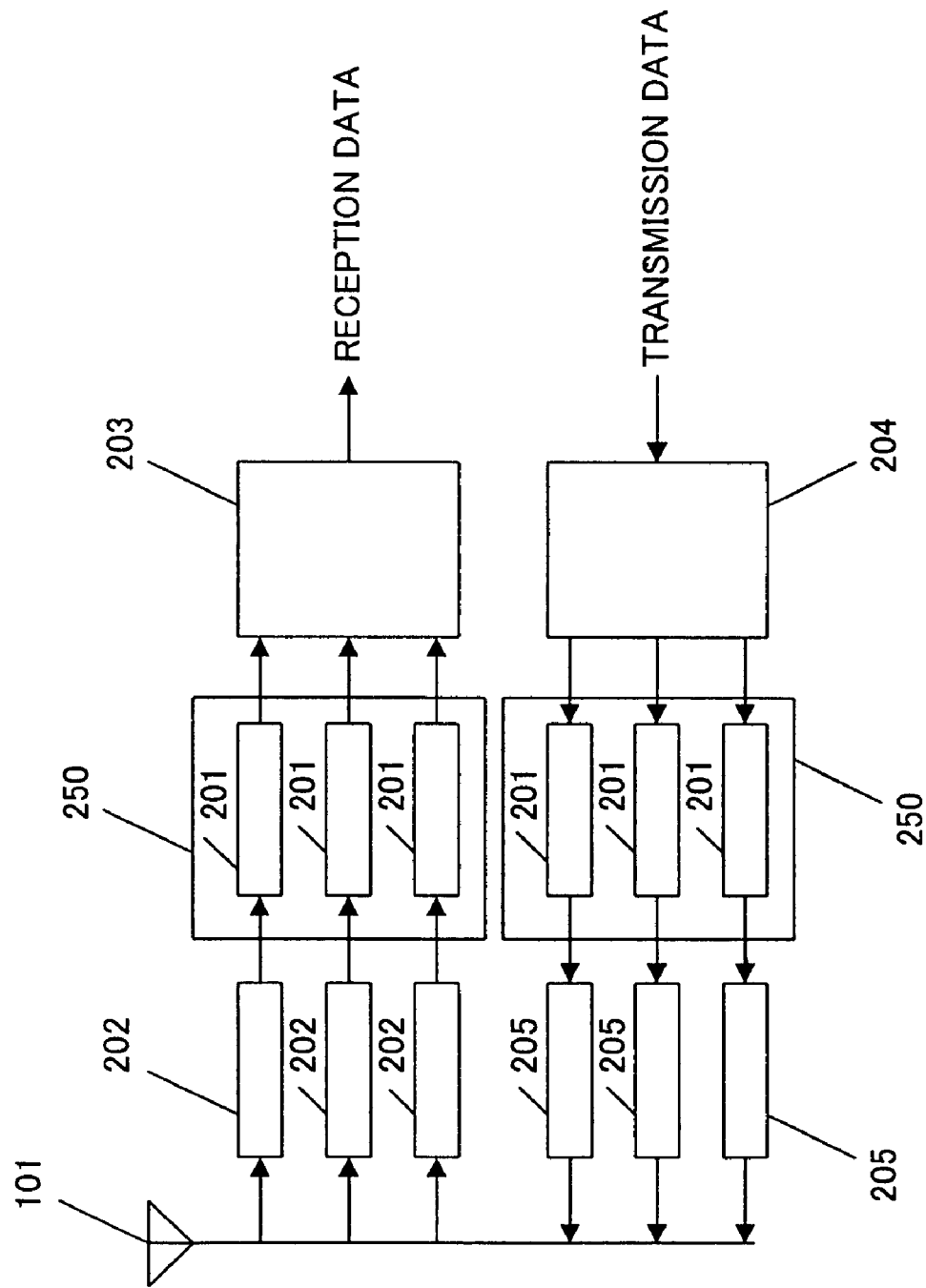
FIG. 14 is a figure showing an arrangement of a communication apparatus according to embodiment 1 of the invention.

The present invention is characterized in that an impulsive broadband signal is divided into subcarriers to be received and demodulated. This is not limited to the configuration shown in FIG. 2. As shown in FIG. 14, it can be implemented on an arrangement in which the filter section 250 and the reception section 202 and transmission section 205 are exchanged. In addition, similar effect is available even if there is no filter section 250.

Meanwhile, although the antenna section 101 in FIGS. 1 and 2 can cover the entire of subcarrier band by means of a single antenna element, a plurality of antenna elements may be provided corresponding to predetermined subcarriers. In the case of using the latter arrangement, there is conventionally a need to overlap the bands between antennas or match the characteristics in the overlapped bands. However, the present invention, because using the scheme of communications through subcarrier division, does not require to overlap between antenna-based bands or match the antenna-based characteristics. Meanwhile, generally, rather. than the antenna element having a broader band characteristic in the aspect of frequency, the antenna element having a narrower band characteristic has many excellent points in terms of radiation characteristic (e.g. antenna gain), mechanical form, etc. From this fact, size reduction and performance improvement is readily achieved on the communication apparatus structuring an antenna section 101 with the use of a plurality of antenna elements.

The present invention is characterized conspicuous in that the impulse modulation signal is divided into subcarriers for the processing of transmission and reception in the transmission apparatus 103 and reception apparatus 102 or only within the reception apparatus 102. As for the burden on the apparatus by the increase of sub-systems, the impulse modulation communication apparatus does not require various circuits for processing of high-frequency waves (linear amplifiers, synthesizers, filters). This ban reduce by far the circuit scale as compared to the increased circuit scale by the increase of subcarrier-based sequence. For this reason, the present invention can be carried out extremely easily, having a feature that great effect is obtainable while suppressing circuit burden.

Meanwhile, there is no need to provide the subcarriers with the same occupation band. Because the communication rate required is different between the control channel for flow of control information and the traffic channel for flow of data, broader band can be established to a subcarrier on a channel in which the greater communication rate is sought. With such difference of bands, the difference in fractional band can be reduced by taking narrower the lower center frequency of subcarrier and broader the higher one of subcarrier.

Embodiment 2

Figure 40:
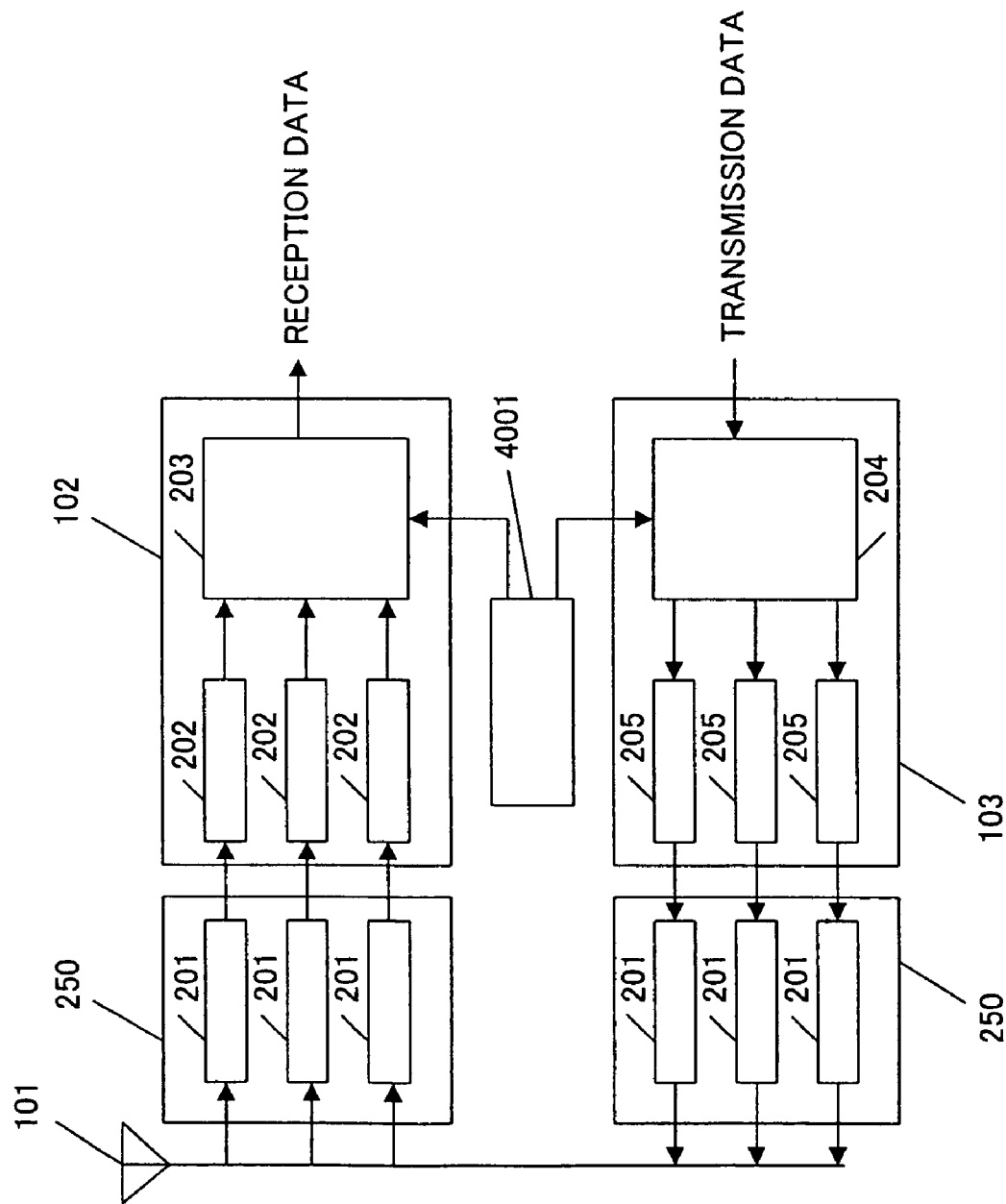
FIG. 40 is a figure showing a transmitter apparatus and receiver apparatus according to embodiment 2 of the invention.

With the use of figures, explanation is made on the invention that the impulse modulation signal is divided into two or more bands (subcarriers) to thereby multiplex a plurality of channels of impulse modulation communications by use of the subcarrier signals. FIG. 40 is a diagram showing an arrangement of a transmission apparatus 150 and reception apparatus 151 according to the present embodiment. In FIG. 40, there is a difference from that of embodiment 1 in that the transmission modulator 103 has further a channel control section 4001 while the reception demodulator 102 has further the channel control section 4001. The channel control section 4001 selects and controls the subcarriers to be used on a channel-by-channel basis.

Figure 15:
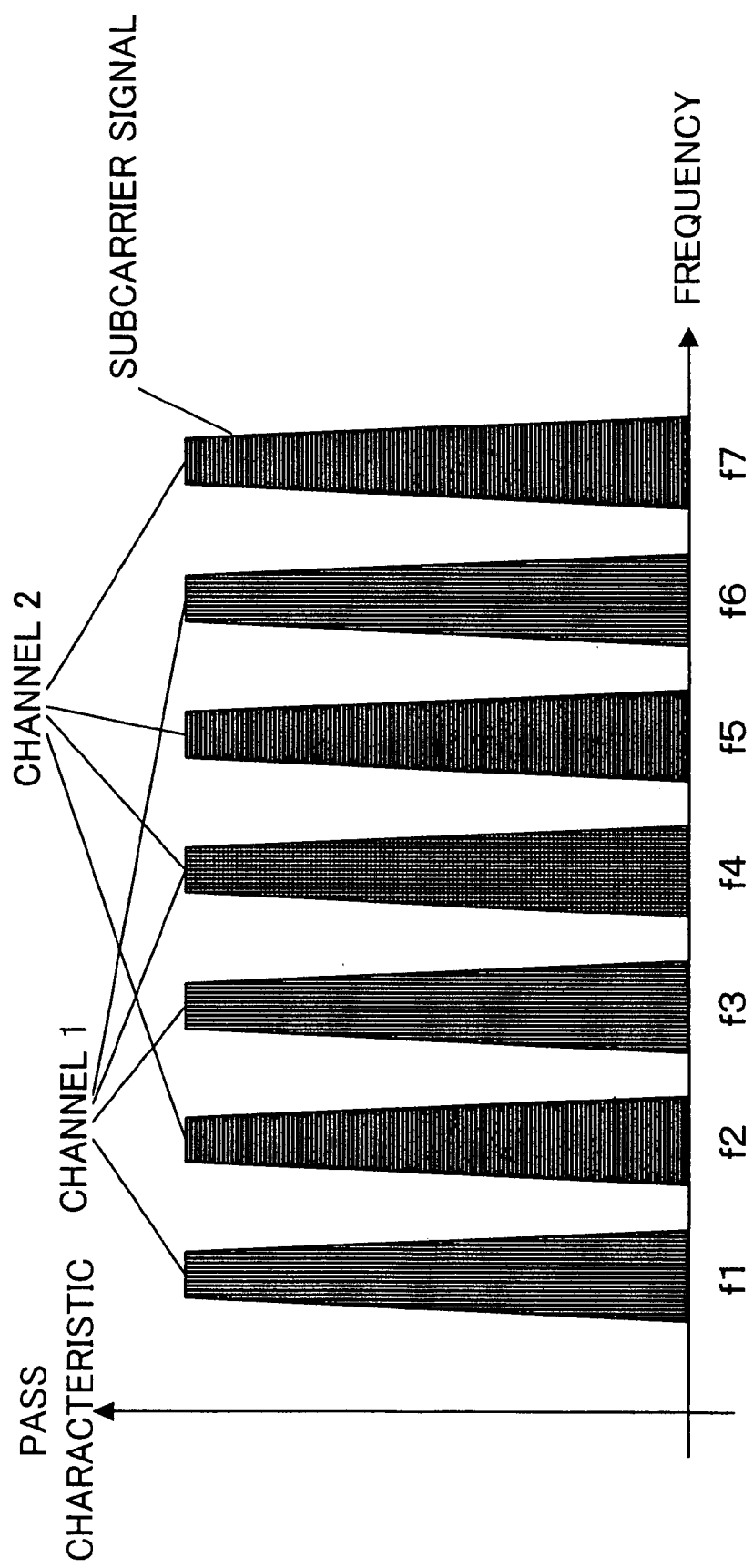
FIG. 15 is a figure showing a relationship between a subcarrier and a channel according to embodiment 2 of the invention.

There is shown in FIG. 15 a correspondence between a communication and a subcarrier. As shown in FIG. 15, it is assumed that channel 1 is under communication by use of subcarriers f1, f3, f4, f6 while channel 2 is under communication by use of subcarriers f2, f4, f5, f7. Herein, subcarrier setting is assumed similar in the transmission apparatus 150 and in the reception apparatus 151.

Explanation is made on a method of multiplexing a plurality of channels, as to the communication system configured as in the above.

Figure 16:
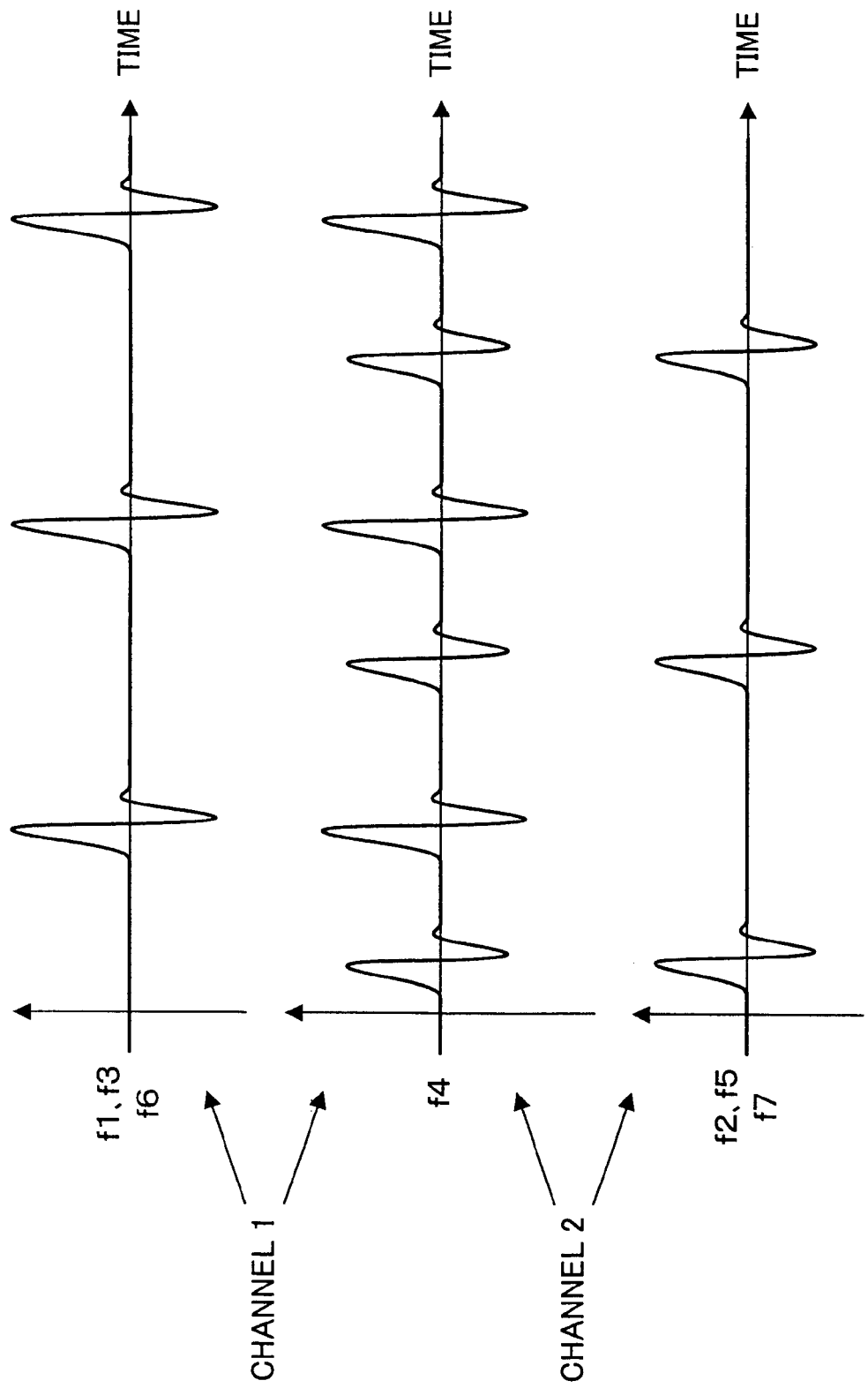
FIG. 16 is a figure showing a subcarrier signal waveform according to embodiment 2 of the invention.

The subcarrier configuration of channel 1 and the subcarrier configuration of channel 2 are in the form of sharing subcarrier f4. There is shown in FIG. 16 a signal waveform on each subcarrier-based sequence. As shown in the figure, subcarriers f1, f3, f6 and subcarriers f2, f5, f7 are occupied on the single channel without duplication. Consequently, impulse detection is possible without any problem. However, a subcarrier f4 is in a state in duplicated use by channel 1 and channel 2. For this reason, when to detect an impulse, there is a possibility that it cannot be normally done due to interference. However, the reception apparatus 151, despite cannot normally detect an impulse on subcarrier f4, can normally detect an impulse phase, amplitude, time, etc. on the other carrier (f1, f3, f6 on channel 1; f2, f5, f7 on channel 2). Therefore, it can be understood that communication is available only by those subcarriers. Moreover, in the case that there is a constant deviation in symbol time between channel 1 and channel 2, it is possible to separate the impulse of subcarrier f4. By doing so, the subcarriers duplicated between the channels can be separated and utilized in demodulation on each channel. As a result, the total power to be used per channel is improved and communication quality is expectedly improved.

The above explained the method that the transmission apparatus 150 and the reception apparatus 151 simultaneously make use of a plurality of subcarriers in the same combination. However, there is not always a need of agreement between the subcarriers to be established and transmitted by the transmission apparatus 150 and the subcarrier to be established and received by the reception apparatus 151. Normal communication is feasible to implement provided that one or more subcarriers are shared by the both apparatuses.

In this manner, channel capacity can be secured to a maximum extent by assigning one subcarrier to one channel. Meanwhile, by assigning all the subcarriers to one channel, more stable communication can be provided because of securing a signal power per channel. In this manner, it is possible to freely establish the number of subcarriers assigned to one channel. This makes it possible to assign to the channel a smaller number of subcarriers where much more channel capacity is needed, and a greater number of subcarriers where more stable communication is required.

Particularly, in the channel for conveying such important information as having a direct bearing upon system control and in such a channel as comparatively attaching importance to communication capacity such as of data for use in application, more subcarriers can be assigned to the former channel as compared to the latter channel, allowing for architecting an efficient system.

Meanwhile, the number of subcarriers in assignment may be changed depending upon a communication capacity change, a propagation condition change or an interference wave condition change.

Furthermore, stable communication quality can be sustained by previously monitoring the subcarrier condition so that the subcarriers in assignment to the channel are dynamically changed in the event that reception power is lowered, an interference wave signal is detected or interference becomes problematic at between the channels.

Although the above explained the invention that the impulse modulation signal is divided into two or more subcarriers to thereby multiplex a plurality of channels, a particular subcarrier is provided as a control channel exclusive for control information. By doing so, important information is communicatable which is to be used in control or the like independently of the traffic channel.

Meanwhile, it is possible to simultaneously use a method of channel multiplexing based on subcarrier division and multiplexing based on time division. For example, in the case of assigning a control channel exclusive for control information to one subcarrier, it is possible to realize it by time division multiplexing in order to share it by a plurality of terminals.

Embodiment 3

Explanation is made on the invention that the impulse modulation scheme is divided into two or more bands (subcarriers) so that communication is effected by spreading codes to the subcarrier.

Figure 17:
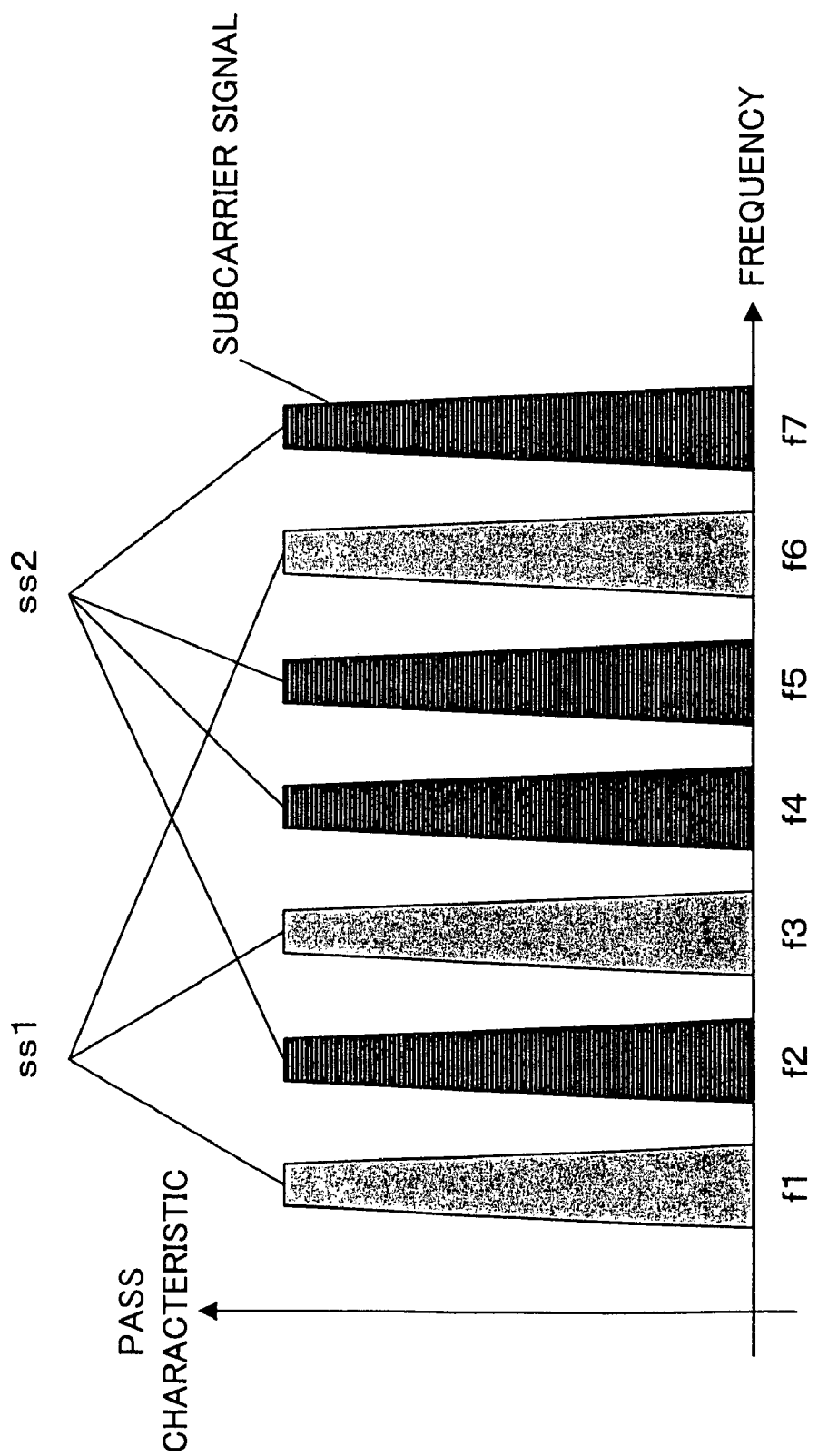
FIG. 17 is a figure showing a relationship between a subcarrier and a code according to embodiment 3 of the invention.

Embodiment 1 was explained to implement communication to attach the same symbol on all the subcarriers assigned to one channel. However, in the case a plurality of subcarriers are assigned to one channel, there is no need to send the same symbols to all the subcarriers assigned. FIG. 17 shows a relationship between a subcarrier and a code. The example shown in FIG. 17 shows a state that subcarrier f1-f7 are assigned to a certain channel. Meanwhile, this figure represents that symbol set ss1 is used in transmission for subcarriers f1, f3, f6 while symbol set ss2 is used in transmission for subcarriers f2, f4, f5, f7.

In the below, explained is a communication system for transmission of binary data. This system includes at least two symbols (s1, s2). Provided that the relationship of symbols (e.g. s1←c1, s2←c2) to be assigned to transmitting codes (c1, c2) is assumed as a symbol set, it is possible in this case to consider a symbol set of (s1←c1, s2←c2) and a symbol set of (s2←c1, s1←c2) (the former is assumes as a symbol set ss1, the latter is assumed as ss2). The transmission apparatus 150 obeys the definition of symbol set, to generate and transmit a symbol corresponding to a subcarrier from the transmission data. Conversely, the reception apparatus 151 obeys the same definition of symbol set, to determine the reception data by means of a combination of symbols received by each subcarrier. The conversion method of symbol set is explained more concretely. Considering symbol c1 as +1 and code c2 as −1 in the symbol set example referred before, it can be seen realizable if +1 is multiplied on the transmitting code in concerned with symbol set ss1 and −1 on the transmitting code in concerned with symbol set ss2. Particularly, the multiplication between sets +1 and −1 is known configured by exclusive OR. It is possible to extremely easily change different symbol sets on a subcarrier-by-subcarrier basis.

Although the above explanation was on the assumption that there are two symbols in the communication system to transmit binary data, this is not limitative. It is satisfactory to provide the same modulation scheme (phase modulation, time modulation, amplitude modulation or the like) to each symbol set. A plurality of modulation schemes can coexist on the same channel; Meanwhile, practical application is possible with two or more symbol sets.

In this manner, by allowing a plurality of modulation schemes to coexist, a communication system with greater flexibility can be architected. Besides, the features different between modulation schemes can be well made use of.

Figure 18:
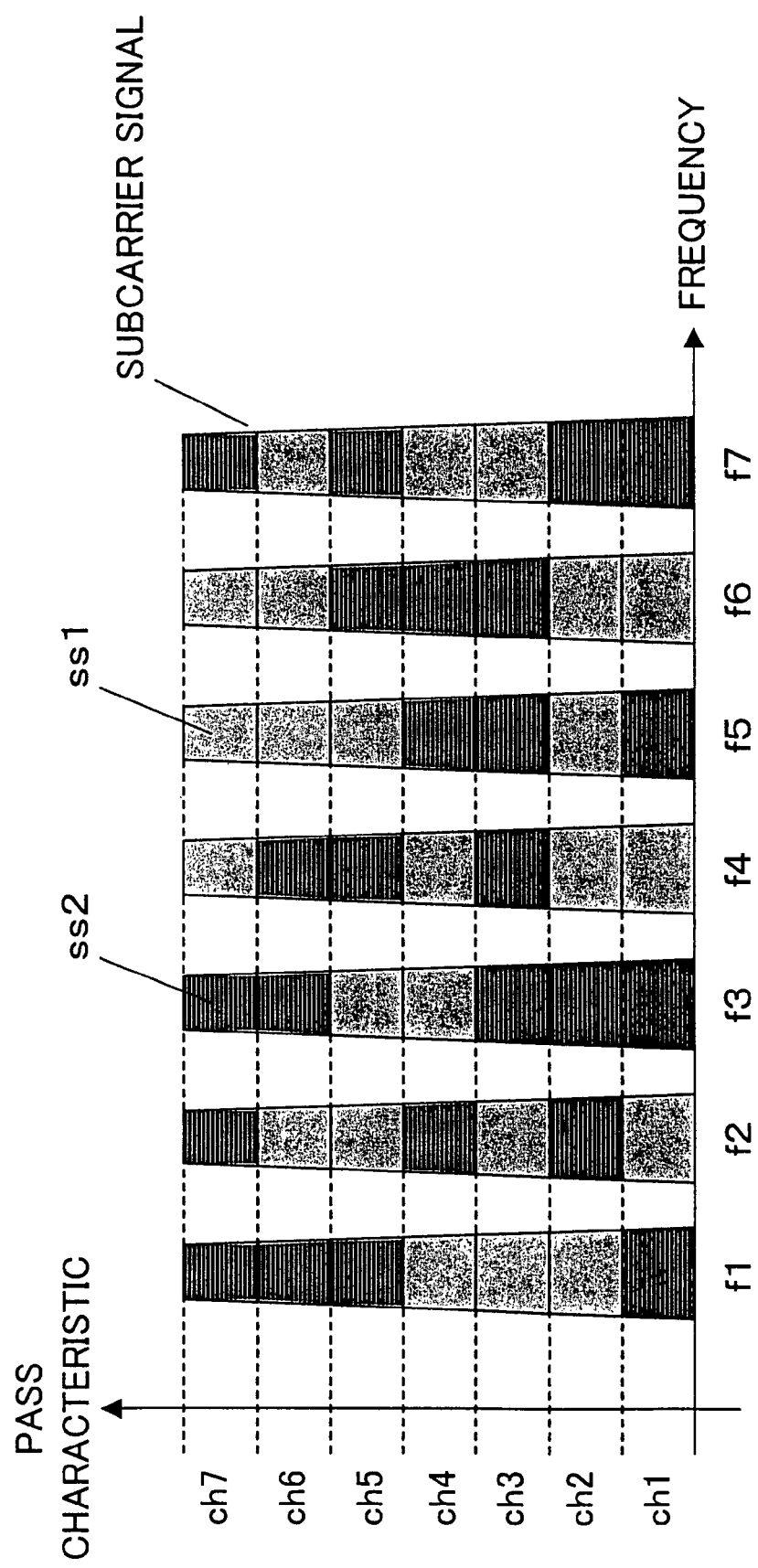
FIG. 18 is a figure showing a code division multiplexing according to embodiment 3 of the invention.

Meanwhile, code division multiplexing can be effected by use of a predetermined subcarrier. Explanation is made by using FIG. 18. FIG. 18 shows a state seven subcarriers (f1-f7) are assigned for code division multiplexing. For simplicity, explanation is by use of the foregoing symbol sets (ss1, ss2) and codes (c1=+1, c2=−1). Here, it is assumed that symbol sets ss1, ss2 uses the same modulation scheme wherein definition is made as (s1←c1, s2←c2) in ss1 while (s1←c2, s2←c1) in ss2. By the definition in this manner, consideration can be in a way as if it were the same configuration as multiplication of a spread code in a carrier direction. Taking symbol set ss1 as +1 and ss2 as −1 and applying those to FIG. 18, spread codes (assumed ss1-7) are given as in the following:

channel 1: sc1={−1, +1, −1, +1, −1, +1, −1}
channel 2: sc2={+1, −1, −1, +1, +1, +1, −1}
channel 3: sc3={+1, +1, −1, −1, −1, −1, +1}
channel 4: sc4={+1, −1, +1, +1, −1, −1, +1}
channel 5: sc5={−1, +1, +1, −1, +1, −1, −1}
channel 6: sc6={−1, +1, −1, −1, +1, +1, +1}
channel 7: sc7={−1, −1, −1, +1, +1, +1, −1}.

Meanwhile, explanation is based on the assumption that the reception apparatus 151 is to demodulate channel 1.

The transmission apparatus 150 makes a spreading in the carrier direction by use of diffusion codes sc1-sc7 set on a chanel-by-chanel basis, to transmit signal through multiplex by a predetermined number of channels (seven, here).

Figure 9:
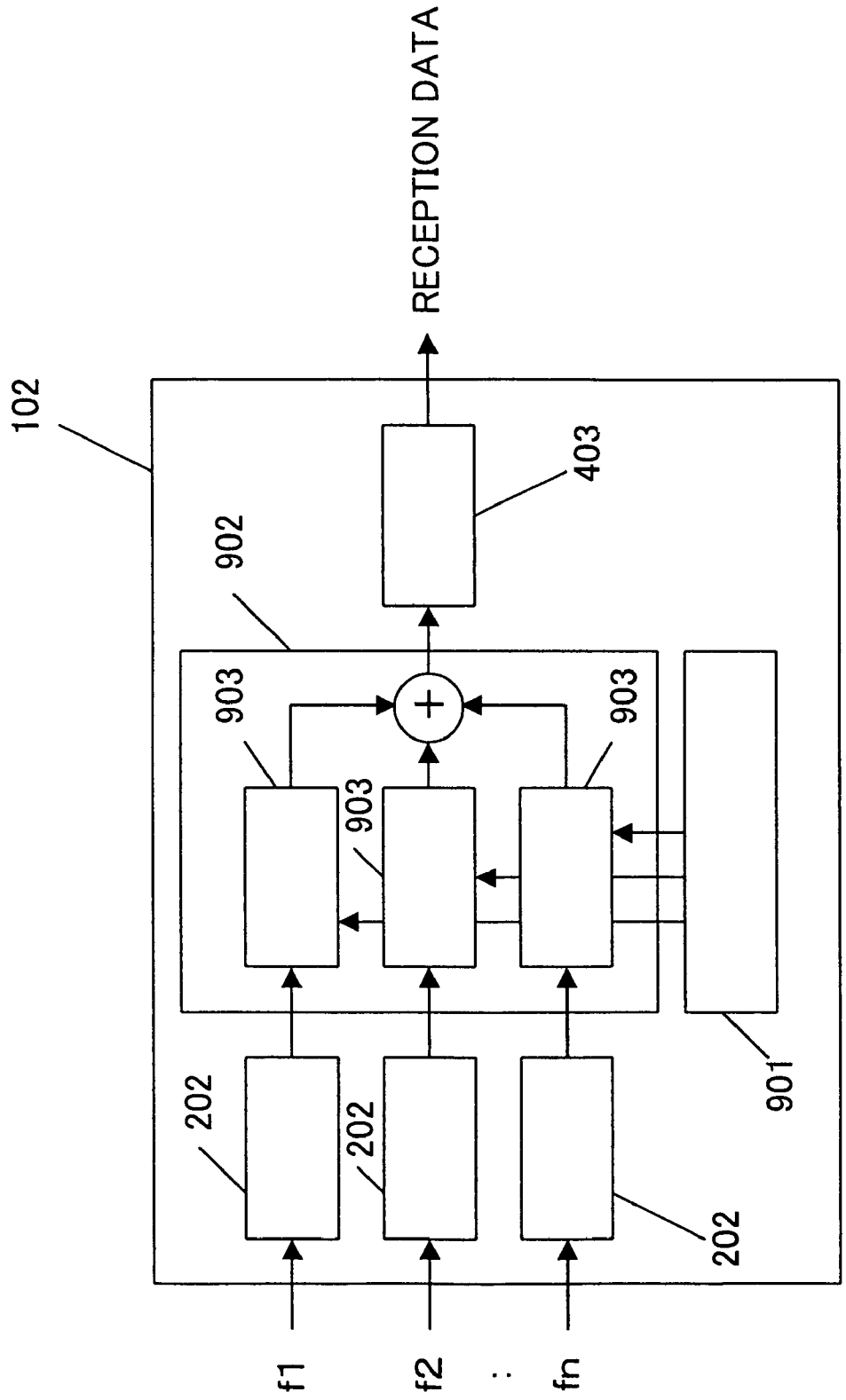
FIG. 9 is a figure showing an arrangement of a reception modulator corresponding to spread communication according to embodiment 3 of the invention.
Figure 10:
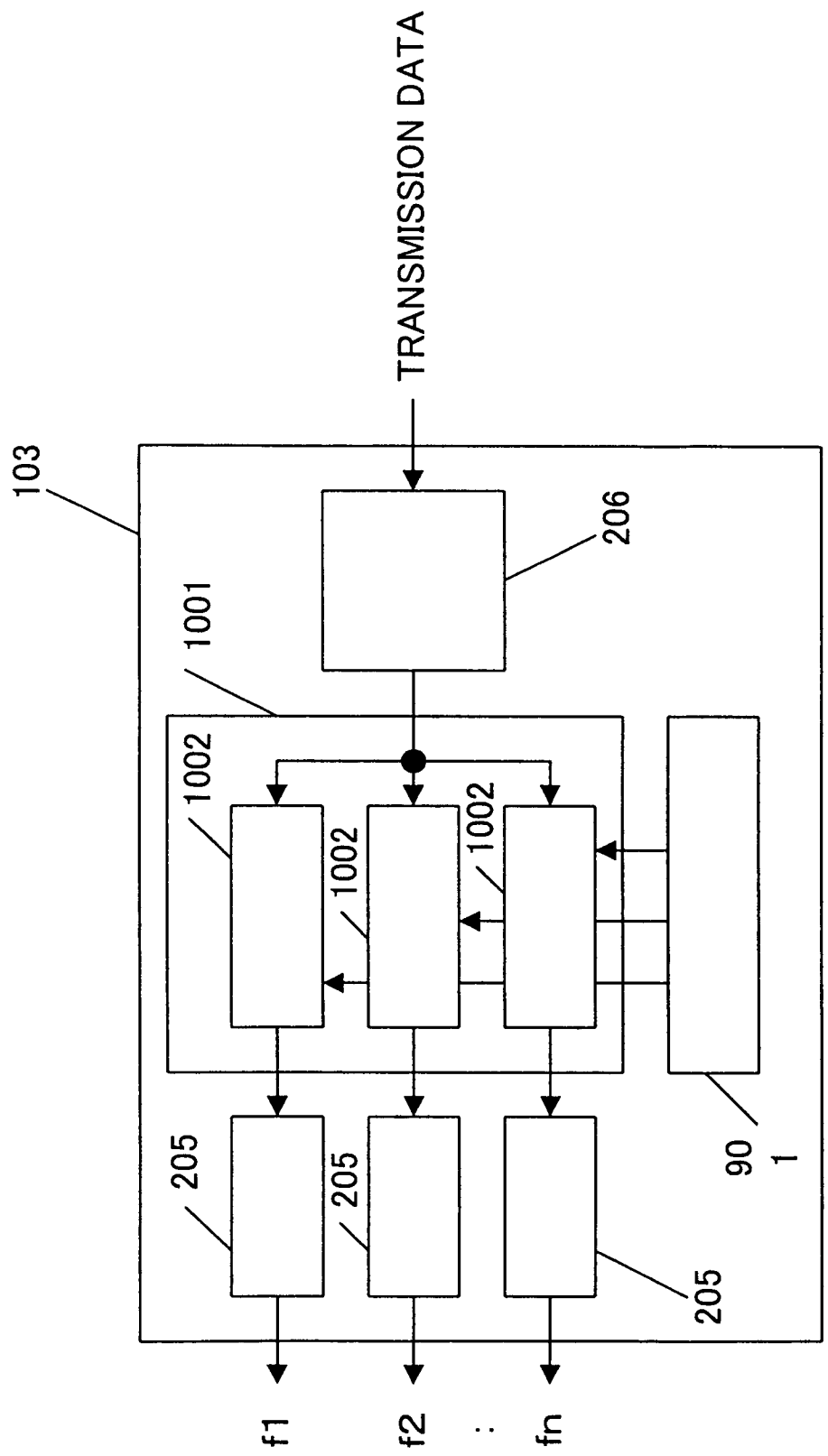
FIG. 10 is a figure showing an arrangement of a transmission modulator corresponding to spread communication according to embodiment 3 of the invention.

The method of spread is further explained by using FIGS. 9 and 10. FIGS. 9 and 10 shows in greater detail the reception modulator 102 and transmission modulator 103 of FIG. 2, wherein like reference is attached to like function.

In FIG. 9, the reception demodulator 102 comprises a reception section 202, a spread code storing section 901, a dispread section 902 and a detection section 403. 901 is a spread code storing section for storing and outputting a spread code set based on each channel, 902 is a dispread section for outputting a dispread communication signal synthesized by inputting a reception signal in an amount of the number of subcarriers and multiplying thereon a spread code corresponding to the subcarrier into synthesis.

In FIG. 10, the transmission modulator 103 comprises a transmission section 205, a spread code storing section 901, a spread section 1001 and a waveform generation section 206. 1001 is a spread section for inputting a spread code and a waveform generated communication signal and multiplying a communication signal divided into subcarriers by the corresponding spread code and outputting a spread communication signal.

The operation of the reception demodulator 102 and transmission modulator 103 configured as above is explained in detail.

When transmission data is inputted to the transmission modulator 103, the waveform generating section 206 generates a symbol waveform corresponding to the data and outputs a communication signal. The communication signal is divided into communication signals corresponding to the subcarriers inputted to the spread section 1001. The communication signal divided is multiplied by a corresponding code of the spread code outputted from the spread code storing section 901, to thereby be output as a spread communication signal. The spread communication signals are subjected to power-amplification and the like by the corresponding transmission section and radiated through the antenna 101.

Meanwhile, the reception demodulator 102 inputs the spread reception signal of from the antenna 101. The spread reception signal is inputted in an amount of the number of subcarriers, those of which are power-amplified by the reception section 202. In the dispread section 902, the spread reception signal power-amplified is multiplied by and synthesized with a spread code corresponding to the subcarrier outputted by the spread code storing section 901, to be output as a dispread reception signal. This dispread reception signal is inputted to the detection section 403, detected and output as reception data.

As in the above, the transmission modulator 103 makes a spreading on a subcarrier-by-subcarrier basis according to a spread code. Meanwhile, the reception demodulator 102 makes a reception by similarly carrying out a dispread, thus having a conspicuous feature enabling code division multiplexing (CDM). Furthermore, privacy communication is feasible by making code setting in a manner not known by the third person.

Although the above explanation made the method of making a spreading in the subcarrier direction, also possible are a method of making a spreading in a time direction or a method of making a spreading to both subcarrier and time. Meanwhile, it is possible to multiplex two or more channels by making a spreading of one symbol onto two or more subcarriers and two or more chips.

Embodiment 4

Explanation is made on the invention that the impulse modulation scheme is divided into two or more bands (subcarriers) so that communication is effected by sequentially changing the subcarrier for use in communication.

As for the reception demodulator 102 and the transmission modulator 103, those of FIGS. 9 and 10 are used in explanation similarly to embodiment 3.

Figure 6:
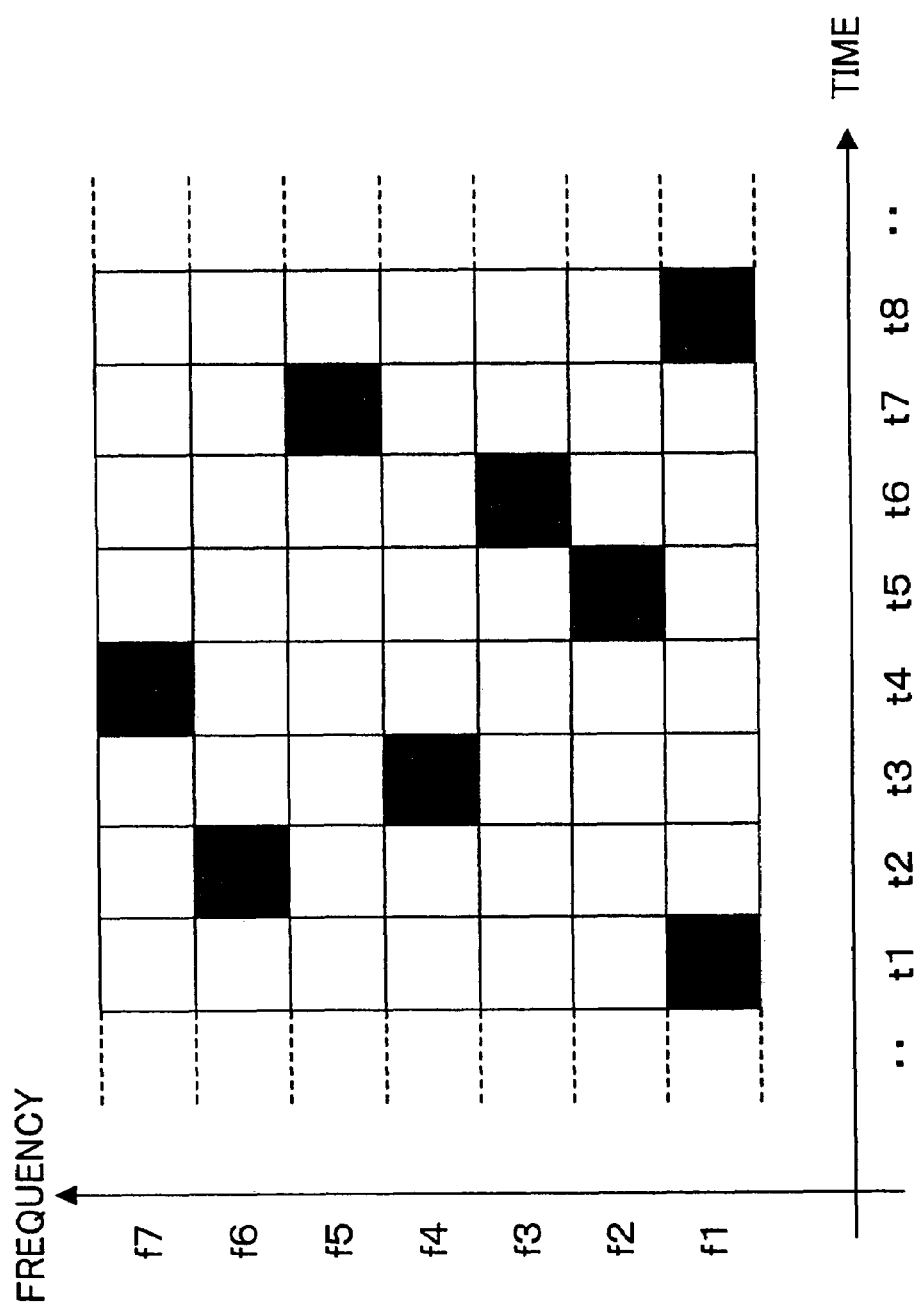
FIG. 6 is a figure showing a frequency hopping pattern according to embodiment 4 of the invention.

FIG. 6 is a figure explaining a hopping pattern that the subcarrier for use in communication is changed in order. There is shown a subcarrier change in a unit time by taking a time on abscissa and a frequency (subcarrier) on ordinate, showing that the hatched block is a subcarrier used in communication. Although the subcarrier changes with a constant period or according to a constant rule, this hopping pattern is shared by the transmission end and reception end.

The shared hopping pattern is stored in the spread code storing section 901 shown in FIGS. 9 and 10, wherein storage is with spread codes of +1, 0 instead of +1, −1.

By the above configuration, the transmission modulator 103 transmits a communication signal while changing the subcarrier in time. On the other hand, the reception demodulator 102 is to change the hopping pattern in time, thereby selecting and receiving a subcarrier which the transmission modulator 103 is using in communication. This enables to correctly receive data.

The above made an explanation on the example of communication using merely one subcarrier, with the method of which reception power is possibly insufficient. For this reason, effective is a method of simultaneously using a plurality of carriers in order to supplement the reception power at the reception demodulator 102. This is explained below by using FIG. 8.

Figure 8:
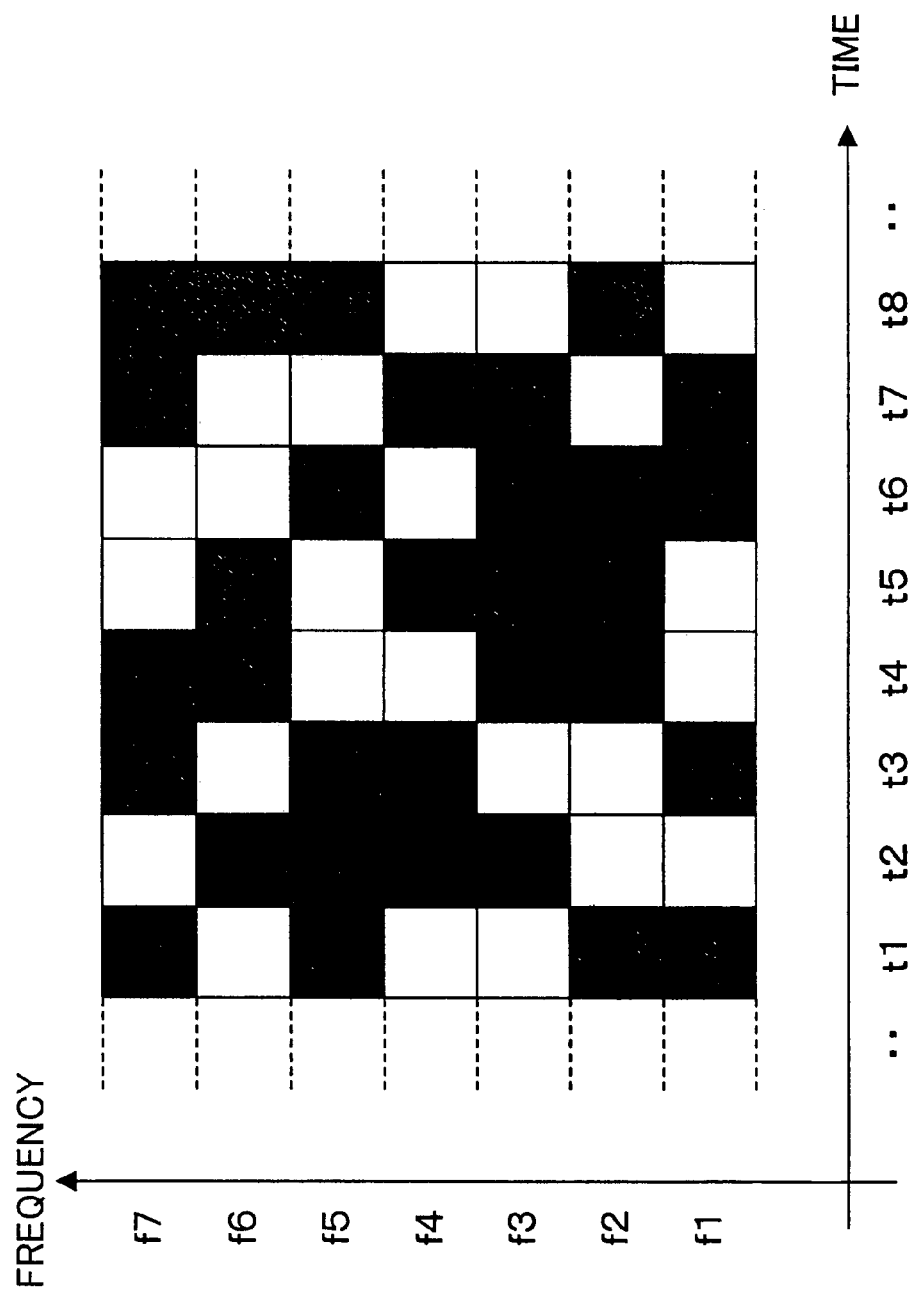
FIG. 8 is a figure showing a frequency hopping pattern according to embodiment 4 of the invention.

FIG. 8 is a figure showing a hopping pattern when a plurality of carriers are used simultaneously. Design is made to use four subcarriers in one unit time, providing four times the reception power at the reception demodulator 102. The operation of the transmission modulator 103 and reception demodulator 102, during communication, is the same as the foregoing explanation. However, the hopping pattern stored in the spread code storing section 901 has numbers +1 and 0 only (one +1 and six 0s in the former example, and four +1s and three 0s in the latter example).

By adjusting the number of subcarriers for use in communication as in the above manner, stable communication is made feasible. Meanwhile, by changing the number of subcarriers in time, subcarriers can be given smaller in the number in well communication condition while subcarriers be given greater in the number in worse cases.

Although the above made an explanation as to communication with one channel, a plurality of channels can be multiplexed similarly to embodiment 3.

Explanation is made below on a method of multiplexing a plurality of channels, by using FIG. 7.

Figure 7:
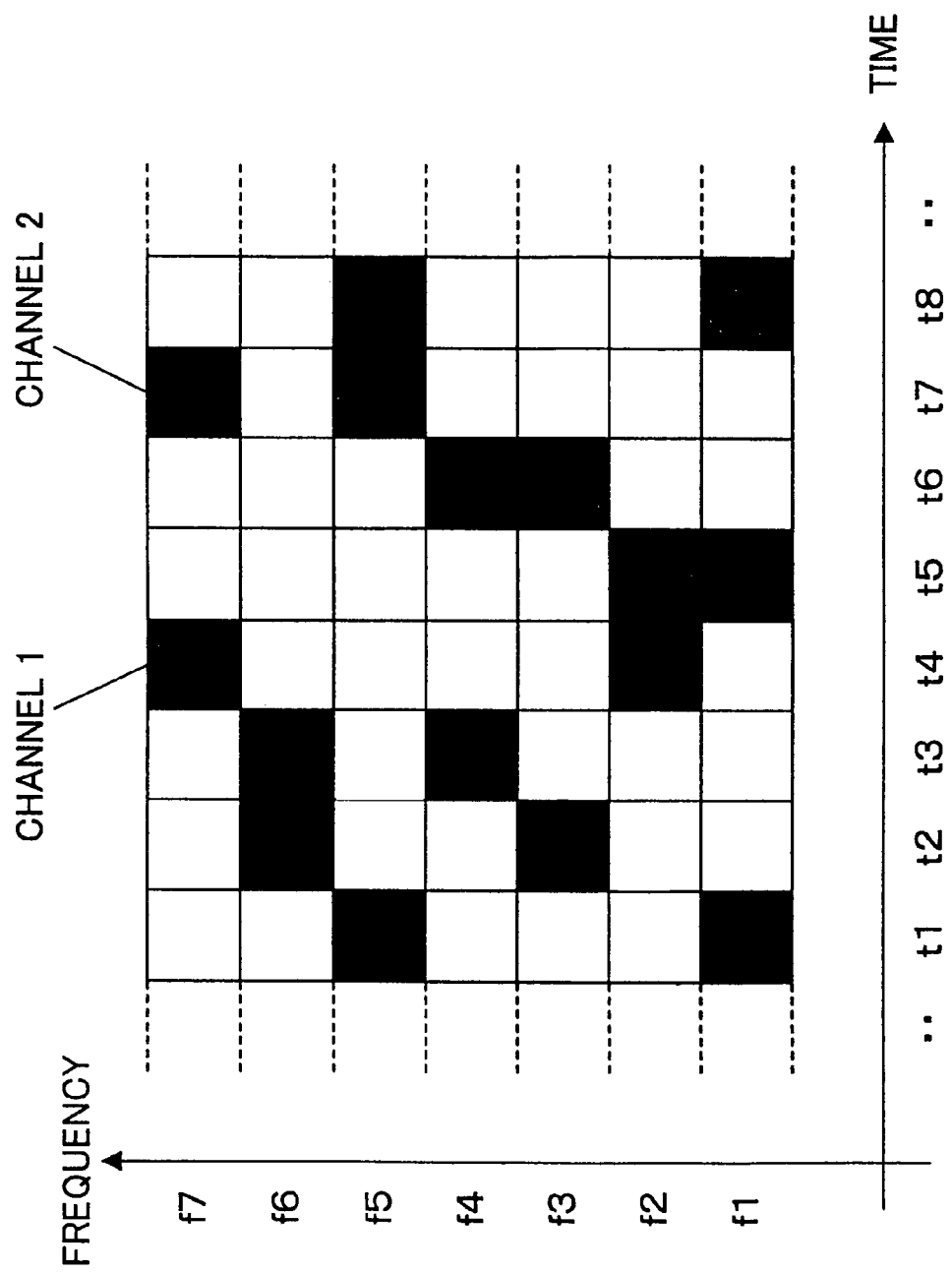
FIG. 7 is a figure showing a multiplexing based on frequency hopping according to embodiment 4 of the invention.

FIG. 7 shows a state that two channels are multiplexed by frequency hopping. Channel 1 and channel 2 shown in the figure make communications with using respective ones of subcarriers in unit time. The number of subcarriers per unit time can be changed on a channel or time basis.

By the above, a plurality of channels can be multiplexed to enable communication.

Embodiment 5

Figure 19:
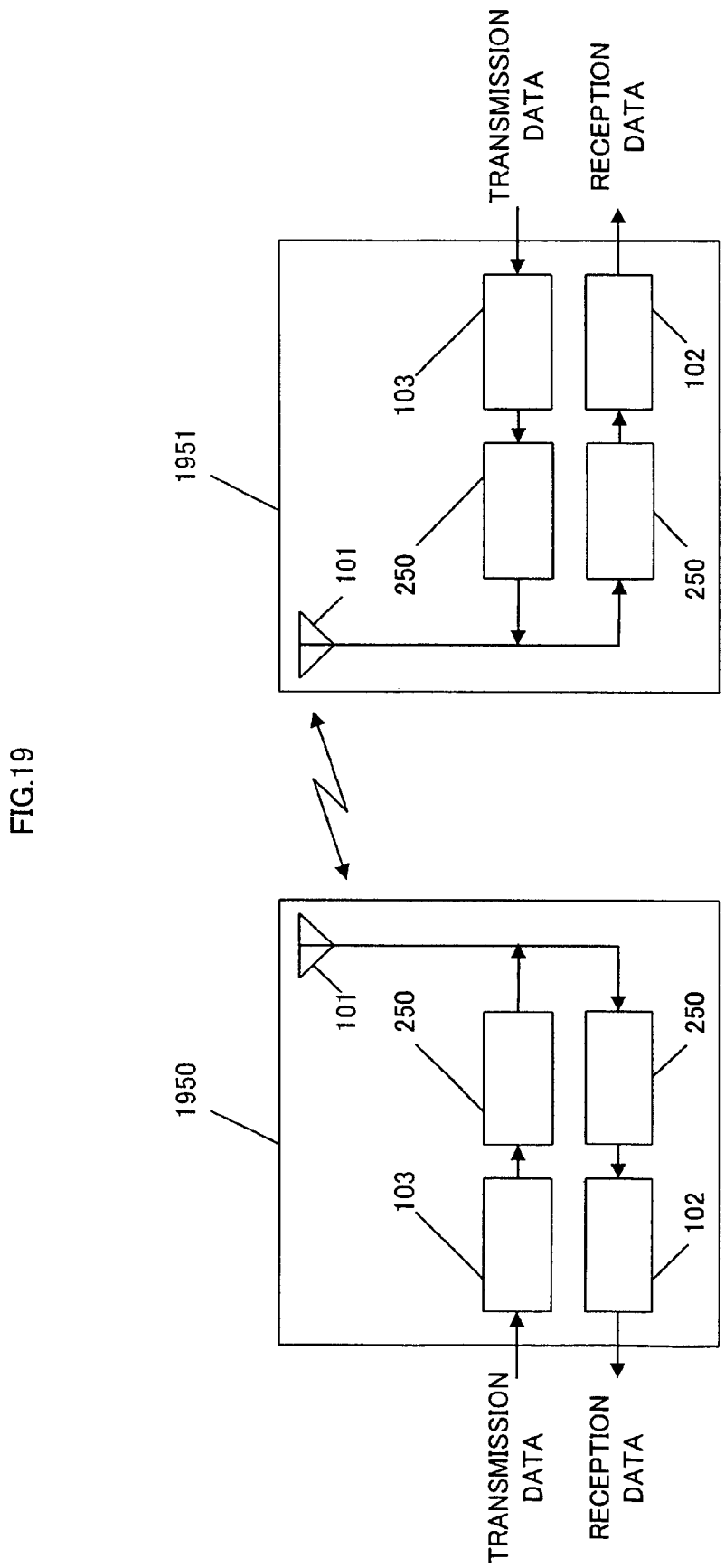
FIG. 19 is a figure showing an arrangement of a communication system according to embodiment 3 of the invention.

In the system shown in FIG. 19, explanation is made on a technique for realizing frequency division duplex (FDD) with use of subcarriers.

FIG. 19 shows a figure showing a system configuration comprising a communication apparatus having a bi-directional communication function. Although the figure takes a symmetric system as an example, it is satisfactory to use such an asymmetric system as 1-to-N. Meanwhile, for explanation, communication from a communication apparatus 1950 to a communication apparatus 1951 is explained as downlink while communication from a communication apparatus 1951 to a communication apparatus 1950 is as uplink, those communication directions are not to limit the substance of the present technique.

Figure 20:
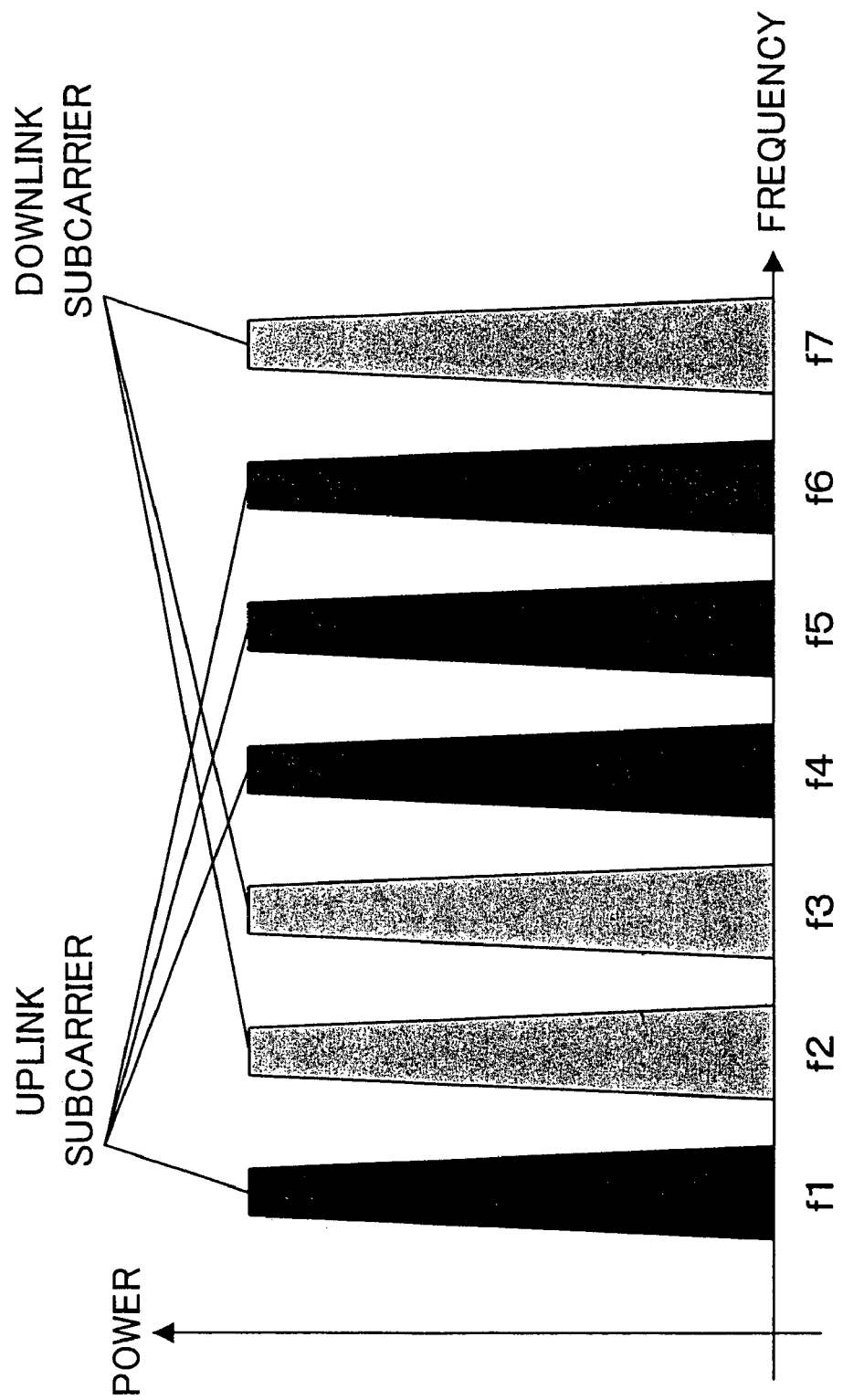
FIG. 20 is a figure showing a frequency allocation according to embodiment 5 of the invention.

For example, FIG. 20 shows a subcarrier on-frequency allocation. This shows a manner of coexistence of uplink subcarriers and downlink subcarriers, showing a manner that frequency division duplex can be carried out without problem because channel orthogonality is held by the subcarriers. Where to make a communication with one carrier without the use of subcarriers, there is a need to carry out it with time division. In this case, control is required not to cause time overlap. With frequency division, time division control becomes unnecessary. Hence, realization is possible with simple configuration.

Figure 25:
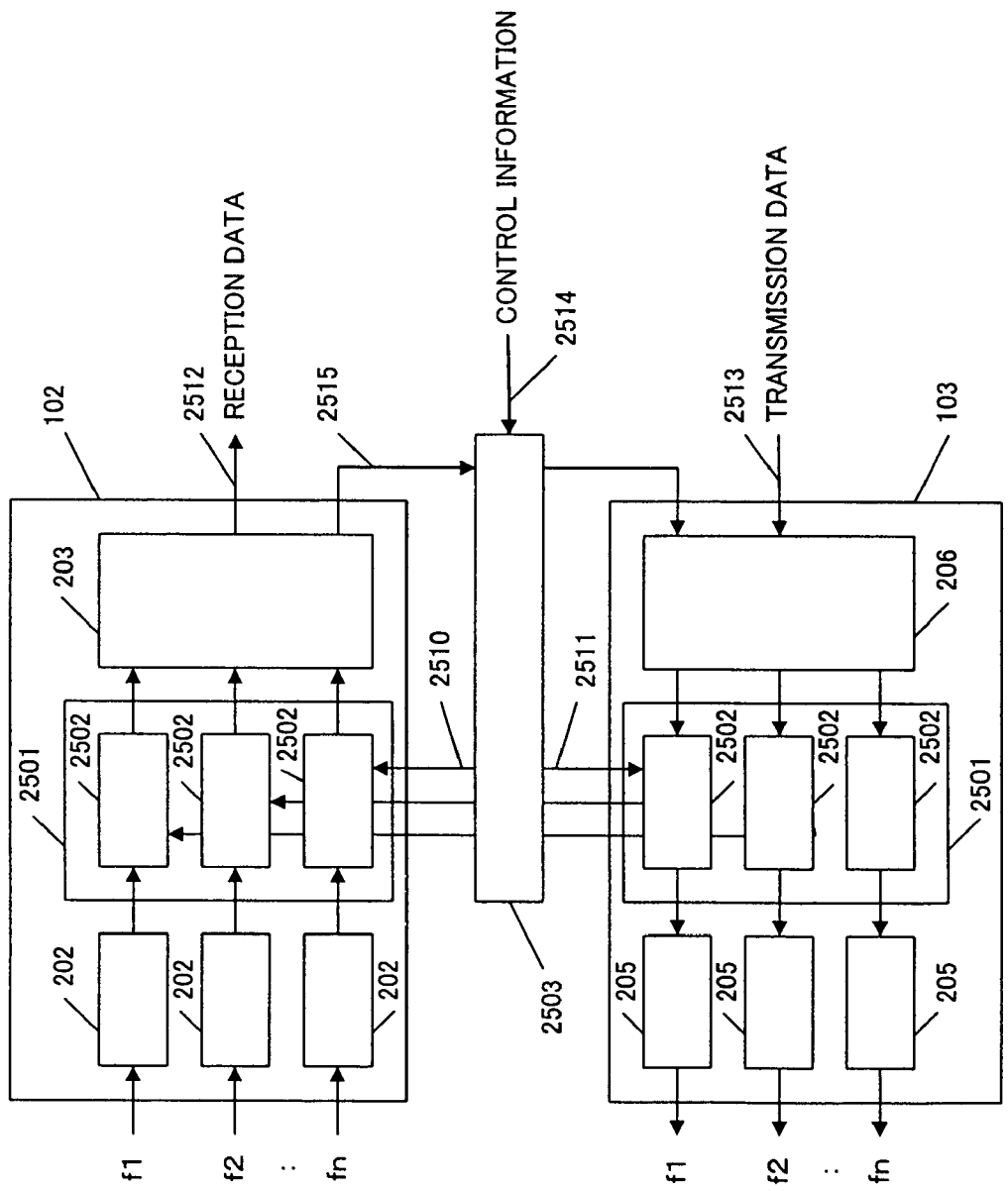
FIG. 25 is a figure showing an arrangement of a transmitter/receiver apparatus according to embodiment 5 of the invention.

FIG. 25 is a showing of the communication terminals 1950, 1951 in greater detail. The communication terminal 1950, 1951 comprises a reception demodulator 102, a transmission modulator 103 and a carrier control section 2503. The reception demodulator 102 comprises a reception section 202, a switch section 2501 and a detection section 203, to input two or more subcarrier signals f1 to fn, input a carrier control signal 2510 and detect and output a signal of the corresponding carrier. The transmission modulator 103 comprises a waveform generating section 206, a switch section 2501 and a transmission section 205, to input transmission data 2513 and a carrier control signal 2511 and generates an impulse string corresponding thereto, thus outputting an impulse signal to the corresponding carrier. The carrier control section 2503 inputs control information 2514 and control data 2515 of from the reception demodulator 102, and outputs carrier control signals 2510, 2511 depending upon a carrier assignment sequence.

Explanation is made on a communication method for carrying out frequency division duplex by use of the communication terminals 1950, 1951 configured as above.

Figure 22:
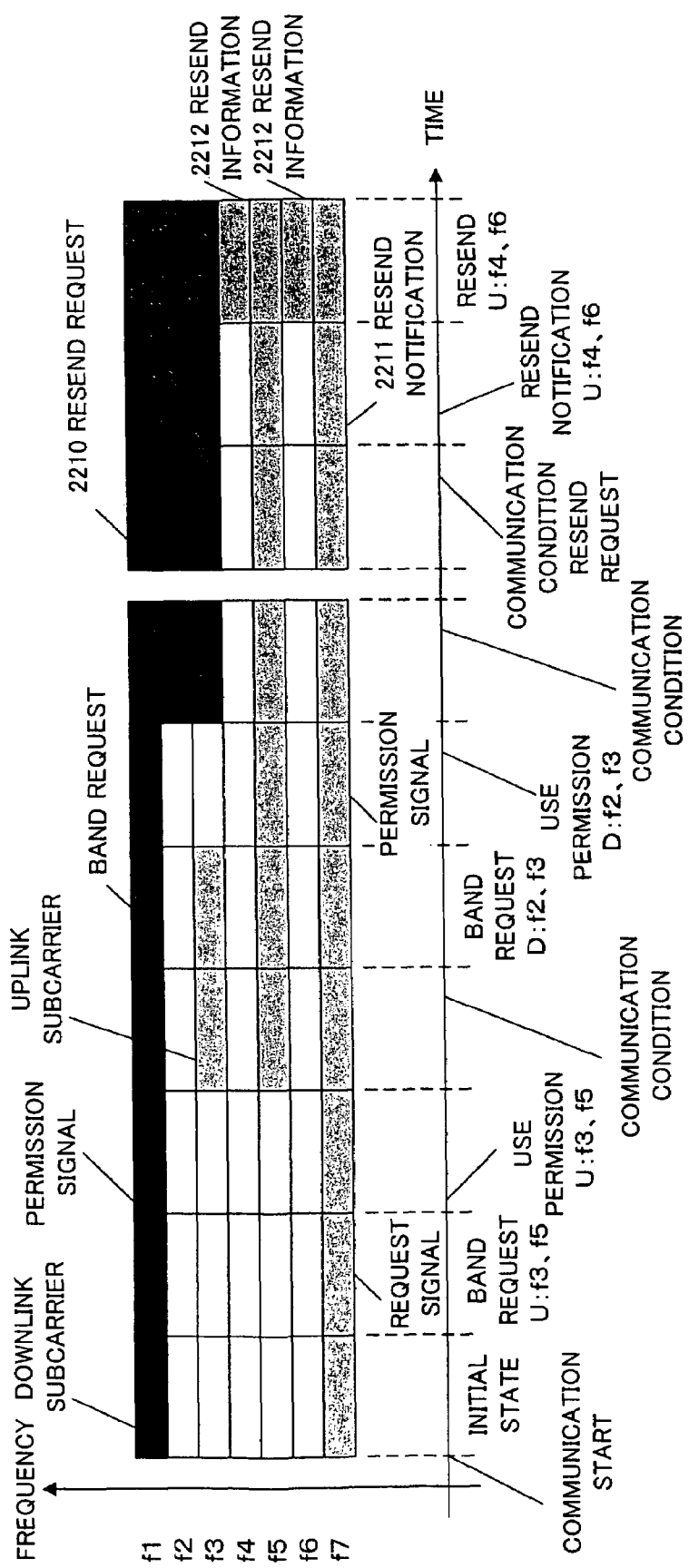
FIG. 22 is a figure showing a frequency assignment according to embodiment 5 of the invention.
Figure 24:
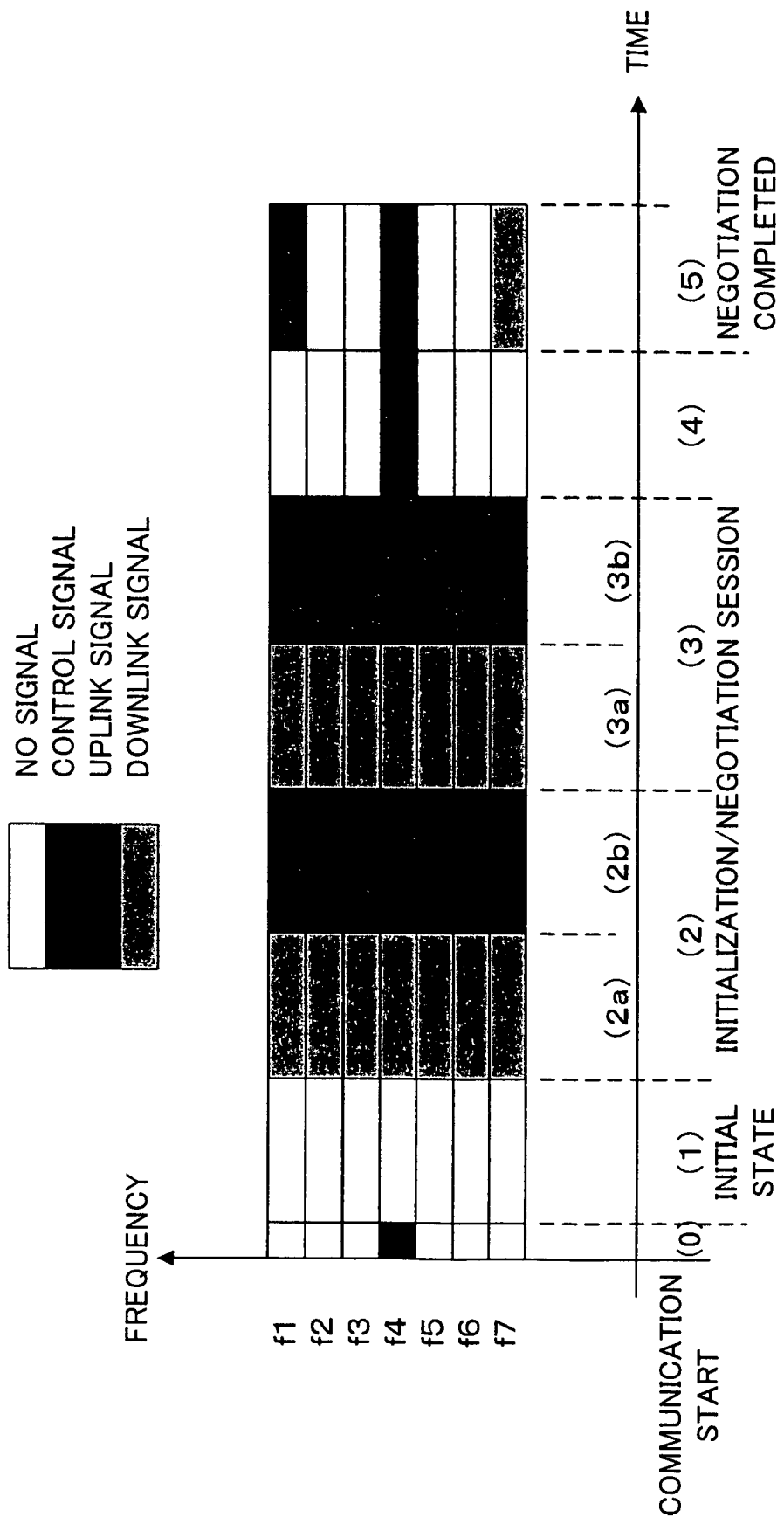
FIG. 24 is a figure showing an initial procedure according to embodiment 5 of the invention.
Figure 41:
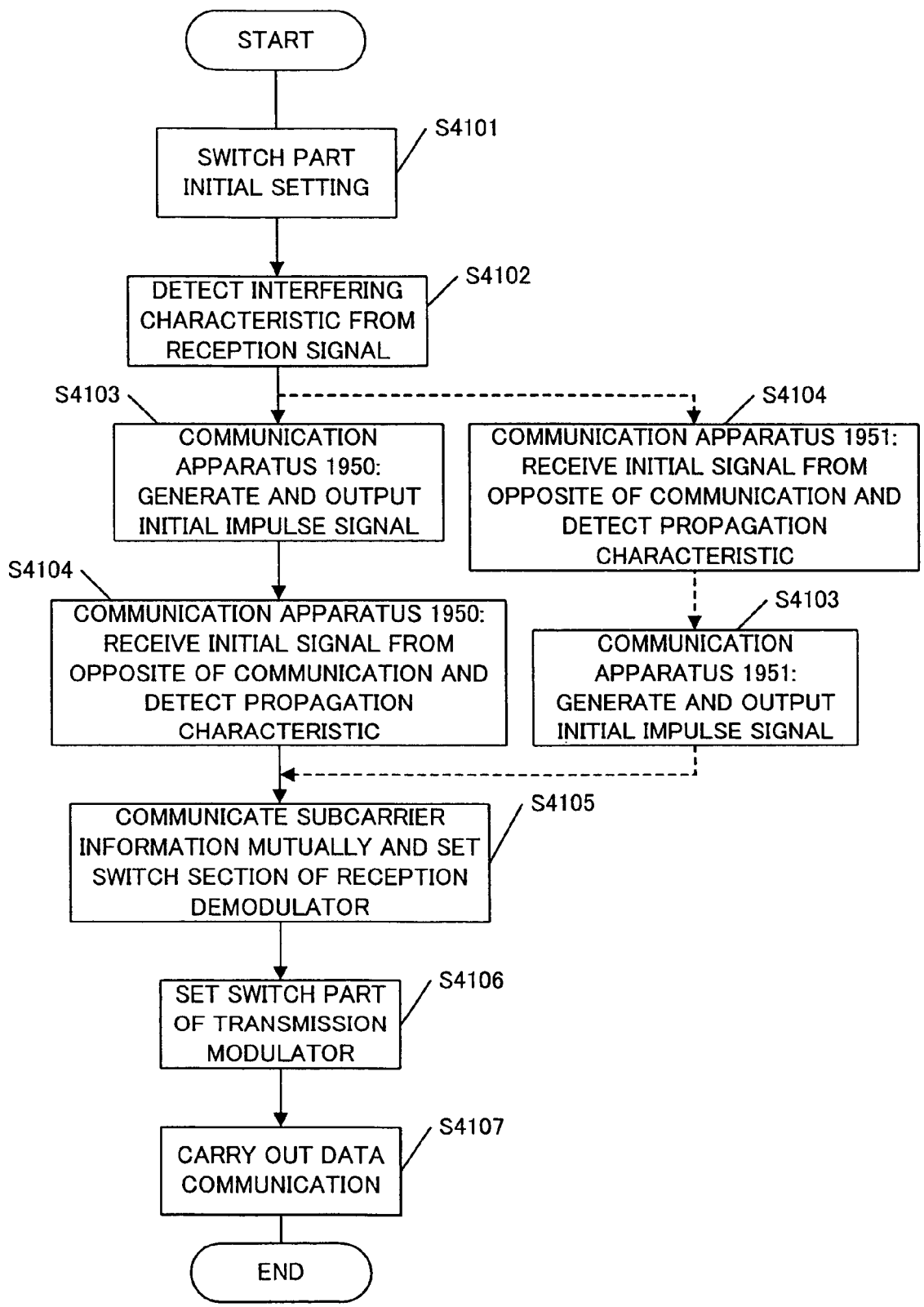
FIG. 41 is a flowchart showing a communication operation according to embodiment 5 of the invention.

FIG. 22 shows a frequency assignment sequence, showing the steps of management such as assignment/reallocation of a plurality of subcarriers. Meanwhile, FIG. 24 shows a sequence for initial setting FIG. 41 is a flowchart showing a communication operation of the present embodiment.

(Session 1) At first, in both the communication terminals 1950, 1951, the carrier control section 2503 sets a subcarrier for use in communication to an initial value, according to control information 2514. It is possible to consider, as the initial value, setting for assignable subcarrier all usable, setting usable assignable subcarriers excepting a predetermined particular subcarrier, and the like. The signal corresponding to a subcarrier selected in this manner is outputted to the switch section 2501 of the reception demodulator 102 and transmission modulator 103, thus determining switch status (step S4101).

Next, the signal received by the reception section 202 is inputted to the detection section 203 through the switch section 2501. The detection section 203 detects subcarrier-based reception power and outputs a result thereof as control data 2515 to the carrier control section 2503. The carrier control section 2503 records as communication-not-permitted carrier a carrier having reception power exceeding a predetermined value (step S4102).

(Session 2a) Next, in the communication terminal 1950, a predetermined initial signal is inputted as transmission data 2513, to generate a corresponding impulse signal through the waveform generating section 206. This impulse signal is selected of subcarriers by the switch section 2501 and outputted through the transmission section 205 (step 4103).

Meanwhile, in the communication terminal 1951, the initial signal is received by the reception modulator 102 and inputted to the detection section 203 through the switch section 2501. In the detection section 203, the initial signal as a known signal is used to carry out time synchronization, subcarrier-based characteristic compensation setting and subcarrier quality detection. In the case the quality does no reach a predetermined value, the corresponding carrier is recorded as incompetence for data communication (step 4104).

(Session 2b) Next, the operations of communication terminals 1950 and 1951 are exchanged to respectively make operations of steps S4103, S4104.

The above operation enables to know a use state of a frequency resource for use in communication. Namely, interfering immunity of from external system can be detected by session 1 and mutual-communication propagation characteristic can be by session 2a/2b.

Meanwhile, by including the terminal ID codes respectively included in the communication terminals 1950, 1951 and subcarrier information corresponding to apparatuses in the initial signal to be exchanged in session 2a/session 2b, the subcarrier usable in communication can be shared by the both terminals.

Depending upon the above detection result and terminal information, the carrier control section 2503 of the communication terminal 1950, 1951 determines an uplink/downlink subcarrier according to a predetermined rule. Thus, the reception modulator 102 of the communication terminal 1950 is set up with an uplink subcarrier while the transmission modulator 103 is set up with a downlink subcarrier. In the other communication terminal 1951, the reception demodulator 102 is set up with a downlink subcarrier while the transmission modulator 103 is setup with an uplink subcarrier. In a system for symmetric communication, because there is no distinction between uplink and downlink (symmetric), similar operation is enabled by temporarily setting uplink and downlink by a predetermined method (ID code magnitude).

(Session 3a) Next, the communication terminal 1950 transmits a determined downlink subcarrier. When the communication terminal 1951 receives the downlink subcarrier received, the information is inputted as control data 2515 from the detection section 203 to the carrier control section 2503. According to the control data 2515, set is the status of switch 2501 in the reception demodulator 102 (step S4105).

(Session 3b) The communication terminal 1951 transmits determined uplink subcarrier information similarly to session 3a. When the communication terminal 1950 receives the uplink subcarrier information, the information is inputted as control data 2515 from the detection section 203 to the carrier control section 2503. According to the control information, set is the status of switch section 2501 in the reception modulator 102 (step S4105).

Next, after the communications in sessions 3a and 3b, the both communication terminals sets the switch section 2501 in the transmission modulator 103, to downlink subcarrier in the communication terminal 1950 and to uplink subcarrier in the communication terminal 1951, thus completing the setting of uplink/downlink subcarriers (step S4106).

(Session 5) The communication terminals 1950, 1951 start a communication by use of the uplink subcarrier and downlink subcarrier (step S4107).

The above procedure enables subcarrier assignment. Because such a procedure if conducted enables to previously examine the interference characteristic with other systems prior to communication start, it is easy to grasp a subcarrier usable in communication. Simultaneously therewith, because subcarrier communication condition is examined between the communication terminals, it is easy to grasp a propagation status formed between the communication terminals. Finally, it is possible to easily select a subcarrier suited for communication.

Figure 21:
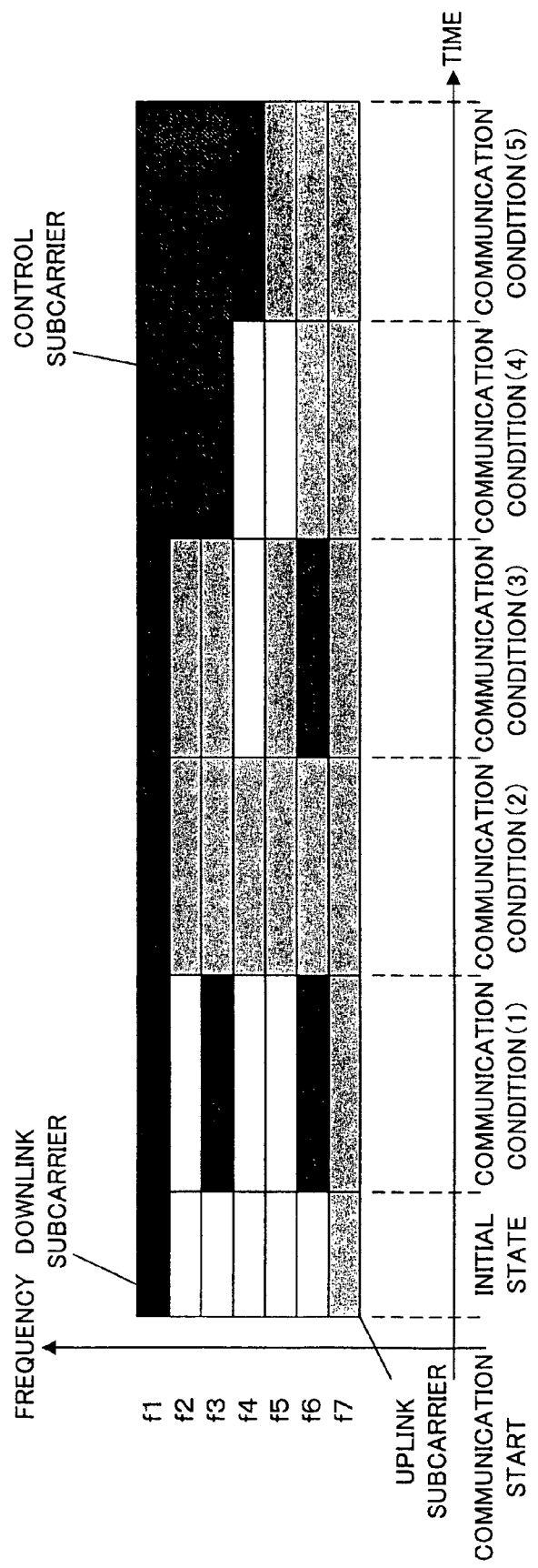
FIG. 21 is a figure showing a frequency assignment according to embodiment 5 of the invention.

As for subcarrier assignment methods, various methods are to be considered. This is explained using FIG. 21. The subcarrier assigned in the above initial state, when requiring a downlink (or uplink) band, can add and utilize free subcarriers f3, f6, as shown in communication state (1). By doing so, system flexibility can be secured by changing subcarrier utilization ratio in accordance with communication band. Further, because of no use of unnecessary band, power-saved communication is feasible that is high infrequency utilization ratio. Meanwhile, as shown in communication state (2), where uplink (or downlink) requires the maximum band, a communication system high in frequency utilization efficiency and maximum transmission capability can be architected by implementing communications by utilization of all the subcarriers determined usable in the subcarrier status examination conducted in the initial operation.

Meanwhile, as shown in communication state (3), when to desirably send at the maximum transmission capability, it is effective to leave at lest one subcarrier free as out of use in the uplink or downlink. This makes it possible to use the out-of-use subcarrier in exchanging control signals, exchanging resend information or the like, thus enabling higher-leveled control/quality management. Furthermore, as shown in communication state (4), there is a feature that control is made simple by allocating the subcarriers for assignment in the uplink/downlink according to a given rule. At this time, the rule can be considered to randomly assign the subcarrier numbers, to be assigned in the higher (or lower) order on the frequency axis, on the frequency axis thereby making an assignment in the order of the subcarrier number.

Figure 42:
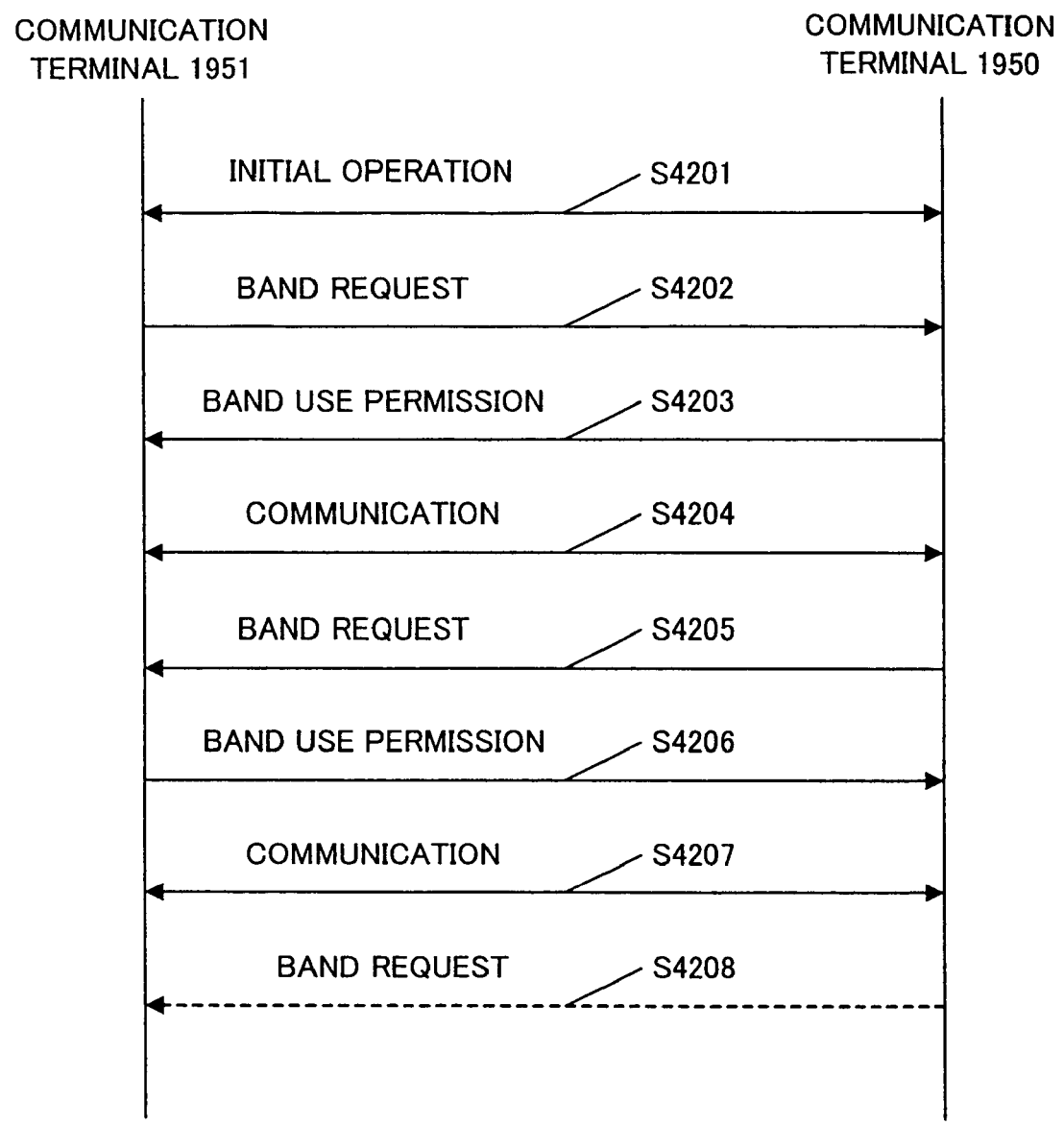
FIG. 42 is a sequence chart showing a communication operation according to embodiment 5 of the invention.

Although the method of band assignment was explained in the above, band assignment sequence is next explained by using FIGS. 22 and 42.

FIG. 42 is a sequence chart showing a communication operation according to the present embodiment.

In the initial state in FIG. 22, there is shown a state that subcarriers are assigned to uplink/down link by the initial operation (step S4201) shown at step S4101 to S4106.

Next, the communication terminal 1951, when requiring a transmission capacity, sends an uplink signal including a band request signal (step S4202).

Next, the communication terminal 1950, when receiving the band request signal, examines that a subcarrier requested is not in use. Then, it sends a downlink signal including a band-use permission signal and sets the corresponding subcarrier to a reception state (step S4203).

Next, the communication terminal 1951, when receiving the band-use permission signal, sets the permitted subcarrier to a transmission state and starts a communication (step S4204).

Likewise, the transmission terminal 1950, when requiring a transmission capacity, sends a downlink signal including a band request signal (step S4205).

Next, the communication terminal 1951 receives the band request signal and conducts an interference examination on the subcarrier requested. Confirming an interference of subcarriers as a result of examination, the communication terminal 1951 determines whether or not to release it. In the case to release, the interfering subcarrier is released and simultaneously a band-use permission signal included in an uplink signal is sent. Conversely, in the case not to release it, a band-use permission signal is generated in a manner to permit a part of band only, or in a manner to reject whole band required, to send an uplink signal including it (step S4206).

Next, the communication terminal 1950, when receiving the band permission signal, makes a switching over to the corresponding subcarrier and starts a communication (step S4207). In the case the band is rejected and the communication capacity is insufficient, a band request signal is again sent after a lapse of a predetermined time (step S4208).

Concerning the band request signal and band-use permission signal explained above, it is possible to exchange these signals with a designation of a subcarrier for increase and decrease. By providing control in this manner, a flexible system can be architected.

On the other hand, where subcarrier control is according to a given rule, the band request signal and the band-use permission signal can be exchanged solely to increase/decrease the number of subcarriers. By thus providing control, flexible system control is available with a reduced amount of information. Meanwhile, the band request signal can be added therein with use information. Namely, by including in a band request signal a use as numerical information about a degree of significance, urgent degree or scheduled use time or the like, a higher level of assignment operation is feasible.

Although band assignment procedure was explained in the above, there is a resend method as one technique for improving communication quality. Although this procedure can be grasped similarly, it may be a separate process if considering it as temporary use. A procedure rendered as a separate one is shown in the below.

The communication apparatus 1950, when confirming a trouble occurrence in transmission over the uplink, sends a downlink signal including a resend request signal 2210. The communication terminal 1951, when detecting a resend request signal 2210 out of the reception signal, looks for a free band and outputs a resend notification signal representative of resending by use of an out-of-use subcarrier. The communication terminal 1950, when receiving the resend notification signal 2211, sets the corresponding subcarrier into that for reception and starts to receive resend information. The communication terminal 1951, after a lapse of a predetermined time, puts the resend information 2212 onto the subcarrier designated before and carry out communication. After sending the resend information, it releases the subcarrier used for the same and returns to the former communication state.

Meanwhile, the communication terminal 1951, in the case there is no free band upon detecting a resend request signal 2210, determines to select as a subcarrier anyone of a subcarrier being used in the uplink or a subcarrier being used in the downlink, and sends the information thereof together with a resend notification signal 2211. The communication terminal 1950, when receiving the resend notification signal 2211, detects whether or not there is a necessity to release the subcarrier for downlink. In the case there is a necessity of release, the subcarrier is released and the same is set for reception. The communication terminal 1951, after a lapse of a predetermined time from sending of the resend notification signal 221, sends resend information by use of a corresponding subcarrier.

Concerning the resend request signal and resend notification signal explained in the above, exchange is possible by designating a particular subcarrier for resending. By providing control in this manner, a flexible system can be architected. Meanwhile, in the case that subcarrier assignment for resend information is previously set, signal exchange is possible without specifying a subcarrier in the resend request signal or resend notification signal. By providing control in this manner, flexible system control is possible with a reduced amount of information. Meanwhile, the resend request signal can be added therein with information as a use thereof. Namely, higher level of assignment operation is made possible by including, in the resend request signal, a significance and emergency of resending or a degree of scheduled use time as numeral information.

In the above, explained was the method of implementing a communication by assigning an uplink/downlink subcarrier. Generally, the communication system requires, separately from information for transmission, information for use in managing and control of those. It is possible to set such a subcarrier exclusive for control signals to be issued between communication terminals or from another terminal, separately from the uplink/downlink.

Explanation is made on session 0, session 4 and session 5 in FIG. 24.

(Session 0) The communication terminals 1950, 1951 notify to each other a communication start status by use of a control signal, as a preparation prior to the initial state (1). The communication terminal 1950 transmits a control signal representative of a communication start by the use of predetermined one or more subcarriers. The communication terminal 1951 receiving it makes a preparation for the initial state (1).

(Session 4) The communication terminals 1950,1951 notify a fact of subcarrier assignment completion, by the use of the control signal. The communication terminal 1950 notifies completion of the assignment of a subcarrier for use in communication, thus making a control such that the subsequent communication is carried out by use of the assigned subcarrier.

(session 5) The communication terminals 1950, 1951 notify a negotiation completion to each other. This is assigned with at least three subcarriers for uplink, downlink, and control, to carry out a communication between the communication terminals 1950, 1951.

The above procedure enables subcarrier assignment. By thus assigning subcarriers for control, control information can be exchanged without having an effect upon information conveyance of from another system in the course of communication or upon transmission capacity at between the communication terminals 1950. 1951. This enables to architect a stable communication system. Particularly, where constituted by three or more communication terminals, subcarrier request/assignment can be effected in a unitary fashion, hence enabling to easily architect an efficient high-performance communication system.

Meanwhile, subcarrier f4 can be assigned as a subcarrier for control. The operation in this case is explained by using FIG. 23.

Figure 23:
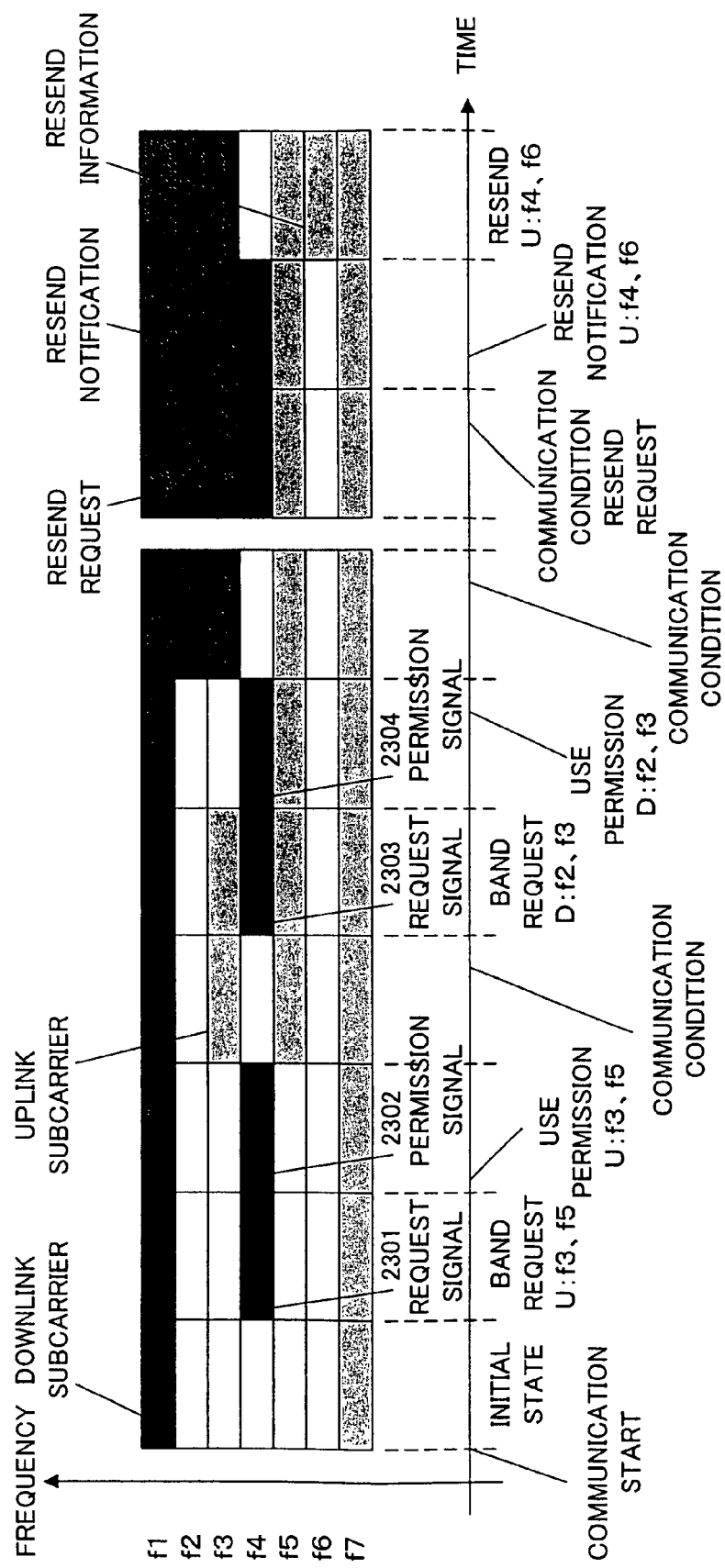
FIG. 23 is a figure showing a procedure for frequency assignment according to embodiment 5 of the invention.

In FIG. 23, this is the case similar to the foregoing embodiment except in that a request signal and permission signal are exchanged only by subcarrier f4. Due to this, control information can be exchanged at all times, hence eliminating the prohibition against request issuance until becoming free of a subcarrier.

Figure 26:
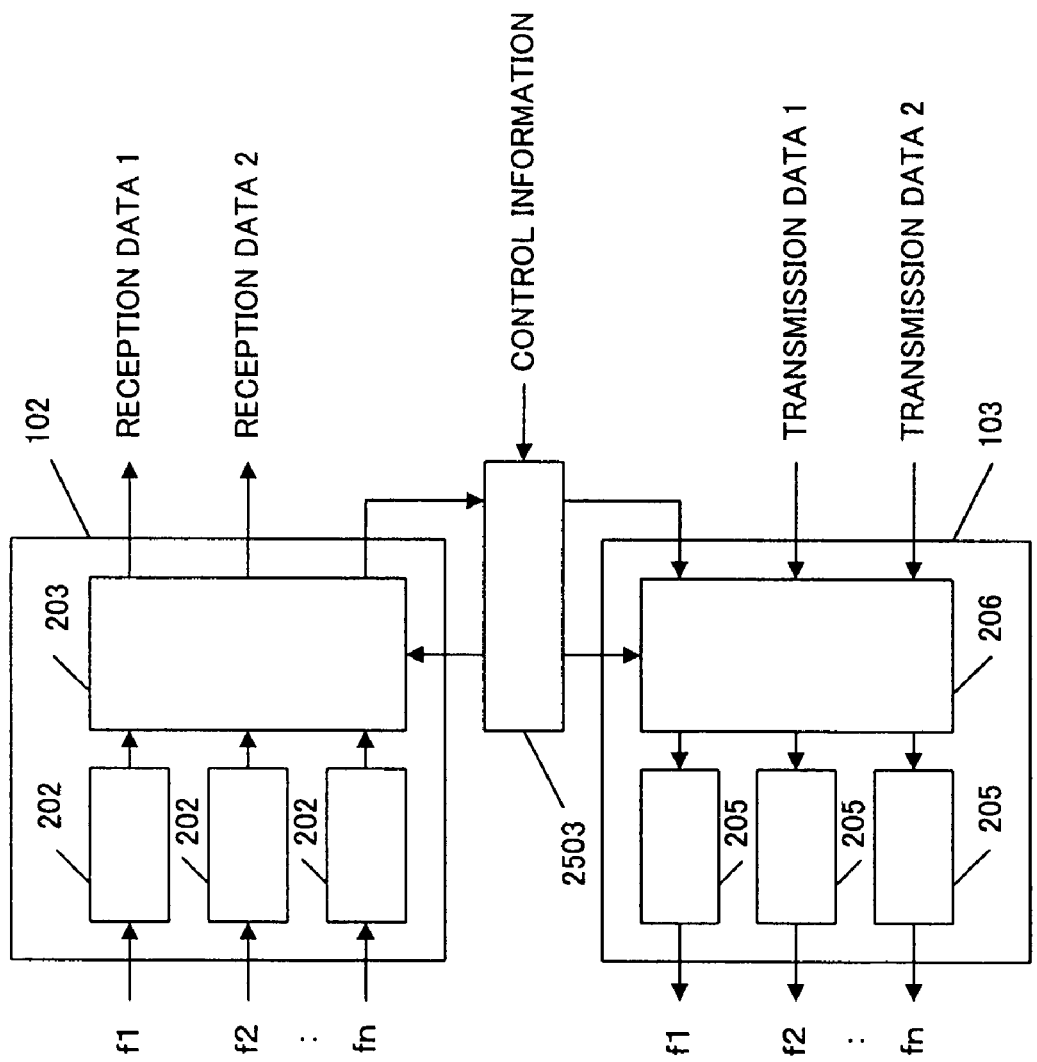
FIG. 26 is a figure showing an arrangement of a transmitter/receiver apparatus according to embodiment 5 of the invention.

Incidentally, the present embodiment explained the operation on the apparatus shown in FIG. 25. However, in case the sub-block concept as shown in embodiment 8 or subcarriers made be handled as independent signals separated in frequency by a filter, the switch section 2501 is rendered unnecessary thus enabling practical application with a simple structure as shown in FIG. 26.

Embodiment 6

Figure 43:
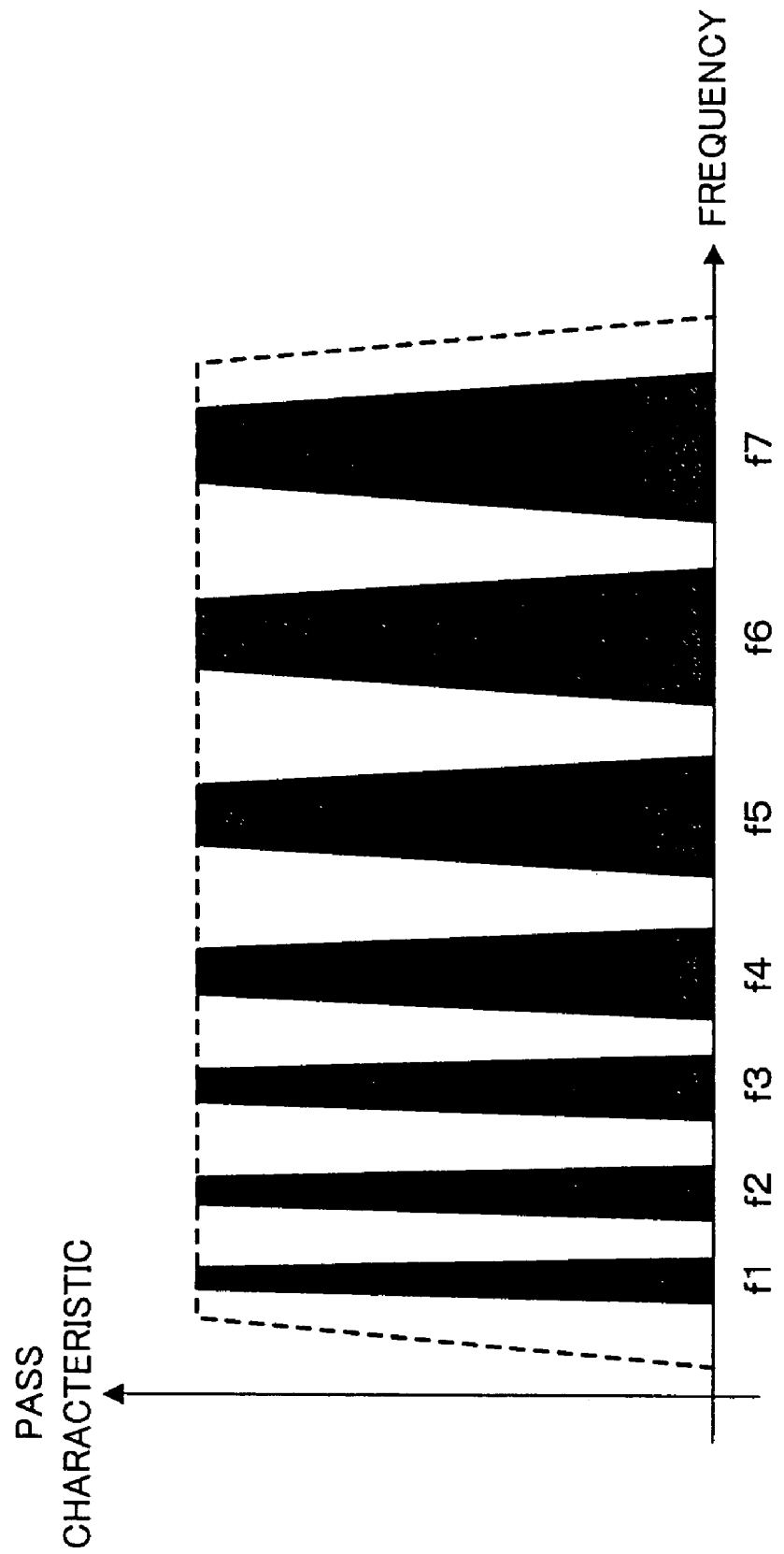
FIG. 43 is a figure showing a filter characteristic possessed by a filter section according to embodiment 6 of the invention.
Figure 44:
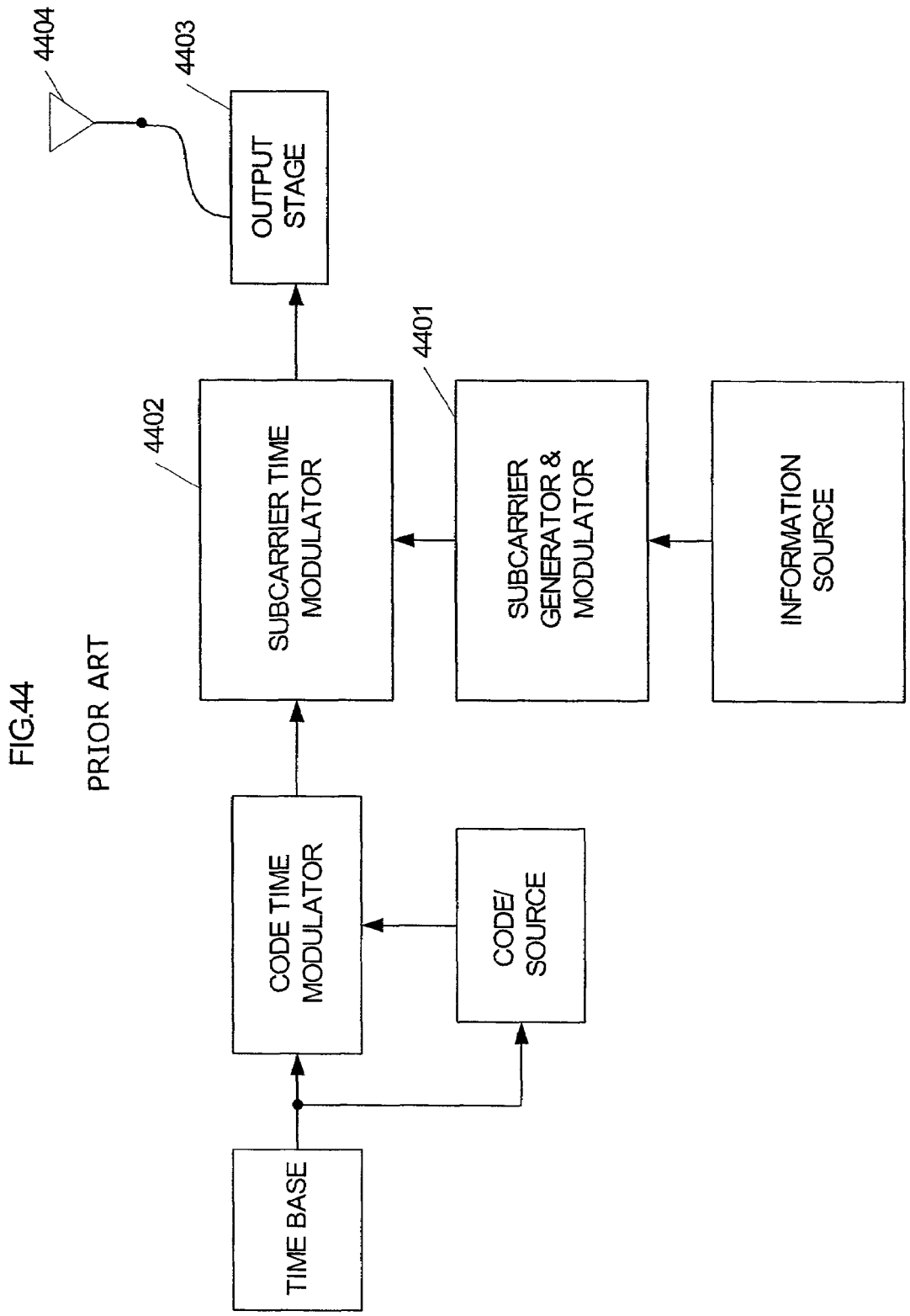
FIG. 44 is a figure showing an arrangement of a communication apparatus in the prior art.

FIG. 43 is a figure showing a subcarrier band characteristic in the present embodiment. This band characteristic is realized by the modulator 204 of the transmission apparatus and demodulator of the reception apparatus in the present embodiment. Excepting this point, this has the same configuration as embodiment 1.

In FIG. 43, the subcarrier having a higher center frequency is assigned with a broader band. This is because the subcarrier having a high frequency is limited in communication area and hence can be repeatedly utilized as compared to the lower subcarrier. Besides, because of high attenuation by the shields, it is characterized in that there is less leakage to the adjacent room (partition, building). In view of this fact, it can be considered efficient to assign a broadband. Namely, by assigning a broader band to a subcarrier having a high center frequency to thereby practicing higher-speed of communication, it is possible to easily architect a system high in (frequency, space) utilization efficiency.

In the case of information to be shared by some apparatuses such as control signals, system stability can be improved rather by keeping propagation condition well and selecting a subcarrier having a broader communication area. Namely, by assigning control information to a subcarrier lower in center frequency, a stable communication system can be provided. Meanwhile, in the lower frequency band, there is a high possibility that it is a frequency band to be used by other systems. (This is because it is a general practice to determine the frequency bands for use by a system in the order of from lower frequency.) In consideration of this, it is preferred to establish subcarriers in accordance with system's use (i.e. taking account of free channels) instead of setting control information to a subcarrier the lowest in center frequency.

As described above, a low-frequency subcarrier is assigned for communication requiring circuit quality, e.g. important information, control information and information transmission requiring communication quality. For the other of communication, higher-frequency subcarriers are assigned. This can easily provides the optimal allocation. As touched also in embodiment 1, by assigning a broader band to a subcarrier having a higher center frequency, higher-speed of broadband communication can be realized with the subcarrier.

Meanwhile, control information can be communicated by frequency hopping. This is because, where there are subcarriers stable in communication environment, there are increasing cases to enhance quality rather in transmission by a particular subcarrier. Furthermore, it is possible to use, in information, direct sequence technique in preparatory for an unforeseen event (e.g. sudden interfering signal issuance by another system (or apparatus)). Furthermore, the control signal frequently has information to be shared by some apparatuses. By multiplexing those by code division multiplexing or time division multiplexing, some control signals can be stably exchanged by the same subcarrier. In the other subcarriers than that used for the control signals, it can be considered to use frequency hopping or assign a given subcarrier in compliance with information kind. By thus making direct sequence communication by at least one subcarrier while carrying out frequency hopping communication by the remaining subcarriers, a flexible high-level communication system can be architected. Meanwhile, it is preferred, in view of the nature of control signal, to fixingly assign a control signal to one subcarrier and apply, to the subcarrier, spread (direct sequence) in time direction. This can architect a flexible stable communication system.

Although the above explained the event that frequency level appears as a difference in propagation characteristic, consideration may be made to the ratio of band to center frequency of a subcarrier, i.e. relationship in fractional band. For example, this includes that the filter having a large specific band is difficult to design or realize.

Meanwhile, even in the communication within the same space, the influence of multipath is quite different from subcarrier to subcarrier because of large frequency spacing. For this reason, in the initial stage of communication, it is possible to prevent against deterioration in communication quality by taking measures depending upon the influence of multipath including (1) reducing the communication capacity of an greatly influential subcarrier, (2) correcting errors more definitely, (3) not used in communication. In these settings, by examining of and adapting to the influence of multipath during performing communication besides in the communication initial stage, adaptation is possible more suitably to communication environment. This is similarly true for the influence upon a communication signal of from another system besides the influence of multipath.

Embodiment 7

Explanation is made on a method for architecting a flexible communication system by varying a subcarrier band or varying the redundancy of data, in a system for communicating an impulse modulation signal by use of subcarriers.

Embodiment 4 explained the technique for carry out frequency hopping based on each subcarrier. The frequency hopping technique can reduce the symbol rate on one subcarrier, making it possible to relieve the effect of multipath.

However, the space where electromagnetic waves propagate is generally constituted with some different propagation paths based on reflection, diffraction, transmission and the like. The difference in path length due to the difference of propagation path appears in the form of a difference in delay amount. It is expressed in delay dispersion by use of the delay time and attenuation amount. Because a reception signal is given as a synthetic result of delay dispersion and transmission waveform, different reception waveforms are observed by a propagation space formed between transmission/reception terminals.

Figure 33:
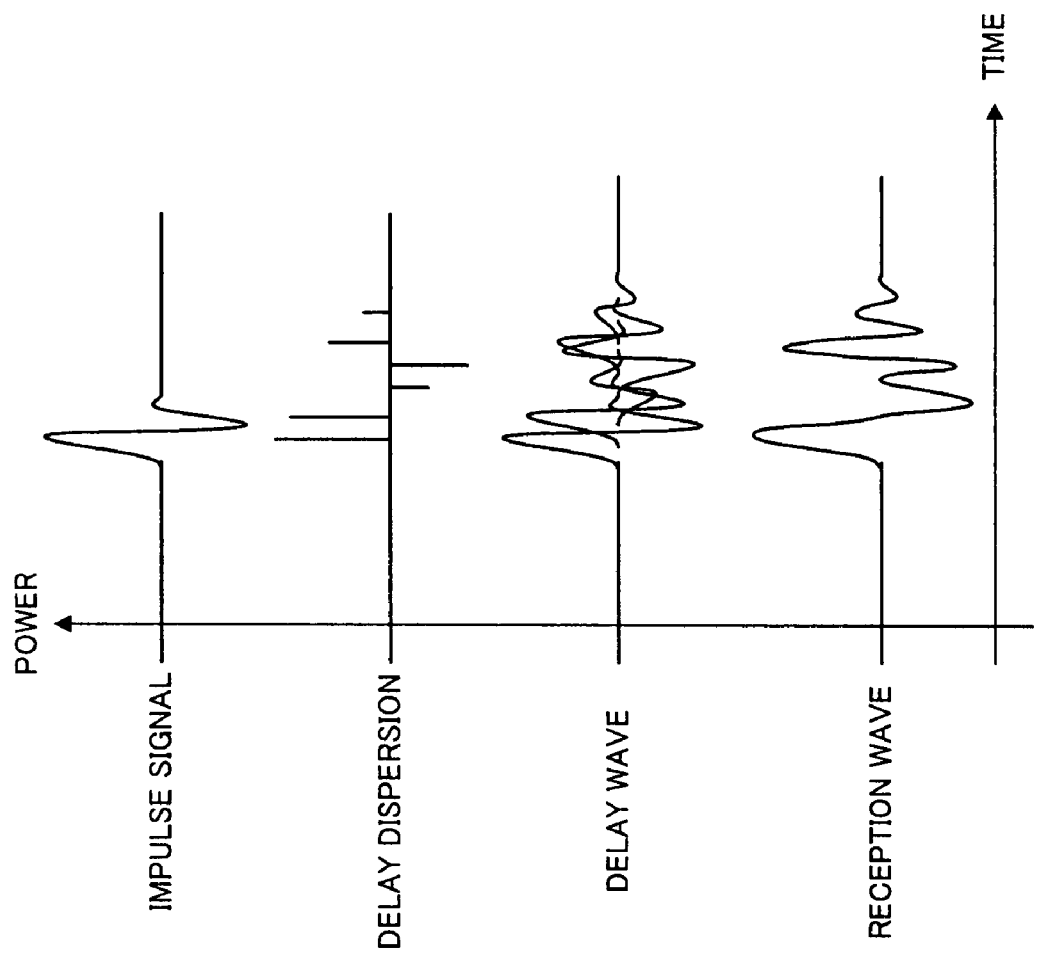
FIG. 33 is a figure showing the waveform of an impulse signal and reception signal according to embodiment 7 of the invention.
Figure 34:
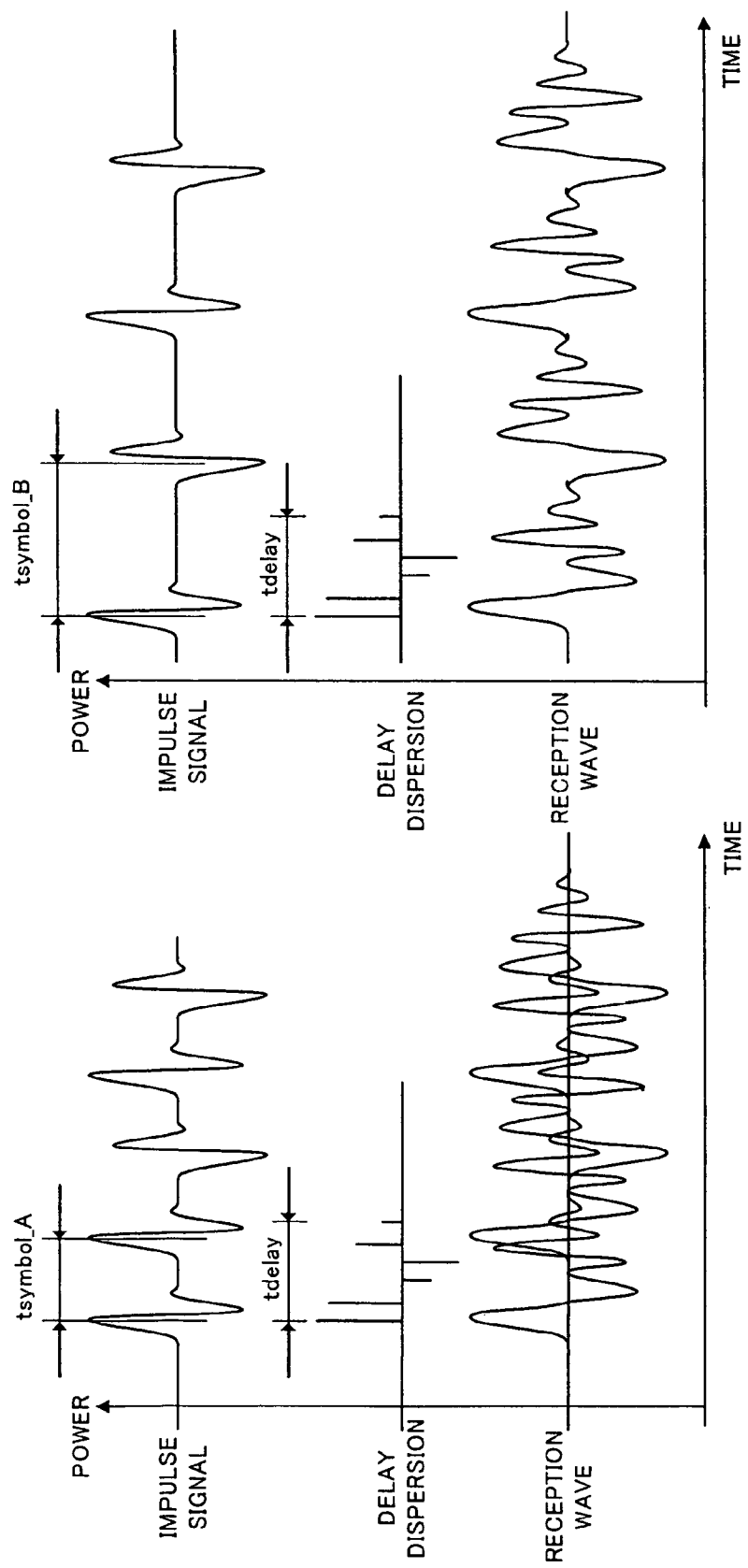
FIGS. 34A and 34B are figures showing the waveform of an impulse signal and reception signal according to embodiment 7 of the invention.

FIGS. 33 to 36 show signal waveform figures. FIG. 33 shows a relationship of a delay wave caused by the characteristic (delay dispersion) of a space where a transmission waveform (impulse signal) propagates and a reception wave as a synthesis thereof. As can be seen from the figure, it can be understood that an impulse signal having two peaks, if added with a delay dispersion characteristic, changes into a signal having a number of local peaks.

FIGS. 34A and 34B show relationships where an impulse string is inputted to the signal waveform of FIG. 33. The signal waveform of FIG. 34A and the signal waveform of FIG. 34B respectively depict reception waves where impulse interval (symbol rate) is given tsymbol_A and tsymbol_B (where tsymbol_A<tsymbol_B), respectively depicting, with superimposition, to see a relationship of a single-impulsed reception wave. As can be seen from the figure, in the case impulse interval is smaller than the maximum delay amount (tdelay) of delay dispersion, the reception waveform has an interference at between single-impulse signals, to turn into a complicated waveform difficult to demodulate. Meanwhile, in the case impulse interval is longer than the maximum delay amount, the reception waveform is a combination of single-impulsed signals. This can be understood demodulatable.

As in the above, it can be seen that a stable communication system can be architected by changing the symbol rate by depending upon a delay dispersion formed in a propagation space by the transmission terminal. Here, the method for the transmission terminal to determine a delay dispersion can be a method of calculation/estimation by use of a reception signal of from the opposite of communication, a method of conveying a status of a delay dispersion calculated by the opposite of communication onto the transmission terminal, and so on.

Figure 35:
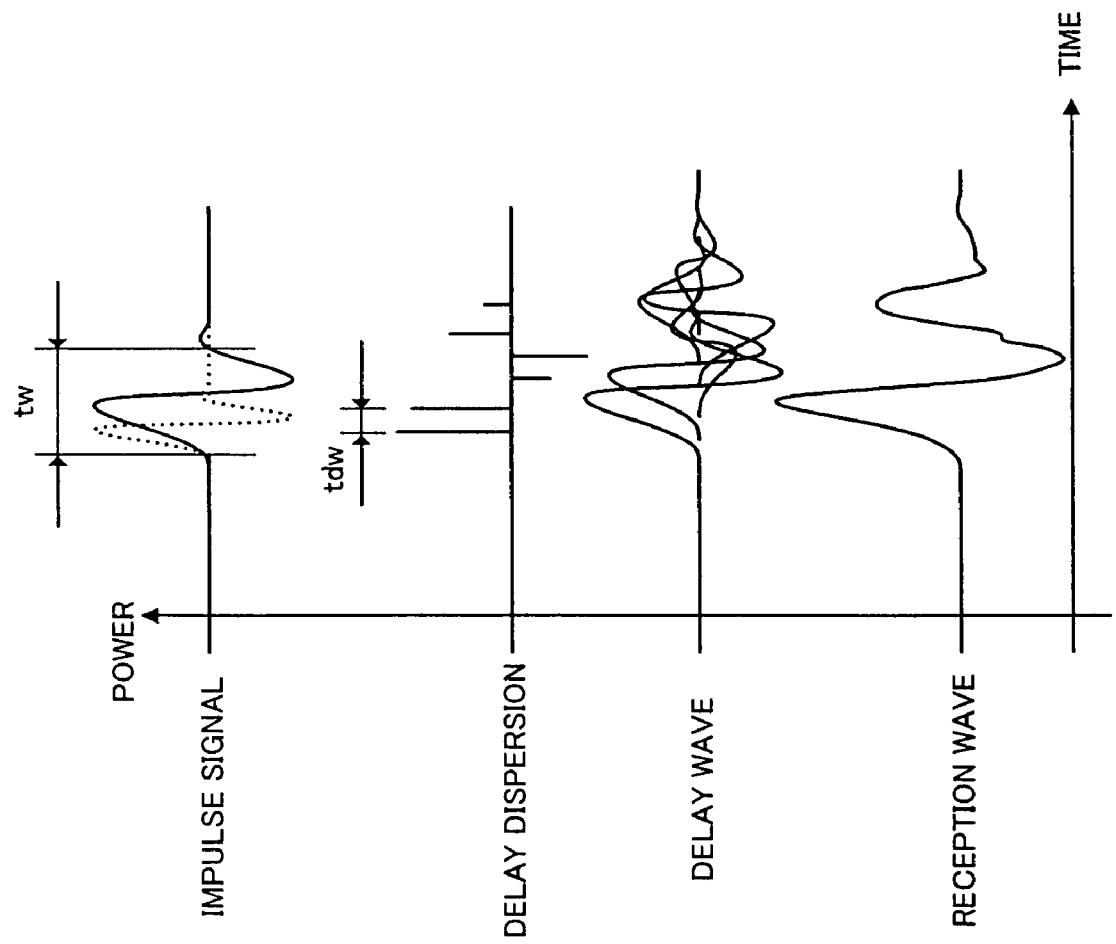
FIG. 35 is a figure showing the waveform of an impulse signal and reception signal according to embodiment 7 of the invention.

FIG. 35 shows a relationship between a delay dispersion and a delay wave and reception wave where the impulse width (tw) of a transmission waveform (impulse signal) is increased. Of the transmission waveform, the signal in the case with a short impulse width (the same condition as FIG. 33) is shown by a dotted line. In the case of long setting relative to a delay difference (tdd) and maximum delay amount (tdelay) of delay dispersion, it can be seen that, if observing a signal waveform of the reception wave, the number of local peaks is greatly decreased as compared to that of FIG. 33.

Figure 36:
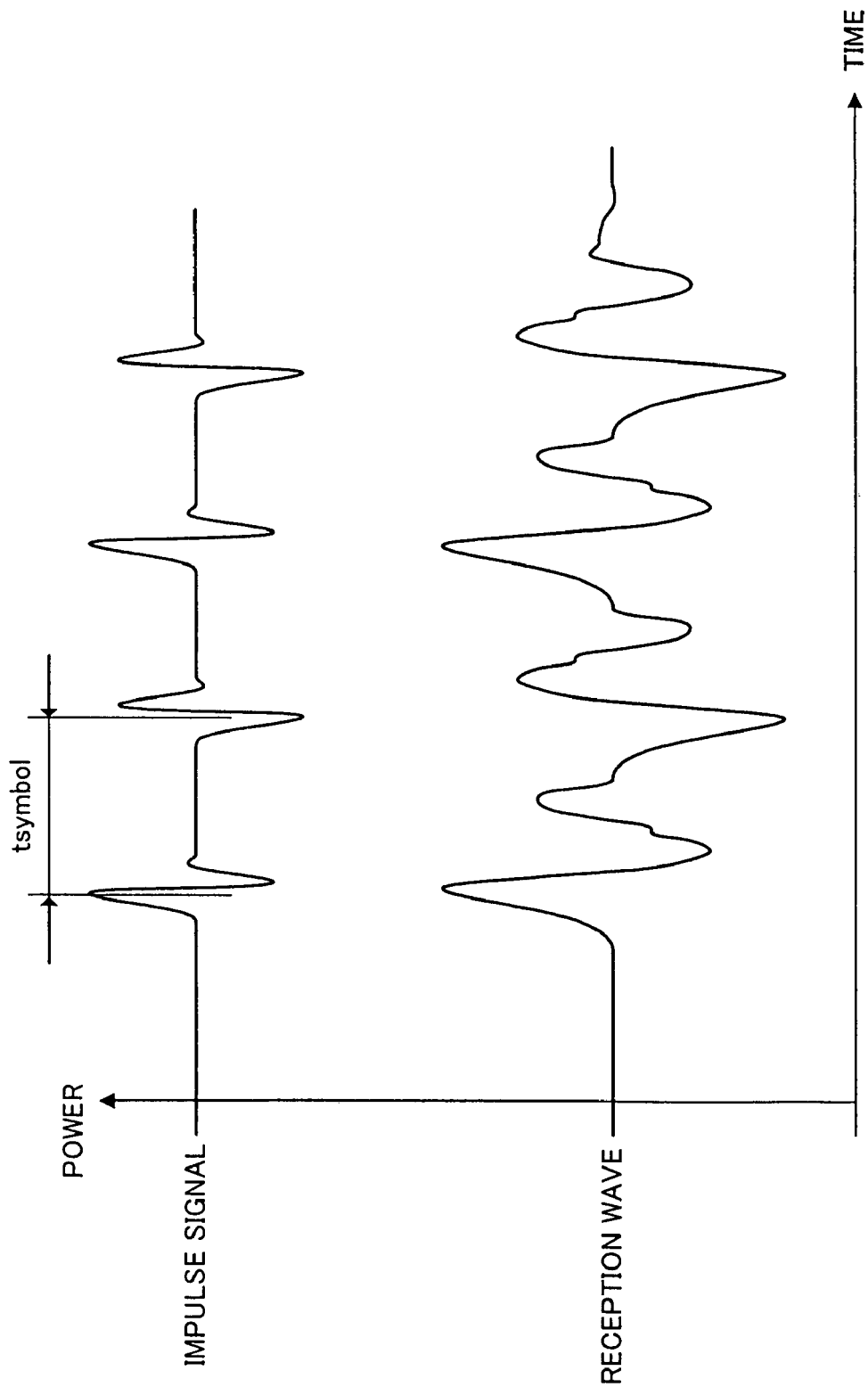
FIG. 36 is a figure showing the waveform of an impulse signal and reception signal according to embodiment 7 of the invention.

FIG. 36 is a depiction of a signal waveform relative to an impulse string similarly to FIG. 34A or FIG. 34B. As mentioned above, because the waveform of the reception wave is approximated to an impulse form by setting the impulse width (tw) long and further taking the impulse interval (tsymbol) long, demodulation operation can be simplified, i.e. stable communication is made possible.

As explained above, by increasing and decreasing the impulse interval or impulse width by utilization of the present embodiment, stable communication is made possible.

Figure 37:
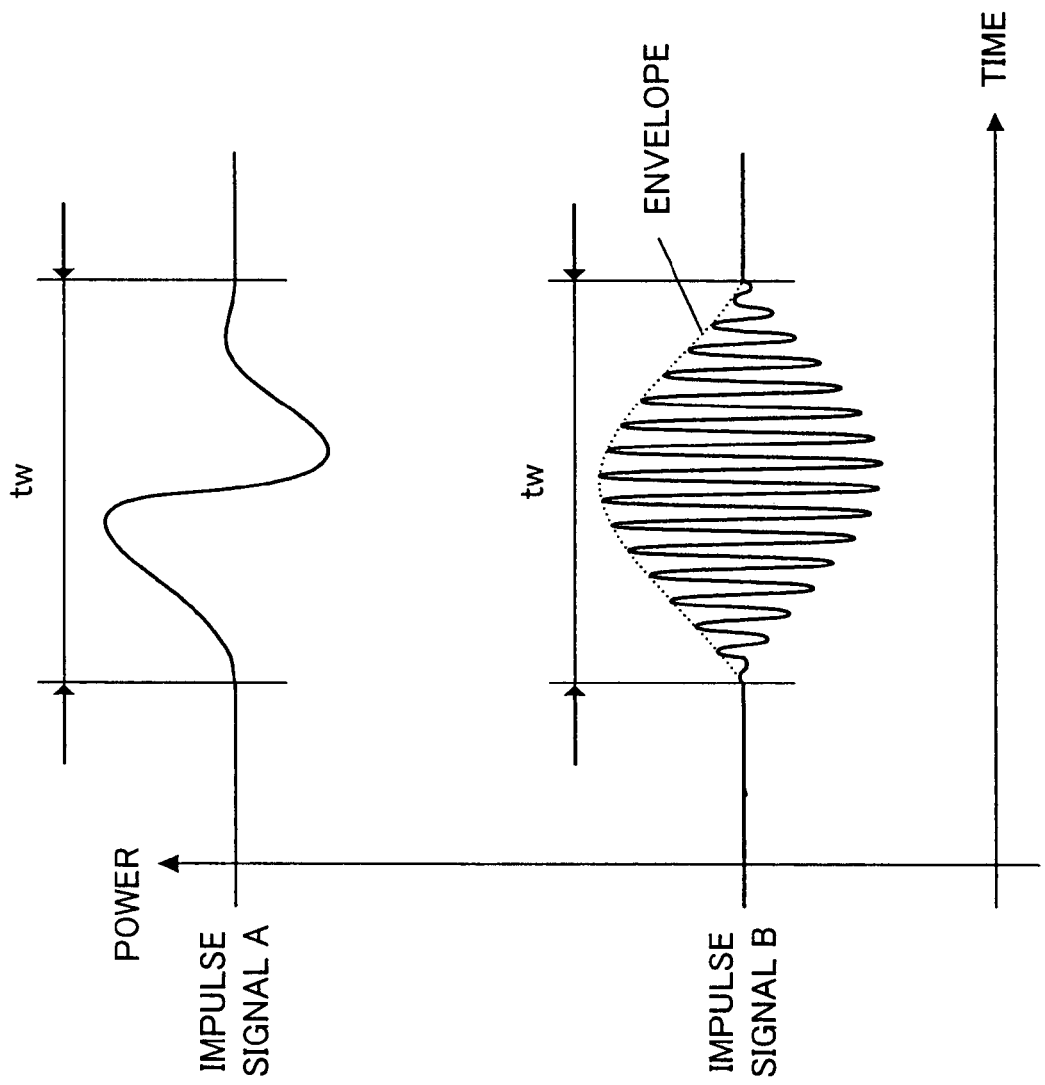
FIG. 37 is a figure showing the waveform of an impulse signal and reception signal according to embodiment 7 of the invention.

Although explained here was to control the impulse width, this is similar for a pulse shaped (or band limited) signal if considering it by replacing the envelope width with an impulse width. The impulse signal (A) in FIG. 37 shows a single-pulse signal waveform while the impulse signal (B) shows a pulse-shaped signal waveform. By controlling the impulse width (tw) of the signal waveform shown in the figure, it is possible to relieve the influence of delay dispersion as noted above.

Meanwhile, controlling the impulse wave results in a change of signal band. Namely, signal band is narrowed by increasing the impulse width while signal band is broadened by decreasing it. For example, a constant (e.g. 500 MHz) or higher band is required to utilize in communication known as the UWB (ultra wideband) system. In such a case, limitation can be provided in the control range of impulse width.

Embodiment 8

Explanation is made on a technique of implementing communication with two or more subsets by using a certain number of subcarriers as a subset, in a system for communicating an impulse modulation signal by using subcarriers.

Figure 27:
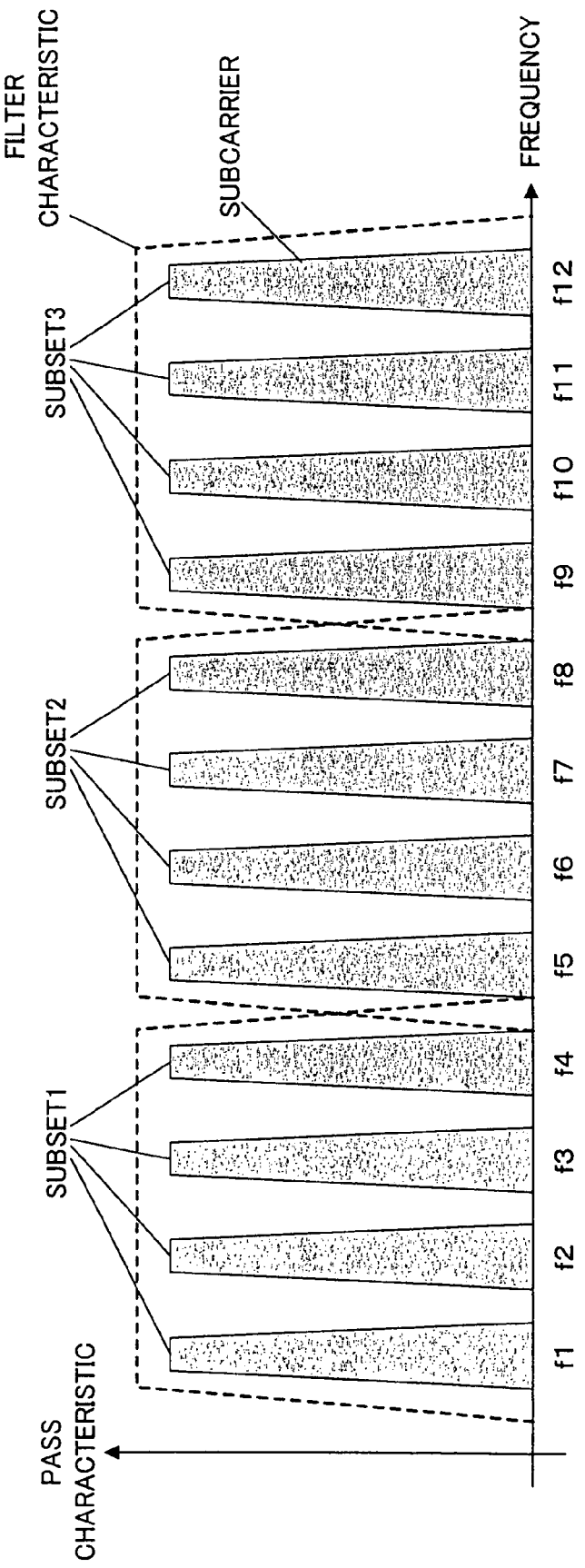
FIG. 27 is a figure showing a relationship between a subset and a subcarrier according to embodiment 8 of the invention.
Figure 28:
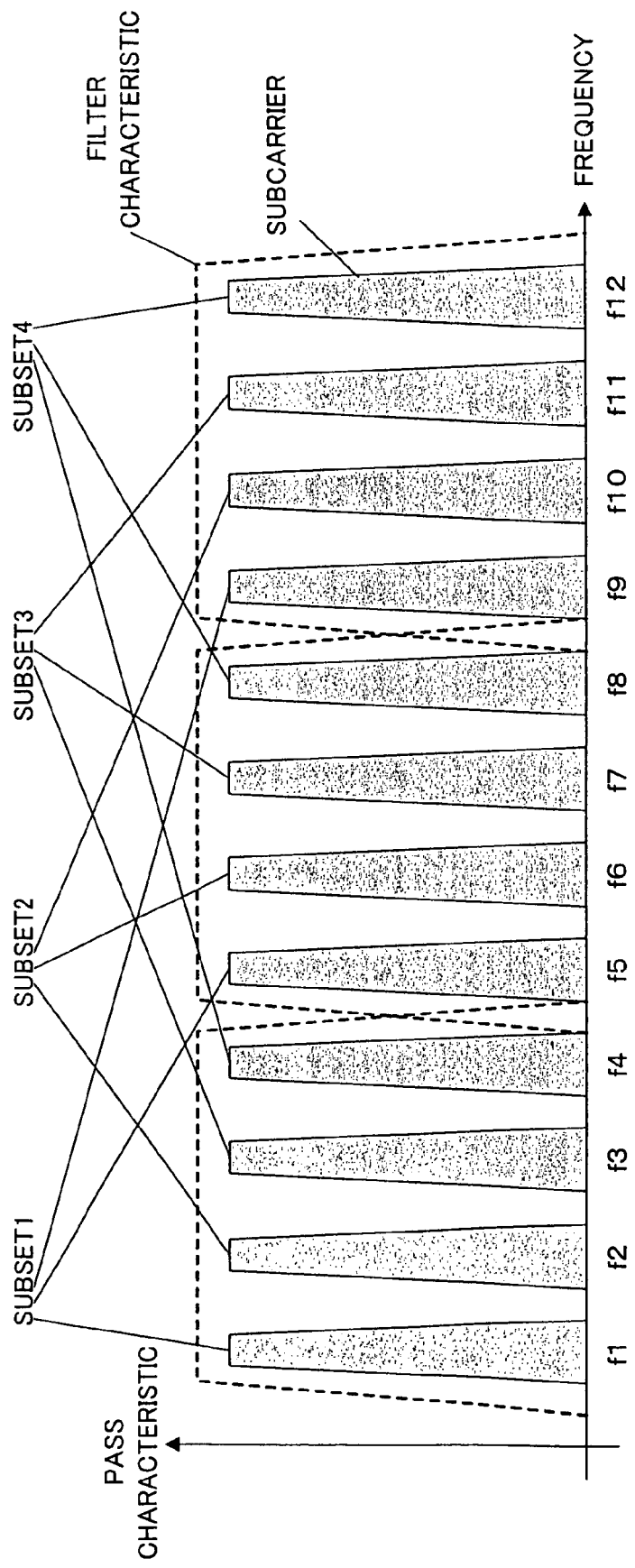
FIG. 28 is a figure showing a relationship between a subset and a subcarrier according to embodiment 8 of the invention.

In FIGS. 27 and 28, there is shown an on-frequency allocation of subcarriers f1-f12. Here, f1-f4/f5-f8/f9-f12 are considered respective one sets, which are assumed as subsets 1-3. By thus introducing a concept of subset, the communication system using subcarriers so far shown in the other embodiment can be grasped as a system having those allocated in the number of subsets. Here, because the number of subcarriers included in the subset can be reduced to a proper number, it is possible to easily carry out subcarrier management/control.

Furthermore, by matching subset frequency allocation with filter characteristic such that the frequency characteristic of the filter 201 (or antenna 101) in the input section shown in FIG. 2 is shown as a filter characteristic (dotted line) in FIG. 27, interference is eliminated from between the subsets. Accordingly, the foregoing subset-based communication can be carried out mutually independently. In the case there are two or more subsets (assumed n here), communication systems apparently n in the number are allowed for communication independently. From this fact, by introducing the concept of subset, a system can be architected with configuration quite simple and high in efficiency.

However, in the case of a communication system using an impulse modulation signal, there can be considered a case that the filters corresponding to subcarriers are not used because of separating the subcarriers in order for simplifying the communication system. Meanwhile, even where providing filters, one filter is provided or so for a base-band signal obtained by multiplying the reception signal by a signal having a subcarrier center frequency because of attaching importance to simplicity and response characteristic.

Figure 32:
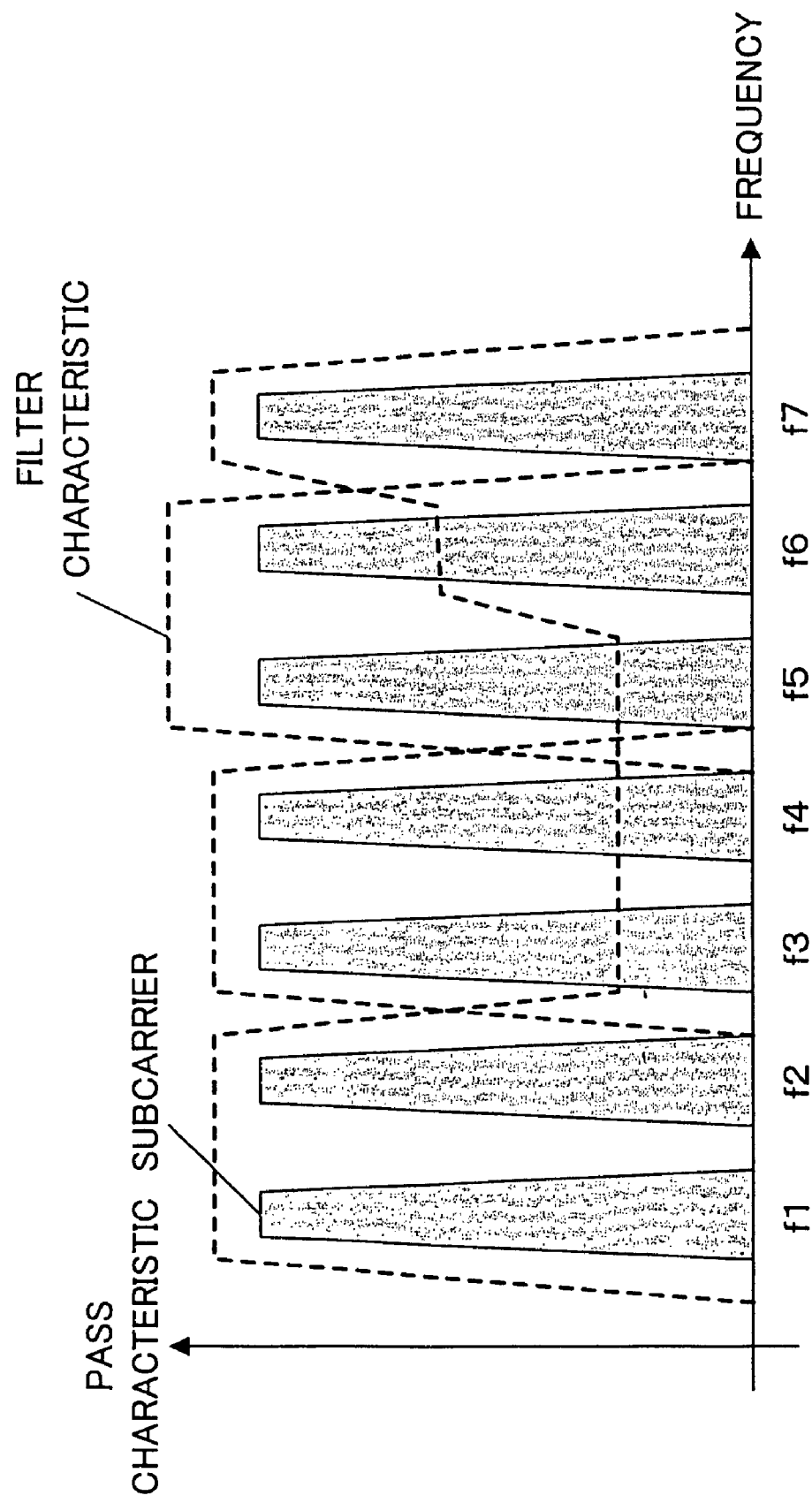
FIG. 32 is a figure showing a relationship between a filter characteristic and a subcarrier according to embodiment 5 of the invention.

FIG. 32 shows a case that the filter characteristic is not separated on a subset-by-subset basis. In such a case, because signal separation is not made between the subsets, the subset singly cannot be operated independently. Namely, signal separation is not made between one subcarrier and another subcarrier as in subcarriers f3 to f6, the subcarriers are influenced in their mutual communication states. For this reason, by providing a filter characteristic corresponded at least to the subsets, signal separation is achieved at between the subsets thus enabling to independently operate the subsets.

Figure 31:
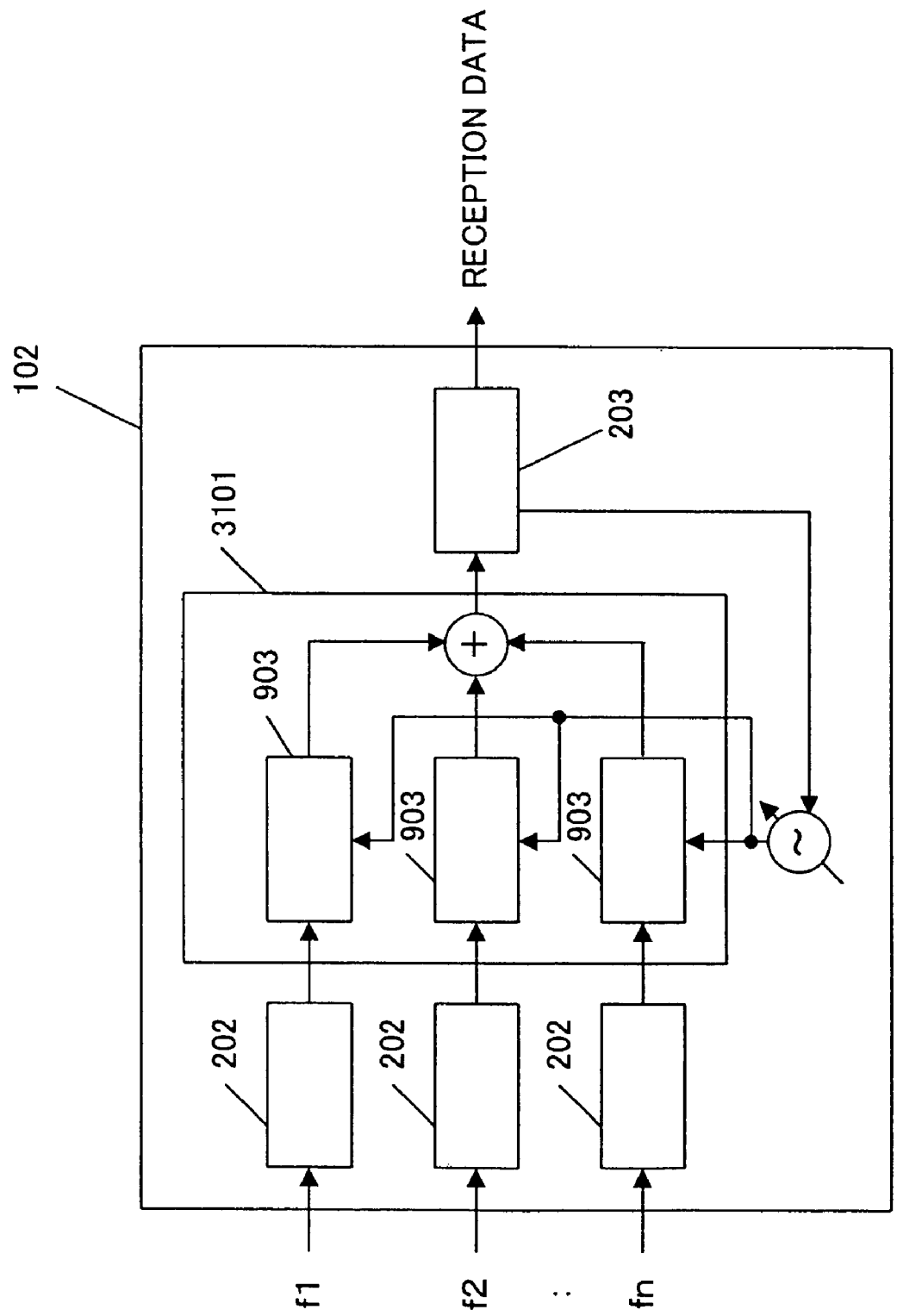
FIG. 31 is a figure showing an arrangement of a receiver apparatus according to embodiment 8 of the invention.

FIG. 31 takes an arrangement that frequency conversion is made on the reception signal of subcarriers f1-fn frequency-allocated with the subset by the same variable clock in a frequency conversion section 3101, whose signals are added (or switched over) into a signal to be detected by one detection section 203. If explaining it by using FIG. 27, in the case of agreement between the f1 filter characteristic in FIG. 31 and the subset, because the subsets are already signal-divided in frequency, there is no mutual interference between subset f1 and subset f2-fn. Accordingly, the detection section can be configured in the small number (one in FIG. 31). Namely, in FIG. 2, by making the filter characteristic of the filter 201 singly or in combination agree with the frequency characteristic given by the subset, the above reception apparatus can be configured. Here, because the filter characteristic corresponding to the subset is extremely broad in band and sufficiently high in response speed and the number of subsets are small as compared to the number of the subcarriers, it is possible to reduce the lower in simplicity due to the provision of filter characteristic and lower in response speed due to the filter, as mentioned above.

Here, the filter characteristic provided in the reception apparatus may be any of from an antenna frequency characteristic to a frequency characteristic as a filter element, and an amplifier frequency characteristic. Particularly, the use of filter characteristic also as an antenna frequency characteristic greatly contributes to antenna size reduction and characteristic improvement. Furthermore, by using a recently developed multimode antenna having a plurality of frequency characteristics, the antenna can be further reduced in size.

When implementing communication by use of the subsets explained above, it can be carried out by replacing the subcarriers shown in the other embodiment with subsets. Namely, subcarriers f1-f7 shown in FIGS. 3, 6, 7, 8, 12, 15, 17, 18 and 20-24 may be replaced with subsets. Meanwhile, where a plurality of subcarriers are assigned to one subset, it is possible to carry out such an operation as direct sequence by use of a particular subcarrier or frequency hopping by use of a subcarrier assigned within the relevant subset.

Figure 29:
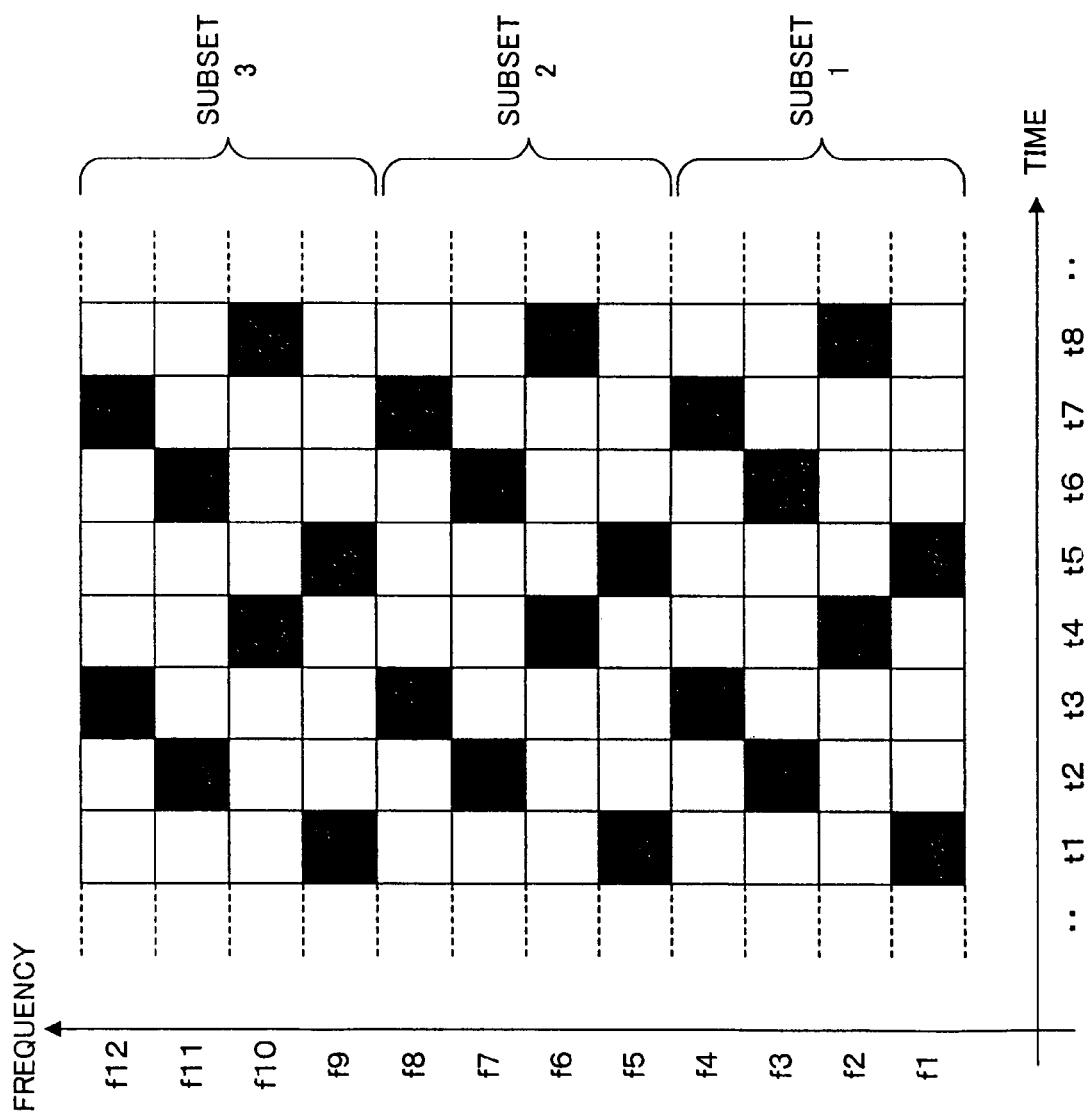
FIG. 29 is a figure showing a frequency hopping pattern according to embodiment 8 of the invention.
Figure 30:
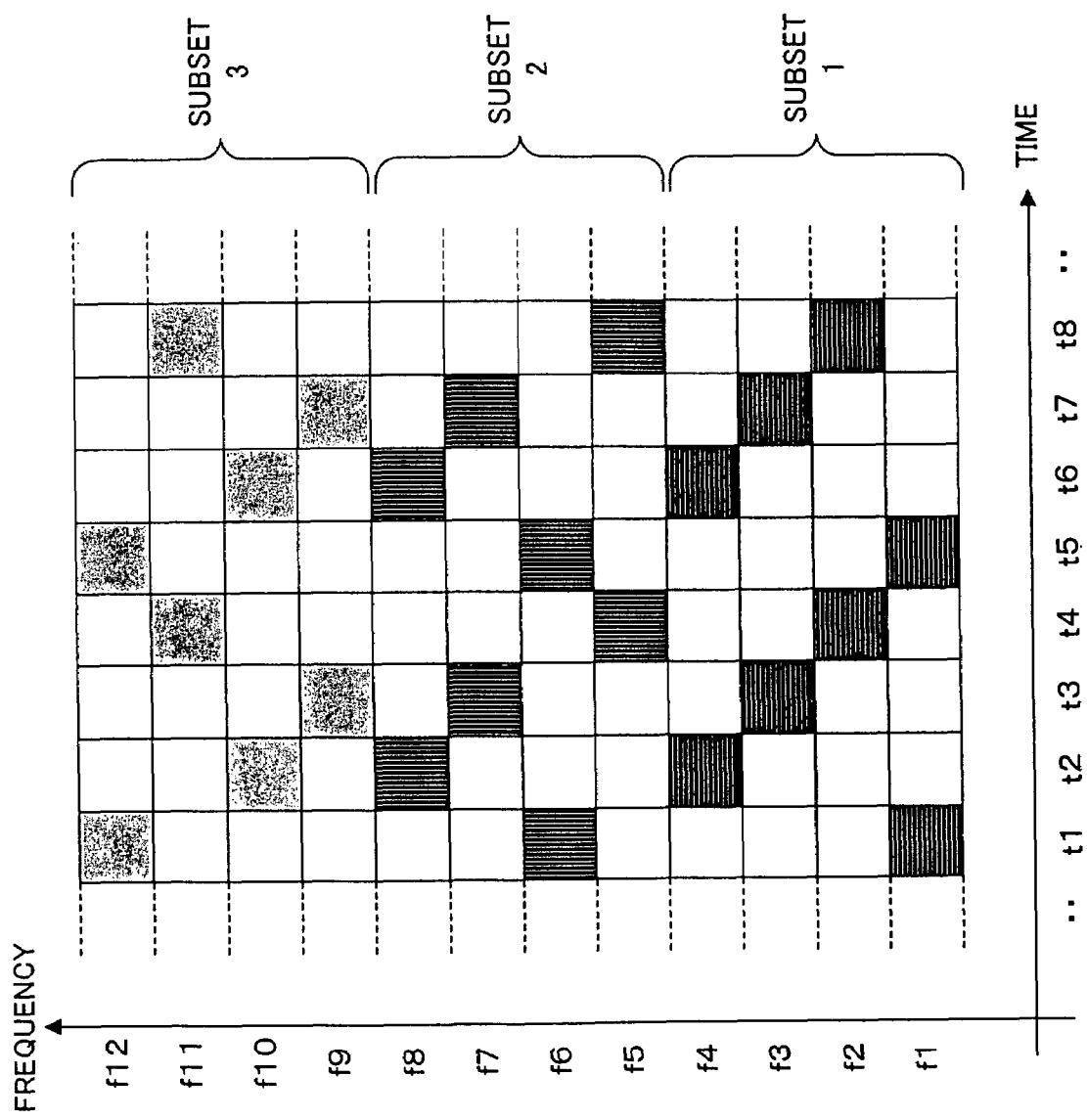
FIG. 30 is a figure showing a frequency hopping pattern according to embodiment 8 of the invention.

FIGS. 29 and 30 shows a frequency hopping pattern where subsets are constituted as shown in FIG. 27. FIG. 29 is the case where the communication apparatus performs transmission through one channel by using all the subsets while FIG. 30 is the case where three channels perform transmissions each using one subset. In this manner, by control of communication through two-stages of divisions with subsets and subcarriers, it is possible to control subsets and subcarriers nearly on the same control scheme. Thus, a high-function communication system can be architected by a simple configuration.

In this manner, by putting together a plurality of subcarrier as a subset and thereby carrying out communication control independently based on the subset or carrying out communication control by a combination of subsets and subcarriers, a simple and efficient communication system can be architected as compared to control of subcarrier entirety.

Embodiment 9

The present embodiment explains an invention for detecting an output of a broadband signal by a simple configuration.

FIG. 3 shows an on-frequency allocation of a broadband signal to be detected and detecting subcarrier signals. In the figure, the broadband signal is shown by a dotted line and the subcarrier signals by hatching of f1-f7. The broadband signal and the subcarrier signals have a frequency relationship set such that the entire or a part band of the subcarriers is positioned within a band of the broadband signal, as shown in FIG. 3.

Figure 38:
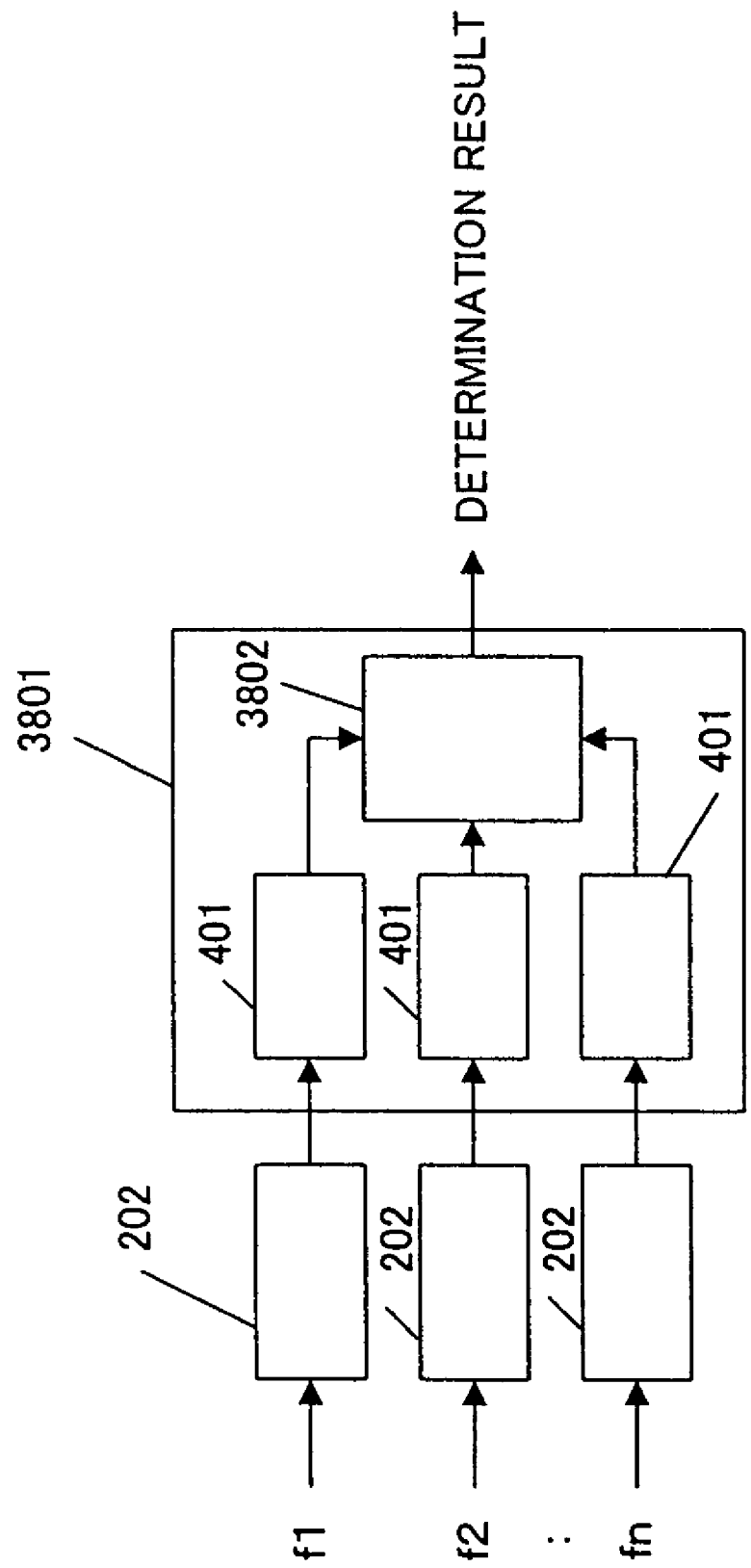
FIG. 38 is a figure showing an arrangement of a receiver apparatus according to embodiment 9 of the invention.

FIG. 38 shows one example of an arrangement of a reception apparatus to be used in the invention. Note that the constituent element having like function in the figure is attached with like reference. The reception apparatus comprises a reception section 202 for decomposing a broadband signal into a plurality of subcarrier signals f1-fn (narrow in band as compared to that) and receiving the decomposed signal group, and a determining section 3801 for inputting the received reception signal group and outputting a determination result. The determination section 3801 comprises a compensation section 401 for inputting the received reception signal group and compensating for any of amplitude, phase, delay time and waveform of each signal, and a detection section 3802 for inputting a compensated signal and outputting a desired signal.

The operation is explained in the below by using the figures.

Figure 39:
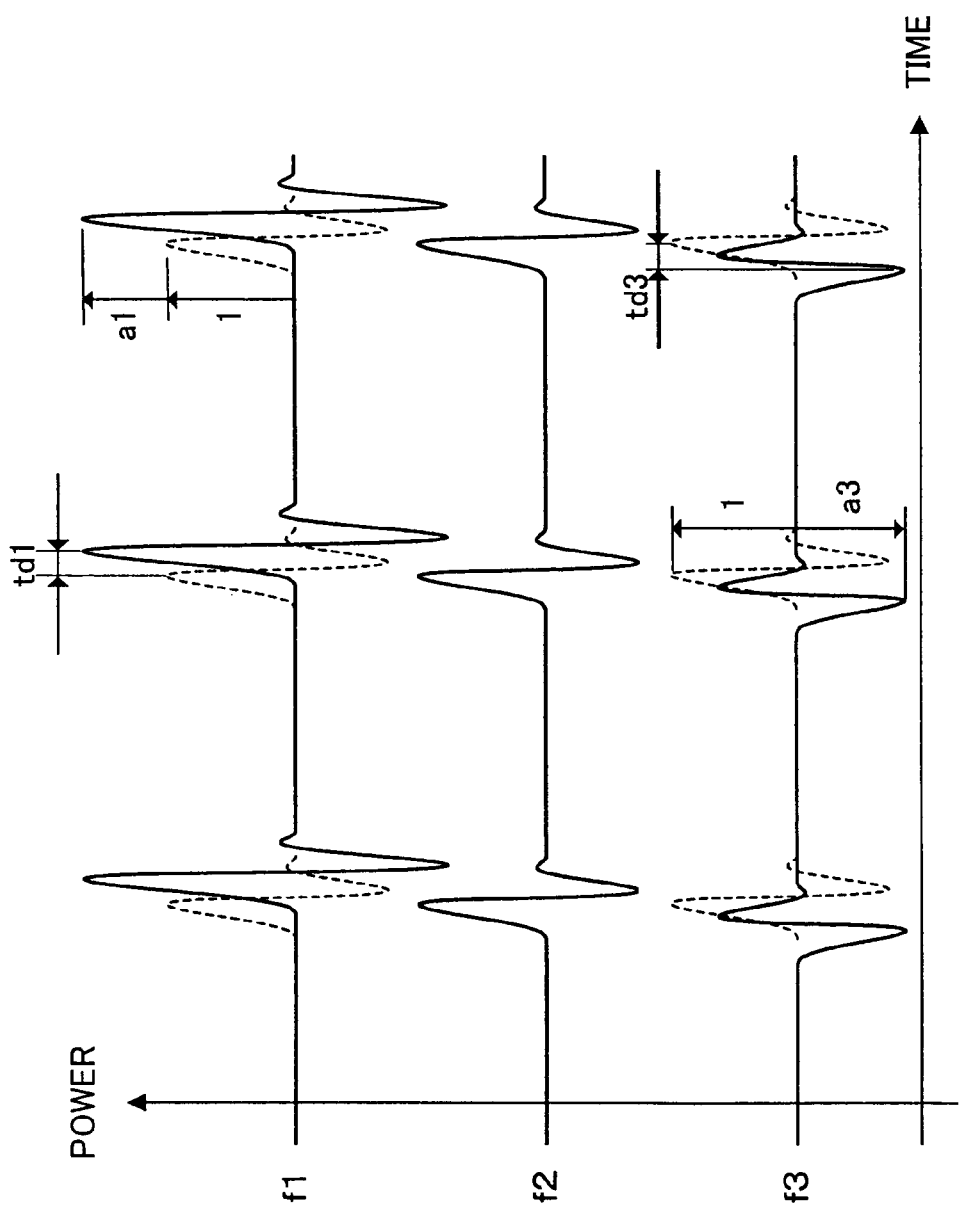
FIG. 39 is a figure showing a subcarrier signal waveform according to embodiment 9 of the invention.

At first, the broadband signal is divided into signals (subcarrier signals) divided in predetermined bands by a filter (not shown), and inputted to the reception apparatus. In the compensation section 401, the inputted subcarrier signals are compensated for in a manner easy to detect a phase, an amplitude, a delay time, a waveform, etc. As shown in FIG. 39, the subcarrier signals separated from the same broadband signal are sought as signals high in time correlation depending upon the corresponding frequency characteristics. By a filter characteristic or propagation path characteristic used in separation, variation occurs in amplitude, phase, delay time, waveform, etc. In the figure, there are shown an actual signal and an ideal waveform respectively by a solid line and a dotted line. By taking subcarrier f2 as a reference, subcarrier f1 is long in delay time and great in amplitude. Conversely, subcarrier f3 is short in delay time and small in amplitude, wherein amplitude is inverted. In this manner, because the subcarrier signals varies depending upon a propagation characteristic and filter characteristic, a difference occurs in detection characteristic depending upon a communication condition and a combination of filters.

In order to solve the problem, the compensation section 401 makes a compensation into a signal matched in amplitude, phase, delay time and waveform. Namely, compensation is performed in a manner approximate to the dotted line shown in FIG. 39. In the figure, although subcarrier f1 longer in delay time is matched to subcarrier f2 shorter in delay time, delay time is desirably matched to the longest one if considering a fact that the delay element is easier to control. By compensation as above, the subcarrier signals are outputted as signals matched in amplitude, phase, delay time and waveform, as shown in the dotted line in FIG. 39.

Next, in the signal detection section, it is determined whether a communication signal has been received or not, by a detection time of an impulse equal to or greater than a constant level of among the subcarrier signal group and the number thereof. Namely, in the case of a simultaneous (within a set time difference) impulse detection out of a predetermined number of subcarrier signals, determination is made as receiving a broadband signal.

In the case that another communication signal is narrower in band as compared with a broadband signal to be detected by the present apparatus, even in case signal power is detected on any of subcarrier signals, there is no case that signal power is detected on all the subcarrier signals. Consequently, even in case another communication signal interferes with a particular subcarrier to thereby detect an impulsive signal, the affection thereof can be removed unless there are interferences with a constant number or more of subcarriers.

Generally, when to detect a broadband signal, the broadband signal is very frequent in signal change and hence very high-speed of operation is required to follow the same. Meanwhile, because the communication terminal before communication start is not prepared for time synchronism and system synchronism (synchronism in hopping), the prior art requires operations including synchronization and demodulation in order to carry out only signal power detection. In such a situation, although signal detection is made by using correlation operation at a constant time interval. However, correlation operation is complicated in operation, thus having a great problem in respect of circuit scale and power consumption leading to signal processing complication and consumption power increase. Particularly, because the communication signal detecting operation as in the foregoing is a function required in waiting for a reception, there is a problem that restriction is provided in reception wait time. Generally, reception wait time occupies a great ratio as compared to the time executing communication. Naturally, there is no operation of a function as a communication during waiting for a reception. Consequently, there is also a problem of quite worse consumption efficiency in a total viewpoint.

These problems are attributable to the impossibility for the communication apparatus to distinguish a signal affected by an interference with other systems. The present invention aims at resolving such a problem. Namely, when detecting a broadband signal as compared to the band which the general communication system utilizes, the influence of an interference signal is restricted by dividing it in frequency. By such division into some narrow-band subcarriers and detecting a communication signal on the basis of a signal power obtained from the subcarriers, it is possible to configure a communication signal detection apparatus extremely simple and low in consumption power.

The detection signal thus determined is representative of a time of communication signal, and hence can be used as the initial synchronous signal with the subsequent signal. By doing so, a communication apparatus can be architected that is simple and low in consumption power.

Meanwhile, as a determination criterion, an operation result of addition of signal groups can be taken as a reference signal. Namely, determined is a signal that all the subcarrier signals are added and synthesized together. In the case the power value of the same exceeds a constant level, detection determination is carried out. Otherwise, with reference to a time the power value exceeds a constant level, in the case of detecting an impulse by a constant number of subcarriers within a constant time at around the same, detection determination is done. By doing so, operation is made possible at extremely low consumption power because the operation prior to signal detection is limited to reception, operation and power detection.

INDUSTRIAL APPLICABILITY

As in the above, the present invention is useful in electronic commerce transaction with utilization of a program broadcast with advertisement distribution, and suited for prompting the viewer to look an advertisement, carrying out sales promotion without discount of the advertisement product and extending the demand for pay broadcast.

LIST OF REFERENCES IN DRAWINGS

101 ANTENNA
102, 2501 RECEPTION DEMODULATION PART
103 TRANSMISSION MODULATION PART
150 TRANSMISSION APPARATUS
151 RECEPTION APPARATUS
201 FILTER
202 RECEPTION PART
203 DEMODULATION PART
204 MODULATION PART
205 TRANSMISSION PART
206, 502 WAVEFORM GENERATING PART
250 FILTER PART
401, 501 COMPENSATION PART
402 OPERATION PART
403 DETECTION PART
901 SPREAD CODE STORING PART
902 DISPREAD PART
903, 1002 MULTIPLICATION PART
1001 SPREAD PART
1950, 1951 COMMUNICATION APPARATUS
2501 SWITCH PART
2503 CARRIER CONTROL PART
3101 FREQUENCY CONVERSION PART
3801 DETERMINING PART
3802 DETECTION PART
4001 CHANNEL CONTROL PART
4401 SUBCARRIER GENERATOR & MODULATOR
4402 SUBCARRIER TIME MODULATOR
4403 OUTPUT STAGE
4404 ANTENNA

The invention claimed is:

1. A communication apparatus comprising:
   a transmission modulator for impulse modulating transmission data into subcarrier modulation signals using a plurality of subcarriers;
   a transmission part for generating a plurality of subcarrier-transmission signals by amplifying the plurality of subcarrier modulation signals;
   a filter section for filtering the plurality of subcarrier-transmission signals, the subcarrier-transmission signals being band-limited within a bandwidth allocated for each of the subcarriers the subcarrier transmission signals having a cumulative bandwidth narrower than a bandwidth of the subcarrier modulation signals;
   a carrier control section for controlling the subcarriers for use in communication depending upon information amount, significance and communication propagation condition; and
   an antenna section for multiplexing and radiating the filtered subcarrier transmission signals.

2. A communication apparatus according to claim 1, further comprising a reception modulator for detecting reception data and examining a reception power on each subcarrier,
   to notify to the subcarrier control section a permission/non-permission to use the subcarrier, depending upon the reception power examined by the reception demodulator.

3. A communication apparatus according to claim 2, wherein the carrier control section causes hopping two or more of the subcarriers.

4. A communication apparatus according to claim 2, wherein the carrier control section causes spread on two or more of the subcarriers.

5. A communication apparatus according to claim 1, wherein the transmission modulator changes an on-frequency allocation of the subcarriers according to communication condition.

6. A communication apparatus according to claim 1, wherein the transmission modulator assigns a narrower band to the subcarrier having a lower center frequency and a broader band to the subcarrier having a higher center frequency.

7. A communication apparatus according to claim 1, further comprising a channel control section for selecting and controlling the subcarrier for use on each channel,
   the channel control section performing communication over two or more channels with different ones of the subcarriers.

8. A communication apparatus according to claim 7, wherein the channel control section performs communication over two or more channels with a combination of different ones of the subcarriers.

9. A communication apparatus according to claim 1, wherein carrier control section performs communication of control information by at least one of the subcarriers.

10. A communication apparatus according to claim 9, wherein the transmission modulator multiplexes together the pieces of control information on two or more channels by use of any one of time division multiplexing and code division multiplexing, in at least one subcarrier of two or more of the subcarriers.

11. A communication apparatus according to claim 2, wherein the transmission modulator carries out frequency division duplex by use of two or more of the subcarriers.

12. A communication apparatus according to claim 9, wherein the transmission modulator carries out frequency division duplex by use of three or more of the subcarriers.

13. A communication apparatus according to claim 9, wherein the subcarrier with which the transmission modulator is to communicate the control information has a center frequency lower than a center frequency of the other subcarrier.

14. A communication apparatus according to claim 9, wherein the subcarrier with which the transmission modulator is to communicate the control information has a band narrower than a band of the other subcarrier.

15. A communication apparatus according to claim 7, wherein the modulation part divides one symbol into two or more of the subcarriers, thereby multiplexing two or more channels.

16. A communication apparatus according to claim 15, wherein the transmission modulator causes frequency hopping in one symbol by use of two or more of the subcarriers, to thereby multiplexing two or more channels.

17. A communication apparatus according to claim 15, wherein the transmission modulator causes encoded spread of one symbol onto two or more of the subcarriers, to thereby multiplexing two or more channels.

18. A communication apparatus according to claim 15, wherein the transmission modulator causes spread of one symbol onto two or more of the subcarriers and two or more chips, thereby multiplexing two or more channels.

19. A communication apparatus according to claim 1, wherein the antenna section comprises a plurality of antenna elements.

20. A communication apparatus according to claim 1, wherein the antenna section has a frequency characteristic of a multi-band characteristic.

21. A communication apparatus according to claim 19, wherein the antenna elements are different in center frequency of frequency characteristic.

22. A communication apparatus according to claim 21, wherein the antenna elements have band characteristics not to overlap on a frequency axis.

23. A communication apparatus according to claim 2, wherein the antenna section receives radio wave on a subcarrier-by-subcarrier basis and outputs the subcarrier signal to the reception modulator.

24. A communication apparatus according to claim 19, wherein the antenna elements have frequency characteristics corresponding to the subcarriers and radiate subcarrier transmission signal as a radio wave.

25. A communication apparatus according to claim 2, wherein the reception demodulator has a compensation section for detecting a characteristic of a signal sequence of each subcarrier from a known signal received from a communication partner and compensating for the characteristic.

26. A communication apparatus according to claim 25, wherein the characteristic is a frequency characteristic.

27. A communication apparatus according to claim 25, wherein the characteristic is a time response characteristic, the compensation section compensates the time response characteristic by a correlation signal of a correlator.

28. A communication apparatus according to claim 2, wherein the reception demodulator comprises
a spread code storing section for storing a spread code and extracting a spread code corresponding to the subcarrier, and
a dispread section for making a convolution operation of the subcarrier signal and the spread code extracted at the spread code storing section.

29. A communication apparatus according to claim 1, wherein the transmission demodulator comprises
a spread code storing section for storing a spread code and extracting a spread code corresponding to the subcarrier, and
a spread section for making a direct spread onto the subcarrier from the modulation signal divided into the subcarriers and the spread code extracted at the spread code storing section.

30. A communication apparatus according to claim 2, wherein the reception demodulator comprises
a switch section for switching over by frequency hopping on the subcarrier,
the carrier control section carrying out the control in the switch section.

31. A communication apparatus according to claim 1, wherein the transmission demodulator comprises
a switch section for switching over by frequency hopping on the subcarrier,
the carrier control section carrying out the control in the switch section.

32. A communication apparatus according to claim 1, further comprising a carrier control section for controlling the subcarriers for use in communication depending upon information amount, significance and communication propagation condition.

33. A communication method comprising the steps of:
impulse modulating transmission data into subcarrier modulation signals using a plurality of subcarriers;
generating a plurality of subcarriers transmission signals by amplifying the plurality of subcarrier modulation signals; and
filtering the subcarrier transmission signals, the subcarrier transmission signals being band limited within a bandwidth allocated for each of the subcarriers, the subcarrier transmission signals having a cumulative bandwidth narrower than a bandwidth of the subcarrier modulation signals
transmitting, by an antenna, the filtered subcarrier transmission signals, and
measuring a reception power on each of the subcarriers in a non-signal state, in an initial state prior to starting a communication; and
determining the reception power measured and selecting the subcarrier usable in communication.

34. A communication method according to claim 33, wherein the determination is to use, in a later communication, the subcarrier having the reception power equal to or smaller than a predetermined value.

35. A communication method according to claim 33, further comprising
a step of measuring a reception power on every subcarrier of a received known signal at a start of communication; and
a step of selecting the subcarrier having the measured reception power equal to or greater than a predetermined value, as a subcarrier usable in communication.

* * * * *

UNITED STATES PATENT AND TRADEMARK OFFICE
CERTIFICATE OF CORRECTION

| | | |
|---|---|---|
| PATENT NO. | : 7,697,624 B2 | Page 1 of 1 |
| APPLICATION NO. | : 10/511622 | |
| DATED | : April 13, 2010 | |
| INVENTOR(S) | : Masayuki Orihashi et al. | |

It is certified that error appears in the above-identified patent and that said Letters Patent is hereby corrected as shown below:

Title Page

At item (57) ABSTRACT, on line 1, "(103)" should be deleted.

At item (57) ABSTRACT, on line 7, "(101)" should be deleted.

Signed and Sealed this

Ninth Day of November, 2010

David J. Kappos
*Director of the United States Patent and Trademark Office*